US005926408A

United States Patent [19]

Kimura

[11] Patent Number: 5,926,408

[45] **Date of Patent: *Jul. 20, 1999**

[54] BIPOLAR MULTIPLIER WITH WIDE INPUT VOLTAGE RANGE USING MULTITAIL CELL

[75] Inventor: Katsuji Kimura, Tokyo, Japan

[73] Assignee: NEC Corporation, Tokyo, Japan

[ * ] Notice: This patent is subject to a terminal disclaimer.

[21] Appl. No.: 08/783,848

[22] Filed: Jan. 16, 1997

Related U.S. Application Data

[63] Continuation-in-part of application No. 08/629,390, Apr. 8, 1996, Pat. No. 5,668,750.

[30] Foreign Application Priority Data

Jul. 28, 1995 [JP] Japan .................................... 7-212632

[51] Int. Cl.$^{6}$ .............................. G06G 7/16; G06F 7/556

[52] U.S. Cl. ............................................ 364/841; 327/357

[58] Field of Search ............................ 364/841; 327/357, 327/359

[56] References Cited

U.S. PATENT DOCUMENTS

| | | |
|---|---|---|
| 5,357,149 | 10/1994 | Kimura . |
| 5,438,296 | 8/1995 | Kimura . |
| 5,485,119 | 1/1996 | Kimura . |
| 5,521,542 | 5/1996 | Kimura . |
| 5,578,965 | 11/1996 | Kimura . |
| 5,581,210 | 12/1996 | Kimura . |
| 5,581,211 | 12/1996 | Kimura . |
| 5,583,456 | 12/1996 | Kimura . |

OTHER PUBLICATIONS

K. Kimura, "Bipolar and MOS Four–Quadrant Analog Multipliers with the Same Transfer Curves of the Gilbert and Wang Multipliers Operable on Low Supply Voltage Realized by Using a Quadritail Cell", Technical Report of IEICE, CAS93–78 (Nov. 1993).

K. Kimura, "A Unified Analysis of Four–Quadrant Analog Multipliers Consisting of Emitter and Source–Coupled Transistors Operable on Low Supply Voltage", IEICE Trans. Electron. Vol. E76–C, No. 5, May 1993.

K. Kimura, "A New Bipolar Multiplier Core", Proceedings of the Engineering Sciences at the 1994 Society Conference of IEICE (A–11).

K. Kimura, "An MOS Four–Quadrant Analog Multiplier Based on the Multitail Technique Using a Quadritail Cell as a Multiplier Core", IEEE Transactions on Circuits and Systems–I:Fundamental Theory and Applications, vol. 42, No. 8, Aug. 1995.

K. Kimura, "A Bipolar Very Low–Voltage Multiplier Core Using a Quadritail Cell", IEICE Trans. Fundamentals, vol. E78–A, No. 5, May 1995.

*Primary Examiner*—Tan V. Mai
*Attorney, Agent, or Firm*—Sughrue, Mion, Zinn, Macpeak & Seas, PLLC

[57] ABSTRACT

A bipolar four-quadrant analog multiplier that is formed on a semiconductor integrated circuit device and is capable of low-voltage operation at a voltage as low as 1 V while the input voltage range providing a good linearity is enlarged. This multiplier contains a multitail cell made of a first transistor pair of first and second bipolar transistors, a second transistor pair of third and fourth bipolar transistors, and at least one bipolar transistor. The first and second transistors have output ends coupled together to form one of differential output ends of the multiplier. The third and fourth transistors have output ends coupled together to form the other of the differential output ends. The first to fifth transistors are driven by a common tail current. The first, second, third, fourth and fifth transistors are applied with $(aV_x+bV_y)$, $((a-1)V_x+(b-1)V_y)$, $((a-1)V_x+bV_y)$, $(aV_x+(b-1)V_y)$, and $(\{a-(½)\}V_x+\{b-(½)\}V_y+V_c)$, respectively, where $V_x$ and $V_y$ are initial input signals to be multiplied, a and b are constants, and $V_c$ is a positive dc voltage.

69 Claims, 53 Drawing Sheets

BIPOLAR MULTIPLIER WITH WIDE INPUT VOLTAGE RANGE USING MULTITAIL CELL

This is a Continuation-in-Part of application Ser. No. 08/629,309 filed Apr. 8, 1996, U.S. Pat. No. 5,668,750.

BACKGROUND OF THE INVENTION

1. Field of the Invention

The present invention relates to an analog multiplier and more particularly, to a bipolar analog multiplier for multiplication of two analog signals that is formed on a semiconductor integrated circuit device and that can operate at a low voltage while enlarging the input voltage range providing a good linearity.

2. Description of the Prior Art

Conventionally, three types of bipolar multipliers were developed, analyzed and published by the inventor, K. Kimura. The first of them appeared in IEICE Paper of Technical Group on Circuits and Systems (CAS93-78), pp. 31–35, the second in the IEICE Transactions on Electronics, Vol. E76-C, No. 5, pp. 714–737 (pp. 735–736), and the third in Proceedings of the Engineering Sciences at the 1994 Society Conference of IEICE (A-11).

The conventional MOS multiplier disclosed in the above IEICE Paper of Technical Group on Circuits and Systems (CAS93-78) was further disclosed by K. Kimura, in IEEE Transactions on Circuits and Systems-I, Vol. 42, No. 8, pp. 448–454, August 1995, entitled "An MOS Four-Quadrant Analog Multiplier Based on the Multitail Technique Using a Quadritail Cell as a Multiplier Core". The conventional bipolar multiplier disclosed in the above IEICE Paper of Technical Group on Circuits and Systems (CAS93-78) was further disclosed by K. Kimura, in IEICE Transactions on Fundamentals, Vol. E78-A, No. 5, pp. 560–565, May 1995, entitled "A Bipolar Very Low-Voltage Multiplier Core Using a Quadritail Cell".

The inventor, K. Kimura, termed a circuit made of three or more transistors driven by a single (common) tail current a "multitail cell", and when the number of transistors is four, the circuit is termed a "quadritail cell".

These conventional multipliers will be described below. FIG. 1 shows a typical or basic configuration of the conventional bipolar multipliers.

In FIG. 1, the conventional multiplier has a quadritail circuit formed of four npn-type bipolar transistors Q51, Q52, Q53 and Q54 and a constant current source 51 (current value: $I_0$) for driving the quadritail circuit. The transistors Q51, Q52, Q53 and Q54 have the same emitter area.

Emitters of the transistors Q51, Q52, Q53 and Q54 are coupled together. The constant current source 1 is connected between these coupled emitters and the ground. Collectors of the transistors Q51 and Q52 are coupled together. Collectors of the transistors Q53 and Q54 are coupled together.

Bases of the transistors Q51, Q52, Q53 and Q54 are applied with four input voltages $V_1$, $V_2$, $V_3$ and $V_4$, respectively. An output current $I_L$ is outputted from the coupled collectors of the transistors Q51 and Q52. Another output current $I_R$ is outputted from the coupled collectors of the transistors Q53 and Q54. A differential output current ΔI of the multiplier is defined as $\Delta I = I_L - I_R$.

In the multiplier of FIG. 1, if the relationship between the collector current the base-to-emitter voltage varies dependent on the exponent-law characteristic, the collector current $I_{Ci}$ of the i-th transistor is expressed as the following equation (1), where $I_S$ is the saturation current, $V_{BEi}$ is the base-to-emitter voltage of the i-th transistor, and $V_T$ is the thermal voltage.

$$I_{Ci} = I_S\left\{\exp\left(\frac{V_{BEi}}{V_T}\right) - 1\right\} \tag{1}$$

The thermal voltage $V_T$ is expressed as $V_T=(kT)/q$ where k is Boltzmann's constant, T is absolute temperature in degrees Kelvin and q is the charge of an electron.

In the equation (1), if $V_{BE}$ is about 600 mV, the exponential term "exp ($V_{BE}/V_T$)" has a value in the order of e10, and therefore, the term "−1" can be neglected. As a result, the equation (1) can be approximated as the following equation (2).

$$I_{Ci} = I_S\exp\left(\frac{V_{BEi}}{V_T}\right) \tag{2}$$

Then, assuming that all the transistors Q51, Q52, Q53 and Q54 are matched in characteristic, the collector currents of the transistors Q51, Q52, Q53 and Q54 driven by the tail current $I_0$ are expressed as the following equations (3), (4), (5) and (6), respectively, where $V_R$ is the dc voltage of the input signals and $V_E$ is the common emitter voltage.

$$I_{C1} = I_S\exp\left(\frac{V_1 + V_R - V_E}{V_T}\right) \tag{3}$$

$$I_{C2} = I_S\exp\left(\frac{V_2 + V_R - V_E}{V_T}\right) \tag{4}$$

$$I_{C3} = I_S\exp\left(\frac{V_3 + V_R - V_E}{V_T}\right) \tag{5}$$

$$I_{C4} = I_S\exp\left(\frac{V_4 + V_R - V_E}{V_T}\right) \tag{6}$$

Since the quadritail circuit in FIG. 1 is driven by the common tail current $I_0$, the following equation (7) needs to be satisfied additionally, where $\alpha_F$ is the dc common-base current gain factor.

$$I_{C1}+I_{C2}+I_{C3}+I_{C4}=\alpha_F I_0 \tag{7}$$

Solving the equations (3), (4), (5), (6) and (7) provides the following equation (8).

$$I_S\exp\left(\frac{V_R - V_E}{V_T}\right) = \frac{\alpha_F I_0}{\left\{\exp\left(\frac{V_1}{V_T}\right) + \exp\left(\frac{V_2}{V_T}\right) + \exp\left(\frac{V_3}{V_T}\right)\exp\left(\frac{V_4}{V_T}\right)\right\}} \tag{8}$$

The differential output current ΔI is expressed as the following equation (9).

$$\begin{aligned}\Delta I &= (I_{C1} + I_{C2}) - (I_{C3} + I_{C4}) \\ &= \frac{\alpha_F I_0\left\{\exp\left(\frac{V_1}{V_T}\right) + \exp\left(\frac{V_2}{V_T}\right) - \exp\left(\frac{V_3}{V_T}\right) - \exp\left(\frac{V_4}{V_T}\right)\right\}}{\left\{\exp\left(\frac{V_1}{V_T}\right) + \exp\left(\frac{V_2}{V_T}\right) + \exp\left(\frac{V_3}{V_T}\right)\exp\left(\frac{V_4}{V_T}\right)\right\}}\end{aligned} \tag{9}$$

It is seen from the equation (9) that the input voltages $V_1$, $V_2$, $V_3$ and $V_4$ needs to be adaptively decided in order to obtain the product of the input voltages in the differential output current ΔI.

FIG. 2 shows an example of the conventional bipolar multiplier of FIG. 1, in which the input voltages $V_1$, $V_2$, $V_3$ and $V_4$ are adaptively set to linearize the differential output current ΔI.

In the conventional multiplier of FIG. 2, a base of the transistor Q51 is applied with an input voltage (½)($V_x$+$V_y$) with regard to a reference point. A base of the transistor Q52 is applied with an input voltage (−½)($V_x$+$V_y$) with regard to the reference point. A base of the transistor Q53 is applied with an input voltage (½)($V_x$−$V_y$) with regard to the reference point. A base of the transistor Q54 is applied with an input voltage (−½)($V_x$−$V_y$) with regard to the reference point.

In the conventional multiplier of FIG. 2, since $V_1$ (½) ($V_x$+$V_y$), $V_2$=(−½)($V_x$+$V_y$), $V_3$=(½)($V_x$−$V_y$) and $V_4$=(−½) ($V_x$−$V_y$). Therefore, by substituting these into the equation (9), the differential output current ΔI is expressed as the following equation (10).

$$\Delta I = \alpha_F I_0 \tanh\left(\frac{V_x}{2V_T}\right)\tanh\left(\frac{V_y}{2V_T}\right) \tag{10}$$

FIG. 3 shows another example of the conventional bipolar multiplier of FIG. 1, in which the input voltages $V_1$, $V_2$, $V_3$ and $V_4$ are adaptively set to linearize the differential output current ΔI.

In this multiplier of FIG. 3, a base of the transistor Q51 is applied with an input voltage (½)$V_x$ with regard to a reference point (Voltage: $V_R$). A base of the transistor Q52 is applied with an input voltage ((−½)$V_x$−$V_y$) with regard to the reference point. A base of the transistor Q53 is applied with an input voltage ((½)$V_x$−$V_y$) with regard to the reference point. A base of the transistor Q54 is applied with an input voltage (−½)$V_x$ with regard to the reference point.

In the conventional multiplier core circuit of FIG. 3, since $V_1$=(½)$V_x$, $V_2$=(−½)$V_x$−$V_y$, $V_3$=(½)$V_x$−$V_y$, and $V_4$=(−½) $V_x$, and therefore, the differential output current ΔI is expressed as the following equation (11) from the equation (9).

$$\Delta I = \alpha_F I_0 \tanh\left(\frac{V_x}{2V_T}\right)\tanh\left(\frac{V_y}{2V_T}\right) \tag{11}$$

FIG. 4 shows further example of the conventional bipolar multiplier of FIG. 1, in which the input voltages $V_1$, $V_2$, $V_3$ and $V_4$ are adaptively set to linearize the differential output current ΔI.

In this multiplier of FIG. 4, a base of the transistor Q51 is applied with an input voltage ($V_x$+$V_y$) with regard to a reference point. A base of the transistor Q52 is applied with an input voltage 0 (zero) with regard to the reference point. A base of the transistor Q53 is applied with an input voltage $V_x$ with regard to the reference point. A base of the transistor Q54 is applied with an input voltage $V_y$ with regard to the reference point.

In the conventional multiplier core circuit of FIG. 4, since $V_1$=$V_x$+$V_y$, $V_2$=0, $V_3$=$V_x$, and $V_4$=$V_y$, and therefore, the differential output current ΔI is expressed as the following equation (12) from the equation (9).

$$\Delta I = \alpha_F I_0 \tanh\left(\frac{V_x}{2V_T}\right)\tanh\left(\frac{V_y}{2V_T}\right) \tag{12}$$

Thus, the equation (12) is the same as the equations (10) and (11).

FIG. 5 shows the input/output (or transfer) characteristic of the conventional multipliers of FIGS. 2, 3 and 4, and FIG. 6 shows the corresponding transconductance characteristic.

The right-hand side of the equation (10), (11) or (12) multiplied by aF is equal to the differential output current of the well-known Gilbert multiplier cell.

An obtainable value of aF through the typical bipolar processes is in the range from 0.98 to 0.99, which is extremely near 1. Therefore, it is seen from the equations (10), (11) and (12) that the conventional multipliers of FIGS. 2, 3 and 4 have the transfer characteristics approximately equal to that of the Gilbert multiplier cell.

Also, since the conventional multipliers of FIGS. 2, 3 and 4 do not contain the transistors stacked as in the Gilbert's one, they can operate at a lower voltage than the Gilbert's one.

The Gilbert multiplier cell can be linearized by incorporating the Gilbert gain cell, which is a well-known linearized circuit, in the input circuit, and the circuit thus created has originally been called the Gilbert multiplier.

The multiplier is an essential function block in analog signal processing. With the process of signal processing having become finer, the power supply voltage for LSIs has been decreased from 5 V to 3 V, or as low as 2 or 1 V, thus, a more advanced low-voltage circuit technology is increasingly been required. Such the conventional multipliers can originally be operated at a low voltage, however, as stated above, they have an input voltage range as narrow as that for the Gilbert multiplier cell. This causes a problem that only an extremely narrow range can be provided as a linear input voltage range.

SUMMARY OF THE INVENTION

Accordingly, an object of the present invention is to provide a bipolar multiplier that can operate at a voltage as low as 1 V while enlarging the input voltage range providing a good linearity.

A bipolar multiplier according to a first aspect of the present invention has a multitail cell made of a first transistor pair of first and second bipolar transistors whose output ends are coupled together, a second transistor pair of third and fourth bipolar transistors whose outputs ends are coupled together, and a fifth bipolar transistor, which are driven by a common tail current.

The first to fourth transistors have the same emitter area.

The coupled output ends of the first and second transistors form one of differential output ends of the multiplier. The coupled output ends of the third and fourth transistors form the other of the differential output ends.

When a first initial input signal and a second initial input signal to be multiplied are $V_x$ and $V_y$, respectively, input ends of the first, second, third, and fourth transistors are applied with input signals of (a$V_x$+b$V_y$)

{(a−1)$V_x$+(b−$V_y$}

{(a−1)$V_x$+b$V_y$}, and

{a$V_x$+(b−1)$V_y$}, respectively, where a and b are constants.

An input end of the fifth transistor is applied with an input signal of

{(a−½)$V_x$+(b−½)$V_y$+$V_C$}, where $V_C$ is a positive dc voltage.

In a preferred embodiment of the first aspect, the fifth transistor has the same emitter area as those of the first to fourth transistors, and the positive dc voltage $V_C$ is set as $V_C=V_T\cdot\ln2$, where $V_T$ is the thermal voltage. In this embodiment, all of the first to fifth transistors may be formed by unit bipolar transistors.

In another preferred embodiment of the first aspect, the fifth transistor has an emitter area twice as much as those of the first to fourth transistors, and the positive dc voltage $V_C$ is set as $V_C=0$. This means that the positive dc voltage $V_C$ may be zero in this embodiment.

In still another preferred embodiment of the first aspect, the constants a and b satisfy the relationships of $(a-1)\geqq 0$ and $(b-1)\geqq 0$. In this embodiment, an additional advantage that the first to ninth input signals can be respectively produced by using a resistive divider or dividers occurs.

In a further preferred embodiment of the first aspect, the constants a and b are set as a=1 and b=1. In this embodiment, the input voltages are simplified.

In a further preferred embodiment of the first aspect, the input signals applied to the first, second, third, fourth and fifth transistors are produced by using at least one resistive divider, respectively.

In a still further preferred embodiment of the first aspect, the fifth transistor is replaced with a pair of bipolar transistors. Input ends of the two transistors forming the pair are coupled together to be applied with the input voltage of $\{(a-½)V_x+(b-½)V_y+V_C\}$, and output ends thereof are connected to the coupled output ends of the first and second transistors and those of the third and fourth transistors, respectively. In this embodiment, a resistor can be used as a load of the multiplier and the multiplication result can be derived from each of the differential output ends of the multiplier.

A bipolar multiplier according to a second aspect of the present invention has a multitail cell made of a first transistor pair of first and second bipolar transistors whose output ends are coupled together, a second transistor pair of third and fourth bipolar transistors whose outputs ends are coupled together, and fifth to ninth bipolar transistors, which are driven by a common tail current.

The multiplier according to the second aspect is equivalent to one composed of the multiplier according to the first aspect and newly added sixth to ninth bipolar transistors.

Here, the dc voltage $V_C$ applied to the fifth bipolar transistor is set as $V_C=4V_T\cdot\ln2$ and therefore, the input signal applied to the fifth transistor is $(\{a-(½)\}V_x+\{b-(½)\}V_y+4V_T-\cdot\ln2)$.

The input signals applied respectively to the sixth to ninth bipolar transistors are $(aV_x+\{b-(½)\}V_y+2V_T\cdot\ln2)$, $((a-1)V_x+\{b-(½)\}V_y+2V_T\cdot\ln2)$, $(\{a-(½)\}V_x+bV_y+2V_T\cdot\ln2)$, and $(\{a-(½)\}V_x+(b-1)V_y+2V_T\cdot\ln2)$, respectively.

In a preferred embodiment of the second aspect, the constants a and b satisfy the relationships of $(a-1)\geqq 0$ and $(b-1)\geqq 0$. In this embodiment, the input signals applied to the first to ninth transistors can be produced by using resistive dividers, respectively.

In another preferred embodiment of the second aspect, the constants a and b are set as a=1 and b=1. In this embodiment, the input voltages are simplified.

In still another preferred embodiment of the second aspect, the fifth transistor has an emitter area sixteen times as much as those of the first to fourth transistors, and the sixth to ninth transistors have emitter areas four times as much as those of the first to fourth transistors. In this embodiment, the dc voltage $V_C$ applied to the fifth to ninth transistors can be set as zero, i.e., $V_C=0$.

A bipolar multiplier according to a third aspect of the present invention has a multitail cell made of a first transistor pair of first and second bipolar transistors whose output ends are coupled together, a second transistor pair of third and fourth bipolar transistors whose outputs ends are coupled together, and fifth to sixteenth bipolar transistors, which are driven by a common tail current.

The multiplier according to the third aspect is equivalent to one composed of the multiplier according to the first aspect and newly added sixth to sixteenth bipolar transistors.

The input signals applied respectively to the fifth to sixteenth bipolar transistors are;

(fifth)$(aV_x+\{b-(½)(1-5^{-½})\}V_y+Vc)$, (sixth)$((a-1)V_x+\{b-(½)(1-5^{-½})\}V_y+Vc)$, (seventh)$(\{a-(½)(1-5^{-½})\}V_x+bV_y+Vc)$, (eighth)$(\{a-(½)(1-5^{-½})\}V_x+(b-1)V_y+Vc)$, (ninth)$(\{a-(½)(1-5^{-½})\}V_x+\{b-(½)(1-5^{-½})\}V_y+2Vc)$, (tenth)$(\{a-(½)(1+5^{-½})\}V_x+\{b-(½)(1+5^{-½}))V_y+2Vc)$, (eleventh)$(\{a-(½)(1-5^{-½})\}V_x+\{b-(½)(1+5^{-½})\}V_y+2Vc)$, (twelfth)$(\{a-(½)(1+5-2/1)\}V_x+\{b-(½)(1-5^{-½})\}V_y+2Vc)$, (thirteenth)$(aV_x+\{b-(½)(1+5^{-½})\}V_y+Vc)$, (fourteenth)$((a-1)V_x+\{b-(½)(1-5^{-½}))V_y+Vc)$, (fifteenth)$(\{a-(½)(1+5^{-½})\}V_x+(b-1)V_y+Vc)$, (sixteenth)$(\{a-(½)(1+5^{-½})\}V_x+bv_y+Vc)$, respectively.

In a preferred embodiment of the third aspect, the fifth to sixteenth transistors have the same emitter area as those of the first to fourth transistors, respectively, and the dc voltage $V_C$ is set as $V_C=(V_T\cdot\ln5)$.

In another preferred embodiment of the third aspect, the fifth to twelfth transistors have emitter areas five times as much as those of the first to fourth transistors, the thirteenth to sixteenth transistors have emitter areas ten times as much as those of the first to fourth transistors, respectively, and the dc voltage $V_C$ is set as $V_C=0$.

In still another preferred embodiment of the third aspect, the constants a and b satisfy the relationships of $(a-1)>0$, $(b-1)>0$, $\{a-(½)(1+5^{-½})\}>0$, and $\{b-(½)(1+5^{-½})\}>0$.

In still another preferred embodiment of the third aspect, the constants a and b are set as a=1 and b=1.

In a further preferred embodiment of the third aspect, the input signals applied to the first to sixteenth transistors are produced by using resistive dividers, respectively.

A bipolar multiplier according to a fourth aspect of the present invention has a multitail cell made of a first transistor pair of first and second bipolar transistors whose output ends are coupled together, a second transistor pair of third and fourth bipolar transistors whose outputs ends are coupled together, and a third transistor pair of fifth and sixth bipolar transistors whose output ends are coupled together, which are driven by a common tail current.

The coupled output ends of the first and second transistors form one of differential output ends of the multiplier. The coupled output ends of the third and fourth transistors form the other of the differential output ends.

The multiplier according to the fourth aspect is equivalent to one composed of the multiplier according to the first aspect and newly added sixth bipolar transistor.

The first, second, third, and fourth transistors are applied with the same input signals as those of the first aspect.

The fifth and sixth transistors are applied with the signals of $\{(a-½)V_x+bV_y+2V_C\}$, and $\{(a-½)V_x+(b-1)V_y+2V_C\}$, respectively.

In a preferred embodiment of the fourth aspect, the fifth and sixth bipolar transistors has the same emitter area as those of the first to fourth bipolar transistors, respectively, and the dc voltage $V_C$ satisfies a relationship of $V_C=V_T\cdot\ln 2$, where $V_T$ is the thermal voltage.

In another preferred embodiment of the fourth aspect, the fifth and sixth bipolar transistors has emitter areas twice as much as those of the first to fourth bipolar transistors, respectively, and the dc voltage $V_C$ satisfies a relationship of $V_C=0$.

In still another preferred embodiment of the fourth aspect, the constants a and b satisfy the relationships of (a−1)>0 and (b−1)>0. In this case, the input signals applied to the first, second, third, fourth and fifth transistors can be produced by using resistive dividers, respectively.

In a further preferred embodiment of the fourth aspect, the constants a and b are set as a=1 and b=1.

A bipolar multiplier according to a fifth aspect of the present invention has a multitail cell made of a first transistor pair of first and second bipolar transistors whose output ends are coupled together, a second transistor pair of third and fourth bipolar transistors whose outputs ends are coupled together, a third transistor pair of fifth and sixth bipolar transistors, and a fourth transistor pair of seventh and eighth bipolar transistors, which are driven by a common tail current. The output ends of the fifth to eighth transistors are coupled together.

The multiplier according to the fifth aspect is equivalent to one composed of the multiplier according to the first aspect and newly added sixth to eighth bipolar transistors.

The input signals applied respectively to the fifth to eighth bipolar transistors are (fifth)$(aV_x+\{b-(½)(1-5^{-½})V_y\}+Vc)$, (sixth)$((a-1)V_x+\{b-(½)(1-5^{-½})V_y\}+Vc)$, (seventh)$(\{a-(½)(1-5^{-½})\}V_x+(b-1)V_y+Vc)$, and (eighth)$(\{a-(½)(1-5^{-½})\}V_x+bV_y+Vc)$.

In a preferred embodiment of the fifth aspect, the value of the positive dc voltage $V_C$ is equal to $(V_T-\cdot\ln 5)$.

In another preferred embodiment of the fifth aspect, the constants a and b satisfy the relationships of $(a-1)>0$, $(b-1)>0$, $\{a-(½)(1-_5{}^{-½})\}\geqq 0$, and $\{b-(½)(1-5^{-½})\}\geqq 0$, respectively. In this case, the input signals applied to the first to eighth transistors can be produced by using resistive dividers, respectively.

In still another preferred embodiment of the fifth aspect, the constants a and b are set as a=1 and b=1.

A bipolar multiplier according to a sixth aspect of the present invention has a multitail cell made of a first transistor pair of first and second bipolar transistors whose output ends are coupled together, a second transistor pair of third and fourth bipolar transistors whose outputs ends are coupled together, a third transistor pair of fifth and sixth bipolar transistors, and a fourth transistor pair of seventh and eighth bipolar transistors, a fifth transistor pair of ninth and tenth bipolar transistors, and a sixth transistor pair of eleventh and twelfth bipolar transistors, which are driven by a common tail current. The output ends of the fifth to twelfth transistors ad coupled together.

The multiplier according to the sixth aspect is equivalent to one composed of the multiplier according to the first aspect and newly added sixth to twelfth bipolar transistors.

The input signals applied respectively to the fifth to eighth bipolar transistors are (fifth)$(\{a-(½)(1-5^{-½})\}V_x+bv_y+V_{c2})$ ($V_{c2}$ is a positive dc voltage)

(sixth)$(\{a-(½)(1-5^{-½})\}V_x+\{b-1\}V_y+V_{c2})$ (seventh)$(aV_x+\{b-(½)\}V_y+V_{c1})$ ($V_{c1}$ is a positive dc voltage), (eighth)$((a-1)V_x+\{b-(½)\}V_y+V_{c1})$ (ninth)$(\{a-(½)(1-5^{-½})\}V_x+\{b-(½)\}V_y+V_{c3})$ ($V_{c3}$ is a positive dc voltage), (tenth)$(\{a-(½)(1+5^{-½})\}V_x+\{b-(½)\}V_y+V_{c3})$ (eleventh)$(\{a-(½)(1+5^{-½})\}V_x+\{b-(½)\}V_y+V_{c3})$; and (twelfth)$(\{a-(½)(1+5^{-½})\}V_x+bV_y+V_{c2})$.

In a preferred embodiment of the sixth aspect, the fifth to twelfth transistors have the same emitter area as those of the first to fourth transistors, respectively, and the values of the positive dc voltages $V_{c1}$, $V_{c2}$, and $Vc_3$ are equal to $(V_T\cdot\ln 2)$, $(V_T\cdot\ln 5)$ and $(V_T\cdot\ln 20)$, respectively.

In another preferred embodiment of the sixth aspect, the constants a and b satisfy the relationships of $(a-1)\geqq 0$, $(b-1)\geqq 0$, and $\{a-(½)(1+5^{-½})\}\geqq 0$, respectively. In this case, the input signals applied to the first to twelfth transistors can be produced by using resistive dividers, respectively.

In still another preferred embodiment of the sixth aspect, the constants a and b are set as a=1 and b=1.

With the bipolar multipliers according to the first to sixth aspects of the present invention, each of the bipolar multipliers contains, as a basic structural unit, a multitail cell made of the first and second transistor pairs of bipolar transistors whose output ends are coupled together to thereby form a differential output pair, and at least one bipolar transistor, which are driven by a common tail current.

Further, the first and second bipolar transistors forming the first transistor pair and the third and fourth bipolar transistors forming the second transistor pair are respectively applied with specified input signals determined on the basis of the first initial input signal $V_x$ and the second initial input signal $V_y$ to be multiplied.

Since the polarity and magnitude of these specified input signals are appropriately determined, each of the multipliers enables to realize both an enlarged input voltage range with a good linearity and low-voltage operation at a voltage as low as 1 V.

BRIEF DESCRIPTION OF THE DRAWINGS

In order that the invention may be readily carried into effect, it will now be described with reference to the accompanying drawings.

DETAILED DESCRIPTION OF THE PREFERRED EMBODIMENTS

Preferred embodiments of the present invention will be described below referring to FIGS. 7 to 54.

FIRST EMBODIMENT

Figure 7:
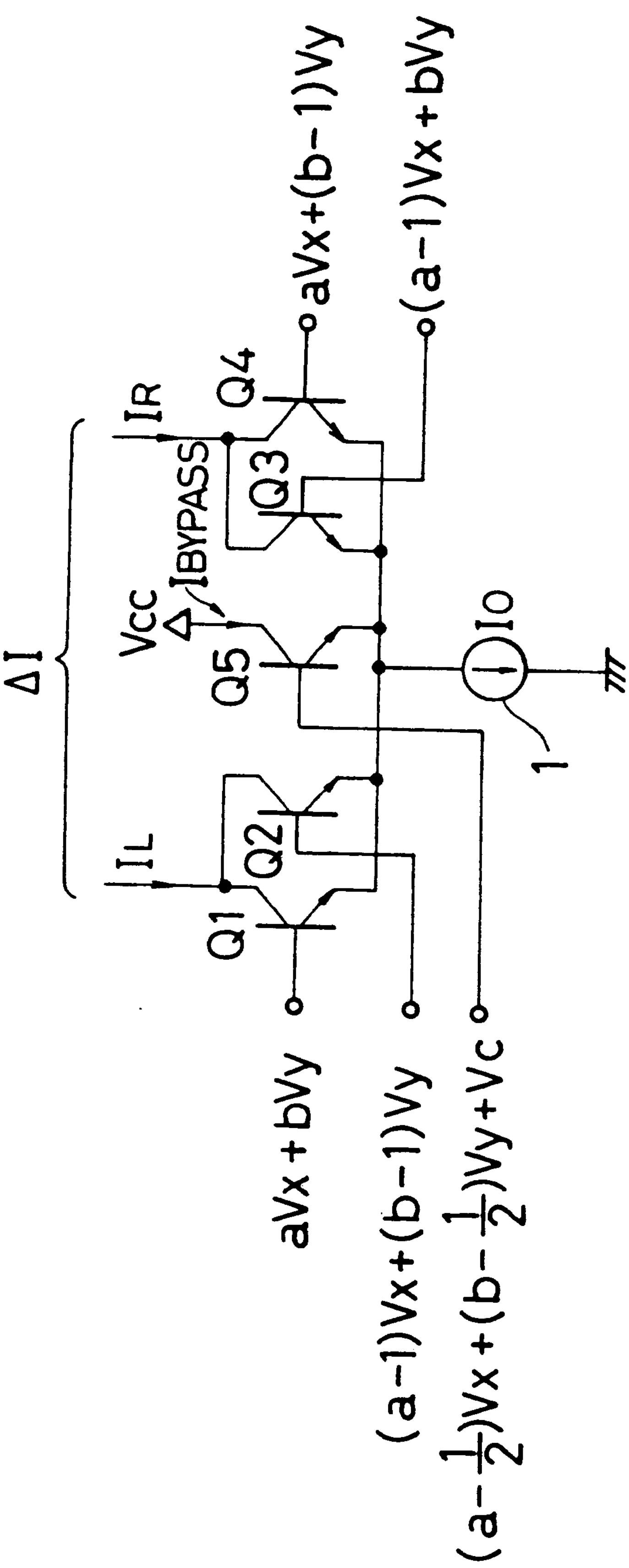
FIG. 7 is a circuit diagram of a bipolar multiplier according to a first embodiment of the present invention.

A four-quadrant bipolar multiplier according to a first embodiment of the present invention is shown in FIG. 7.

As shown in FIG. 7, this multiplier has a multitail cell made of a first transistor pair of npn-type bipolar transistors Q1 and Q2, a second transistor pair of npn-type bipolar transistors Q3 and Q4, and an npn-type bipolar transistor Q5. The transistors Q1, Q2, Q3, Q4 and Q5 have the same emitter area. This multiplier is of a symmetrical input type.

Here, the multitail cell includes five transistors Q1, Q2, Q3, Q4 and Q5 and therefore, it may be termed a "quint-tail cell".

Emitters of the transistors Q1, Q2, Q3, Q4 and Q5 are coupled together to be connected to one end of a constant current source 1 (current value: $I_0$) The other end of the current source 1 is connected to the ground. The multitail cell is driven by a common tail current Io from the current source 1.

Collectors (or output ends) of the transistors Q1 and Q2 are coupled together to form one of differential output ends of the multiplier. Collectors of the transistors Q3 and Q4 also are coupled together to form the other of the differential output ends of the multiplier.

A differential output current ΔI of this multiplier is defined as $\Delta I = I_L - I_R$, where $I_L$ is an output current of the first transistor pair and $I_R$ is an output current of the second transistor pair.

A collector of the transistor Q5 is applied with a supply voltage $V_{cc}$.

Here, a first initial input signal voltage and a second initial input signal voltage to be multiplied are defined as $V_x$ and $V_y$, respectively.

Bases (or input ends) of the transistors Q1, Q2, Q3 and Q4 are respectively applied with the first, second, third, fourth and fifth input signal voltages $V_1$, $V_2$, $V_3$, $V_4$ and $V_5$ as $V_1=(aV_x+bV_y)$ $V_2=\{(a-1)V_x+(b-V_y\}$, $V_3=\{(a-1)V_x+bV_y\}$, and $V_4=\{aV_x+(b-1)V_y\}$, and $V_5=\{(a-½)V_x+(b-½)V_y+V_C\}$, where a and b are constants and $V_C$ is a positive dc voltage.

Collector currents $I_{ci}$ (i=1 to 5) of these five bipolar transistors Q1, Q2, Q3, Q4 and Q5 are expressed by the following equations (13) to (17), respectively, where $V_E$ is the common emitter voltage.

$$I_{C1} = I_S \exp\left(\frac{aV_x + bV_y + V_R - V_E}{V_T}\right) \quad (13)$$

$$I_{C2} = I_S \exp\left\{\frac{(a-1)V_x + (b-1)V_y + V_R - V_E}{V_T}\right\} \quad (14)$$

$$I_{C3} = I_S \exp\left\{\frac{aV_x + (b-1)V_y + V_R - V_E}{V_T}\right\} \quad (15)$$

$$I_{C4} = I_S \exp\left\{\frac{(a-1)V_x + bV_y + V_R - V_E}{V_T}\right\} \quad (16)$$

$$I_{C5} = I_S \exp\left\{\frac{\left(a-\frac{1}{2}\right)V_x + \left(b-\frac{1}{2}\right)V_y + V_R - V_E + V_C}{V_T}\right\} \quad (17)$$

From the relationship of the tail current $I_0$ and the collector currents $I_{ci}$, the following equation (18) is obtained.

$$I_{C1}+I_{C2}+I_{C3}+I_{C4}+I_{C5}=\alpha_F I_0 \quad (18)$$

By solving the equation (13) to (17), the differential output current ΔI of the bipolar multiplier can be expressed as the following equation (19), where $K=\exp(V_c/V_T)$.

$$\Delta I = \frac{\alpha_F I_0 \sinh\left(\frac{V_x}{2V_T}\right)\sinh\left(\frac{V_y}{2V_T}\right)}{\cosh\left(\frac{V_x}{2V_T}\right)\cosh\left(\frac{V_y}{2V_T}\right) + K} \quad (19)$$

Since $K=\exp(V_C/V_T)$, the dc voltage $V_C$ is expressed as $V_C=V_T \cdot \ln(K)$. Therefore, to set the dc voltage $V_C$ applied to the base of the transistor Q5 as zero (i.e., $V_c=0$), the transistor Q5 needs to have an emitter area K times as much as those of the transitors Q1, Q2, Q3 and Q4.

Figure 7A:
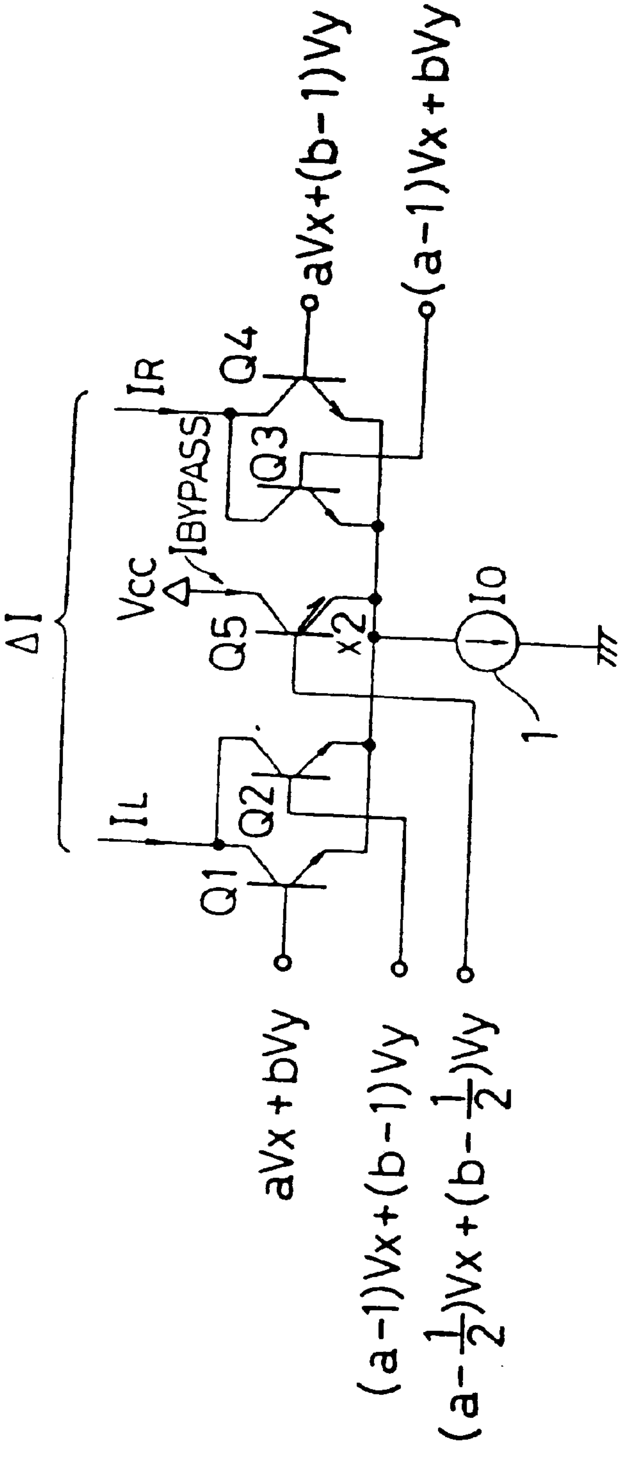
FIG. 7A is a circuit diagram of a bipolar multiplier showing a modified example of the first embodiment of the present invention.

If no ripples should be produced independently of the value of $V_y$, it is preferred that the value of K is set as 2, because the maximum flatness is provided at $V_x=0$ when $V_y=0$. This means that when the transistor Q5 has an emitter area twice as much as those of the transitors Q1, Q2, Q3 and Q4, the voltage $V_C$ can be set as zero, which is shown in FIG. 7A.

Figure 8:
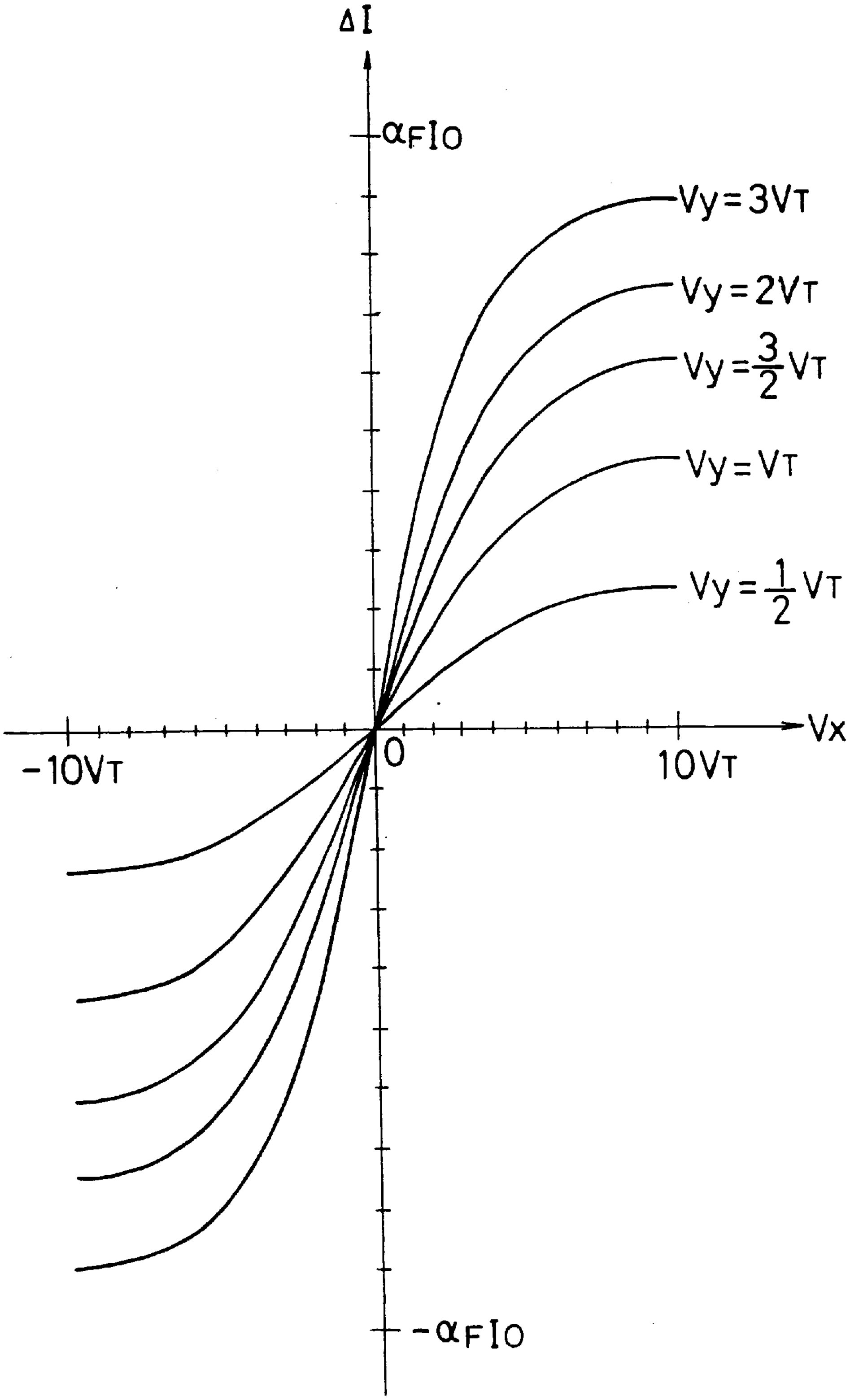
FIG. 8 is a graph showing the transfer characteristic of the multiplier according to the first embodiment.

FIG. 8 shows a transfer (input/output) characteristic of the multiplier when K=2.

The transconductance characteristic can be expressed by the following equation (20), which is obtained by differentiating the ΔI by $V_x$.

$$\frac{d(\Delta I)}{dV_X} = \frac{\alpha_V I_0}{2V_T}\left[\frac{\left\{K\cosh\left(\frac{V_x}{2V_T}\right) + \cosh\left(\frac{V_y}{2V_T}\right)\right\}\sinh\left(\frac{V_y}{2V_T}\right)}{\left\{\cosh\left(\frac{V_x}{2V_T}\right)\cosh\left(\frac{V_y}{2V_T}\right) + K\right\}}\right] \quad (20)$$

Figure 9:
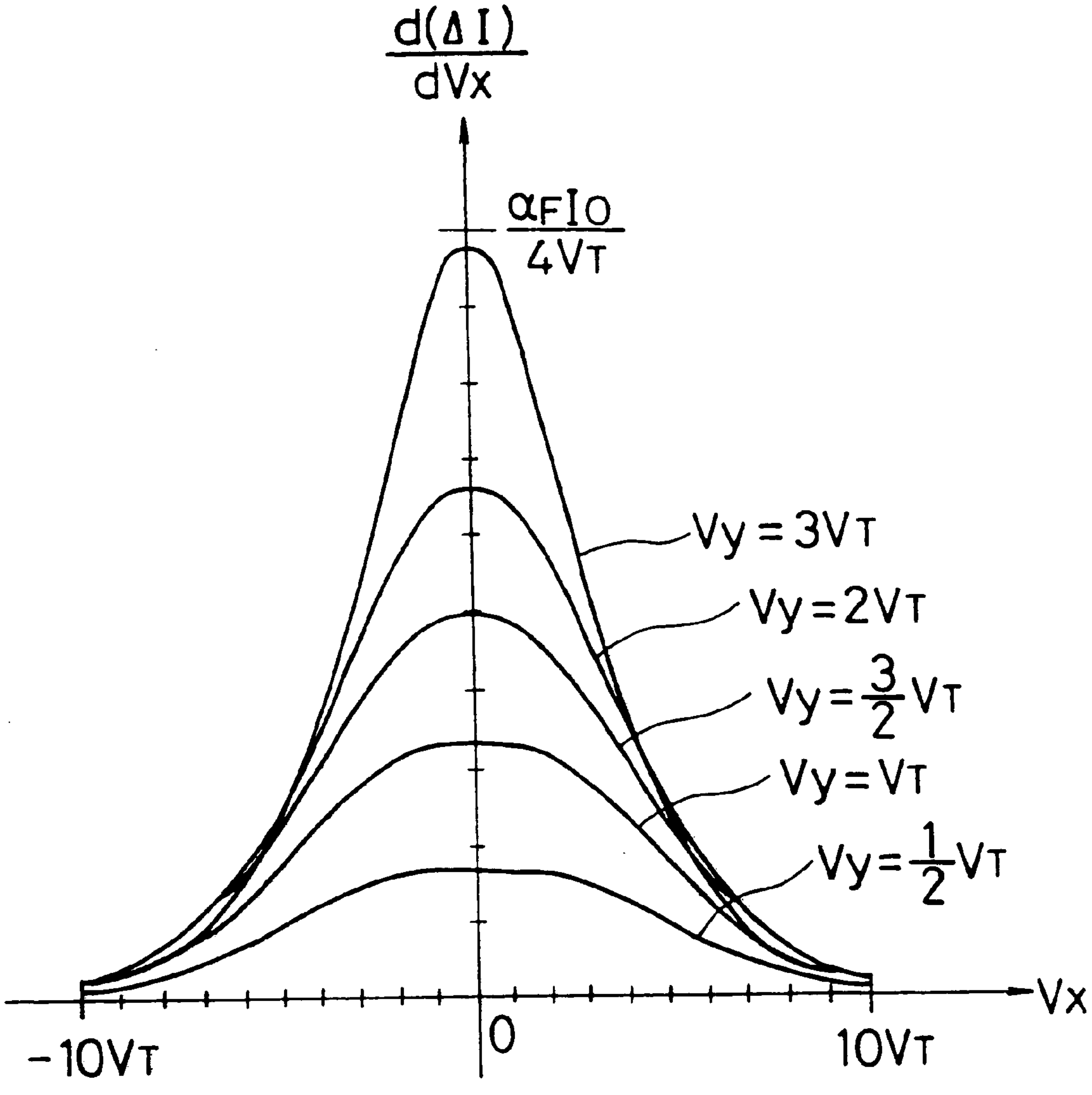
FIG. 9 is a graph showing the transconductance characteristic of the multiplier according to the first embodiment.

FIG. 9 shows the calculated values of the transconductance characteristic when K=2. In this case, the collector current $I_{c5}$ bypassed for linearization can be expressed by the following equation (21) as $$I_{BYPASS} = I_{C5} \quad (21)$$

-continued $$= \frac{K\alpha_F I_0}{\cosh\left(\frac{V_x}{2V_T}\right)\cosh\left(\frac{V_y}{2V_T}\right) + K}$$

Figure 10:
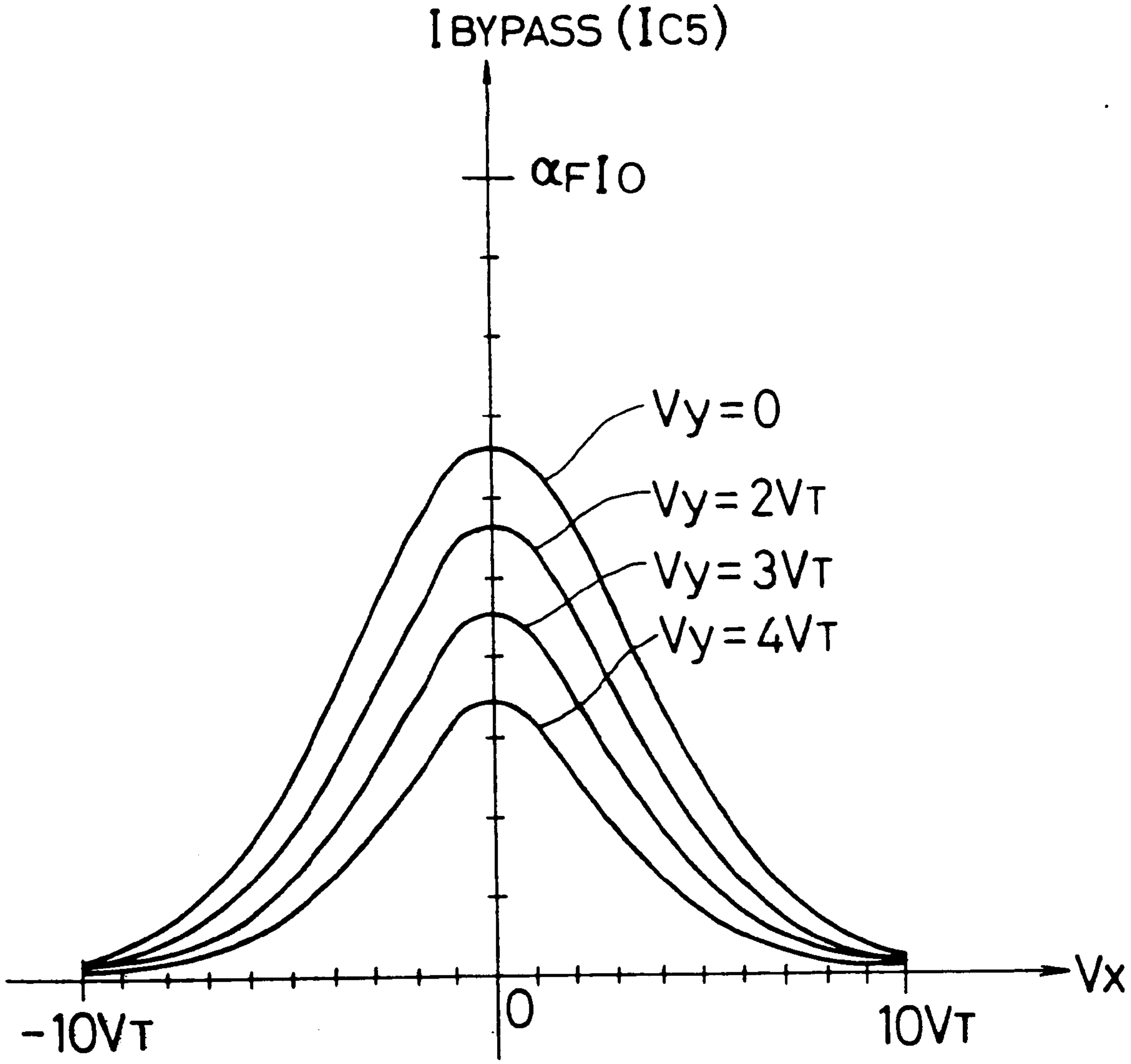
FIG. 10 is graph showing the bypass current characteristic of the multiplier according to the first embodiment.

FIG. 10 shows a characteristic of the current $I_{BYPASS}$ bypassed by the transistor Q5 in the multitail cell. In this case, the transconductance characteristic of $I_{BYPASS}$ can be expressed by the following equation (22) as $$\frac{d\,I_{BYPASS}}{d\,V_X} = -\frac{K\alpha_F I_0}{2V_T}\frac{\sinh\left(\frac{V_x}{2V_T}\right)}{\left\{\cosh\left(\frac{V_y}{2V_T}\right)\cosh\left(\frac{V_x}{2V_T}\right) + K\right\}^2} \tag{22}$$

Figure 1:
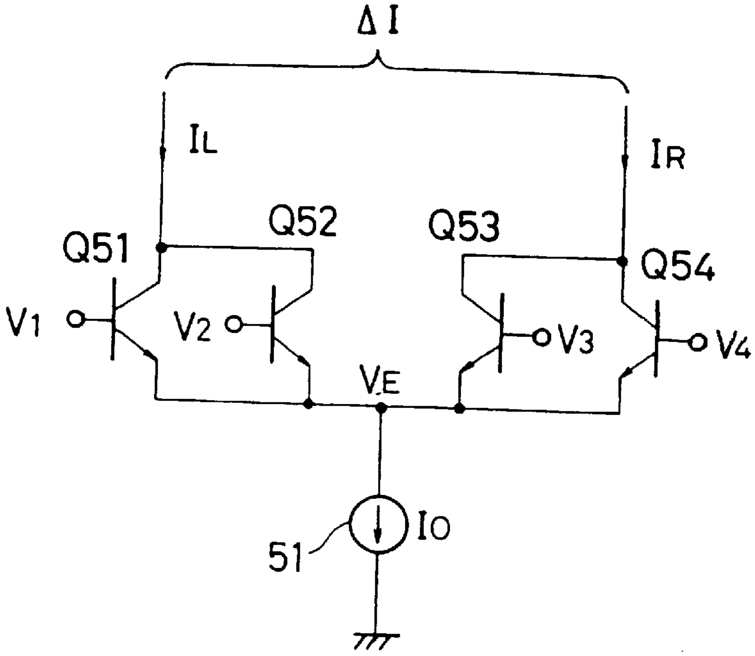
FIG.1 PRIOR ART
FIG. 1 is a circuit diagram showing a basic or typical configuration of a conventional bipolar multiplier.
Figure 2:
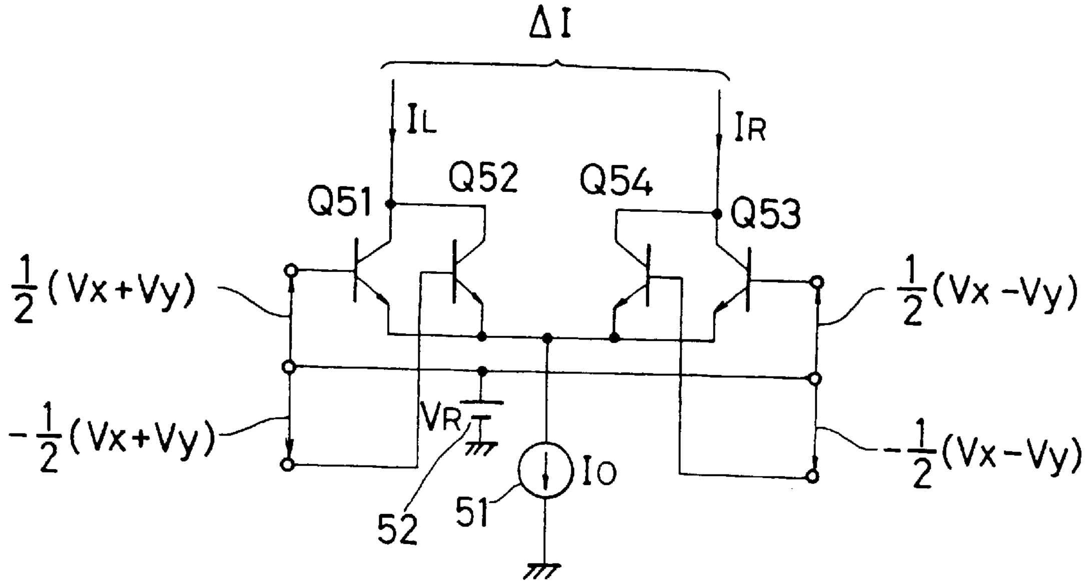
FIG.2 PRIOR ART
FIG. 2 is a circuit diagram showing a first example of the conventional bipolar multiplier of FIG. 1.
Figure 3:
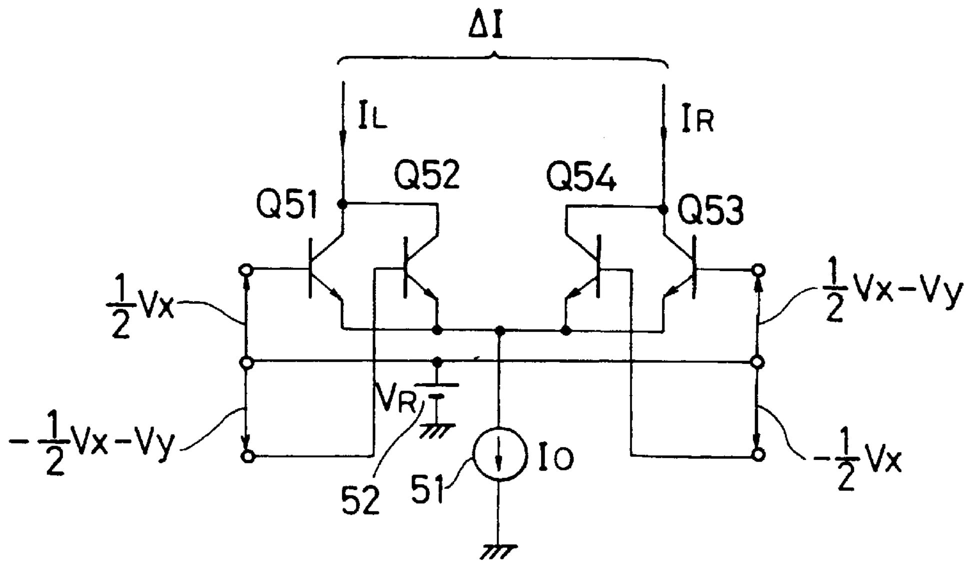
FIG.3 PRIOR ART
FIG. 3 is a circuit diagram showing a second example of the conventional bipolar multiplier of FIG. 1.
Figure 4:
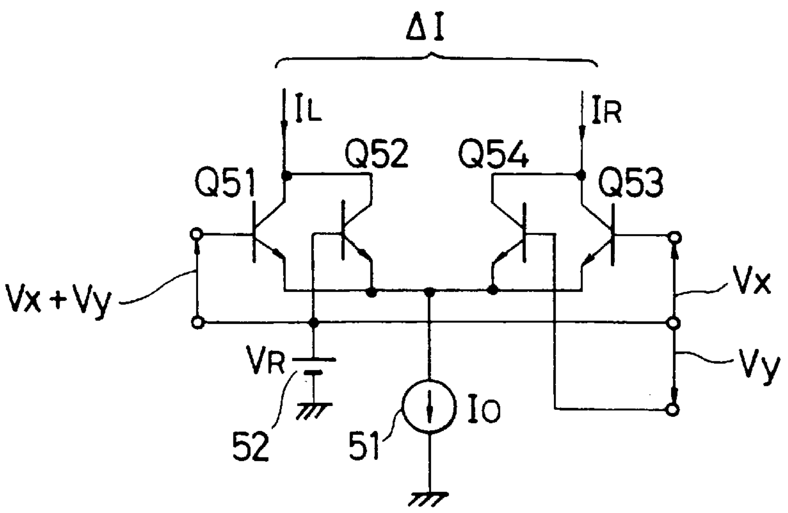
FIG.4 PRIOR ART
FIG. 4 is a circuit diagram showing a third example of the conventional bipolar multiplier of FIG. 1.
Figure 5:
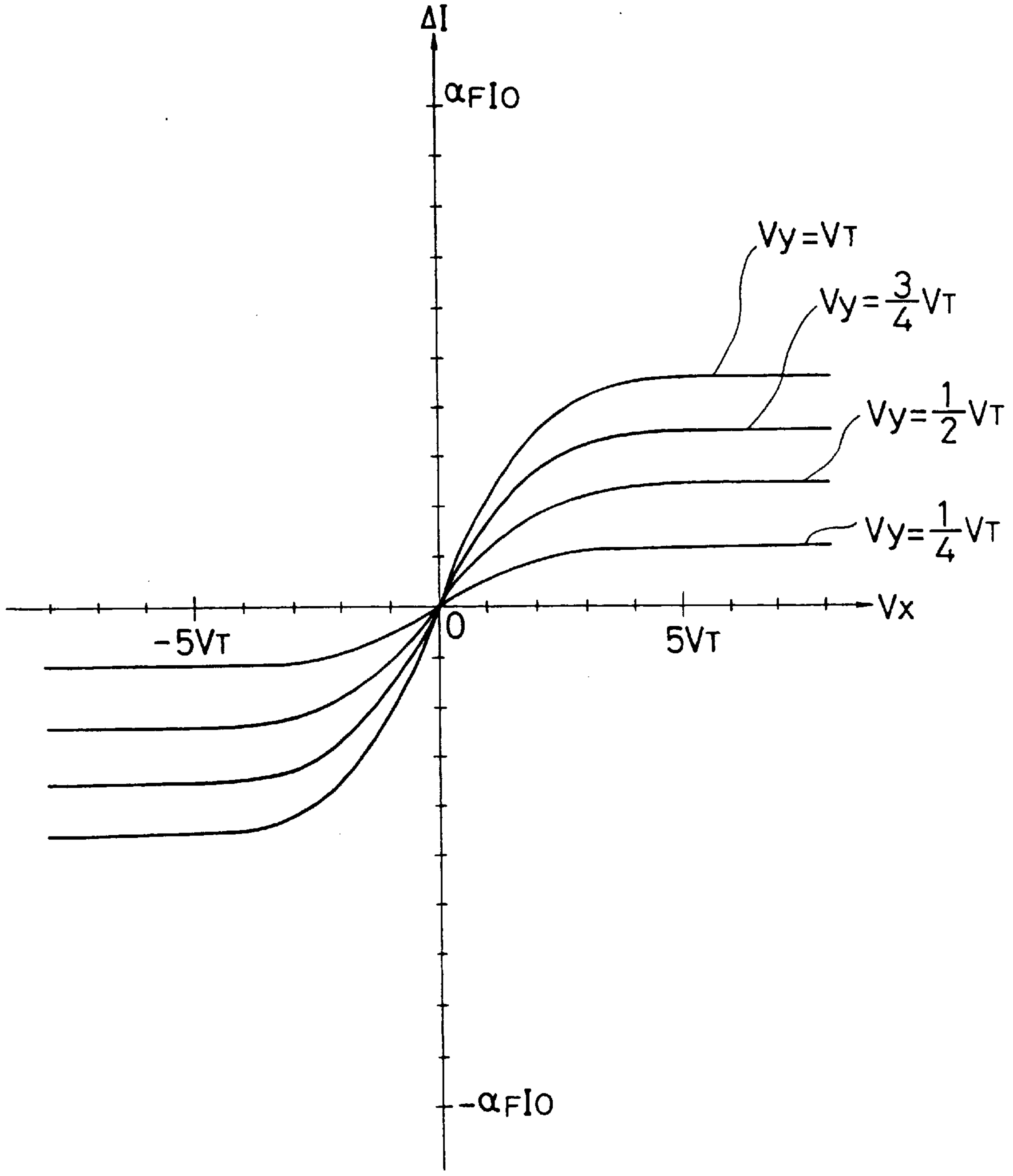
FIG.5 PRIOR ART
FIG. 5 is a graph showing the transfer characteristic of the first, second and third concrete examples of FIGS. 2, 3 and 4.
Figure 6:
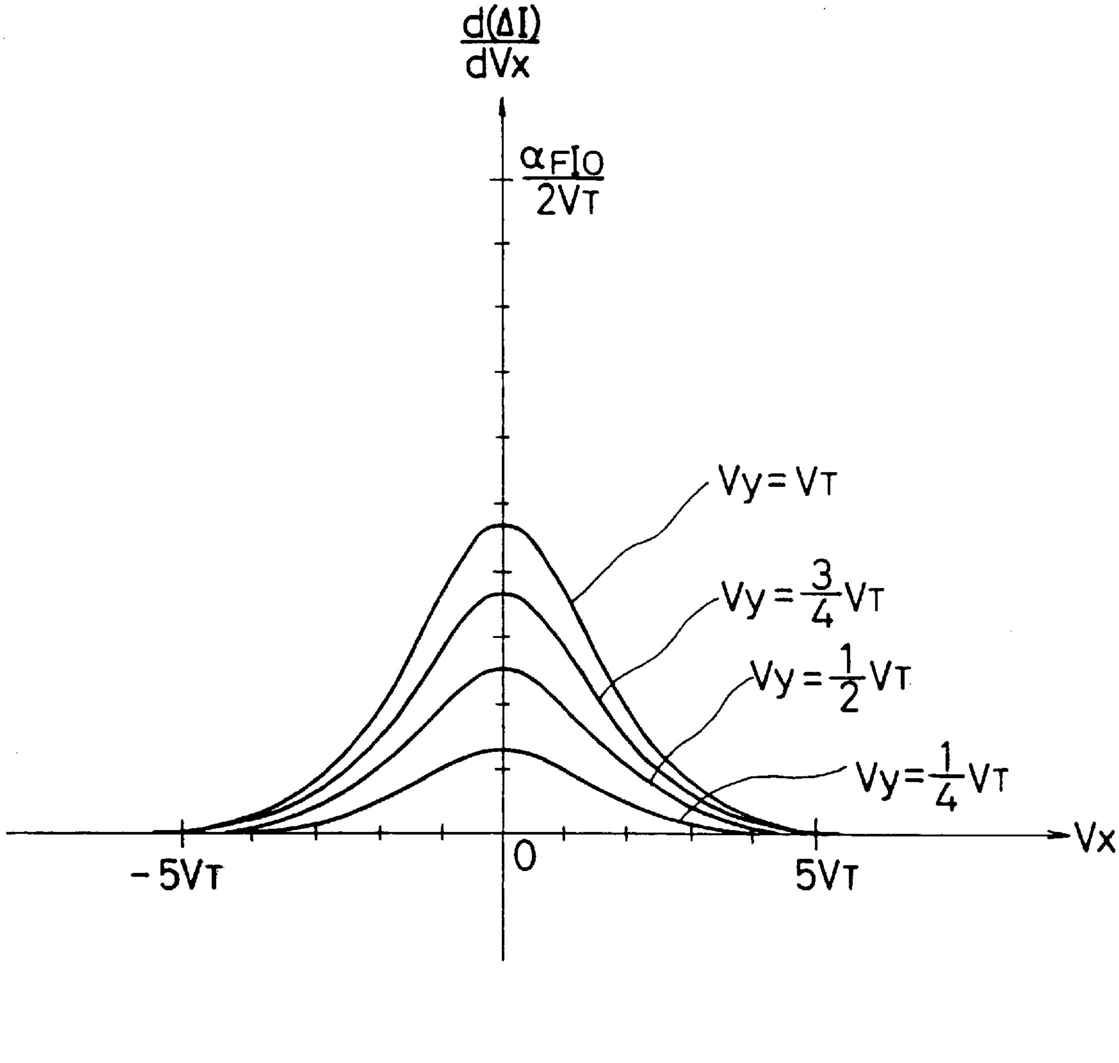
FIG.6 PRIOR ART
FIG. 6 is a graph showing the transconductance characteristic of the first, second and third concrete examples of FIGS. 2, 3 and 4.

It is seen from FIGS. 9 and 6 that the bipolar multiplier according to the first embodiment has the wider input voltage ranges providing a good linearity than those of the conventional multipliers of FIGS. 2, 3 and 4.

It is needless to say that the bipolar multiplier according to the first embodiment can operate at a low voltage such as 1 V.

SECOND EMBODIMENT

Figure 11:
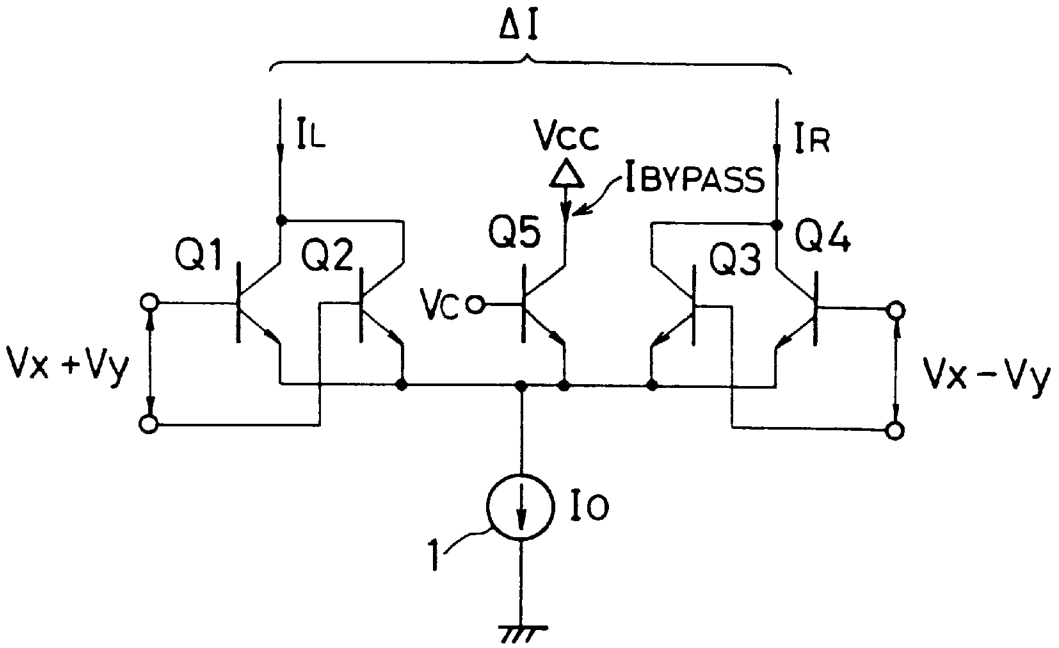
FIG. 11 is a circuit diagram of a bipolar multiplier according to a second embodiment of the present invention.

FIG. 11 shows a four-quadrant bipolar multiplier according to a second embodiment of the present invention.

This multiplier is obtained by setting the constants a and b at a=b=(½) in the multiplier according to the first embodiment. In the second embodiment, the input signal voltage $V_5$ applied to the base of the transistor Q5 is only the dc voltage $V_C$. This leads to an additional advantage of simplified production of the voltage $V_5$.

THIRD EMBODIMENT

Figure 12:
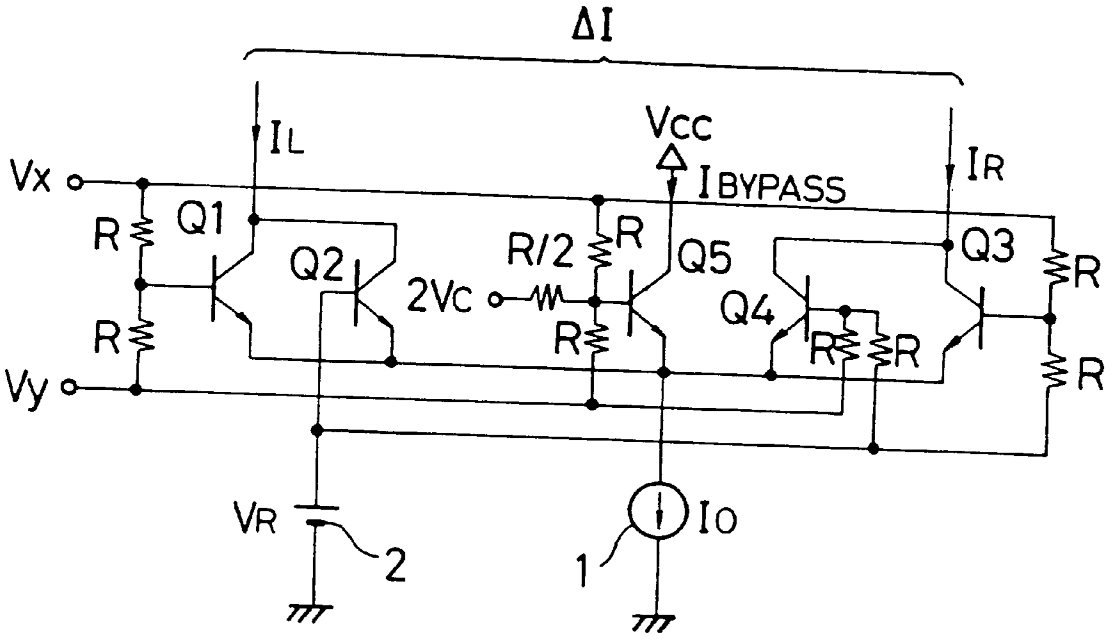
FIG. 12 is a circuit diagram of a bipolar multiplier according to a third embodiment of the present invention.

FIG. 12 shows a four-quadrant bipolar multiplier according to a third embodiment of the present invention.

This multiplier is obtained by setting the constants a and b to satisfy the relationships of (a−1)≧0 and (b−1)≧0 in the multiplier according to the first embodiment. In this case, the input signal voltages $V_1$, $V_2$, $V_3$, $V_4$ and $V_5$ applied to the bases of the transistors Q1, Q2, Q3, Q4 and Q5 can be all expressed by the sum of the first and second initial input signal voltages $V_x$ and $V_y$. In Other words, these voltages $V_1$, $V_2$, $V_3$, $V_4$ and $V_5$ involve only addition and no subtraction. Therefore, the voltages $V_1$, $V_2$, $V_3$, $V_4$ and $V_5$ can be easily realized by resistive dividers.

FIG. 12 shows the simplest structure of the voltage dividing technique using resistors, in which each of the voltages $V_1$, $V_2$, $V_3$, $V_4$ and $V_5$ is obtained by dividing the sum of the voltage $V_x$ and $V_y$ into two by resistors with the same resistance value R.

Figure 13:
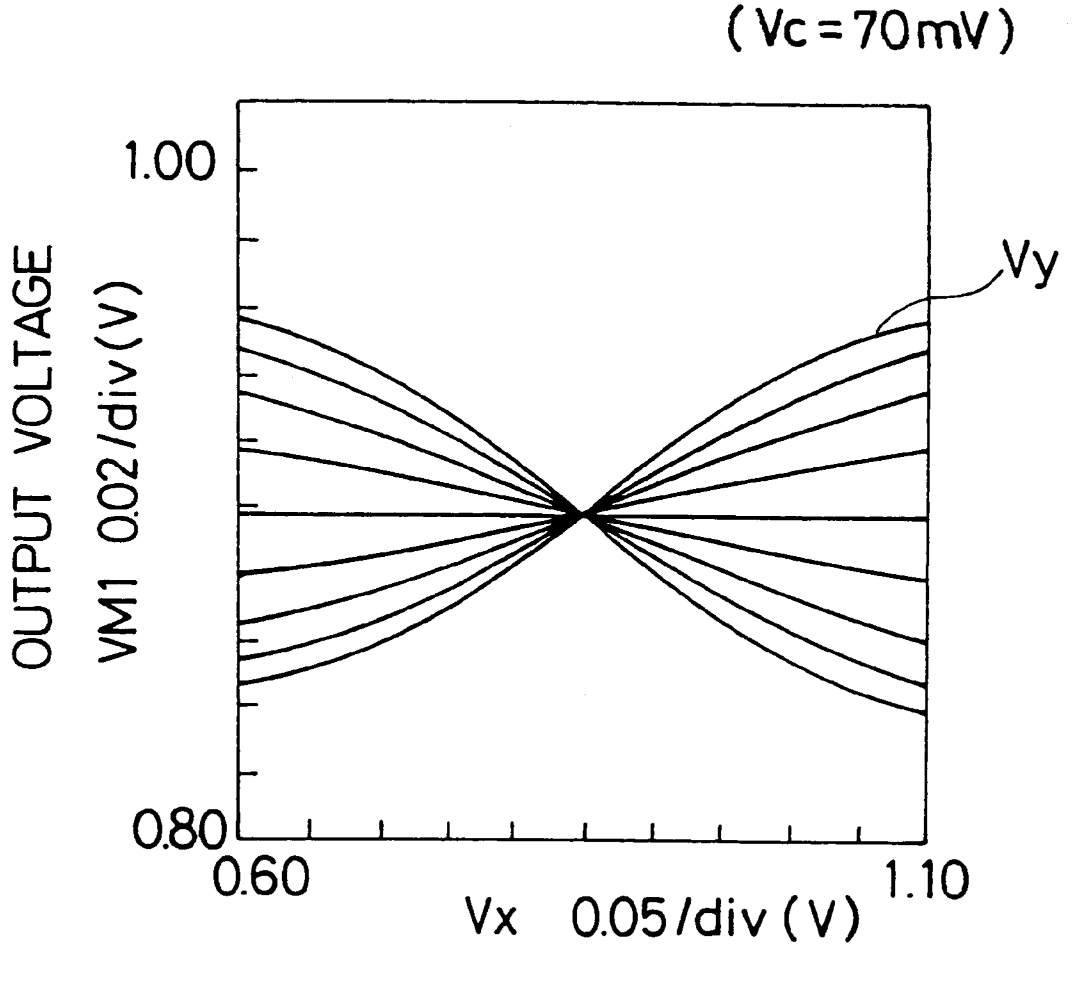
FIG. 13 is a graph showing an example of actual measurements of the transfer characteristic of the bipolar multiplier according to the third embodiment.

FIG. 13 shows the actual measurements for the multiplier of FIG. 12 that were obtained with the second initial input signal voltage $V_y$ being changed as a parameter in increments and decrements of 50 mV from 0 V when $V_C$=70 mV.

It is seen from FIG. 13 that this multiplier provides unsatisfactorily enlarged input voltage ranges because the linearity of this four-quadrant analog multiplier is slightly unsatisfactory. However, if the linearity is better than that of the Gilbert cell, it is often a more realistic advantage that a four-quadrant analog multiplier can be realized at a small circuit scale.

FOURTH EMBODIMENT

Figure 14:
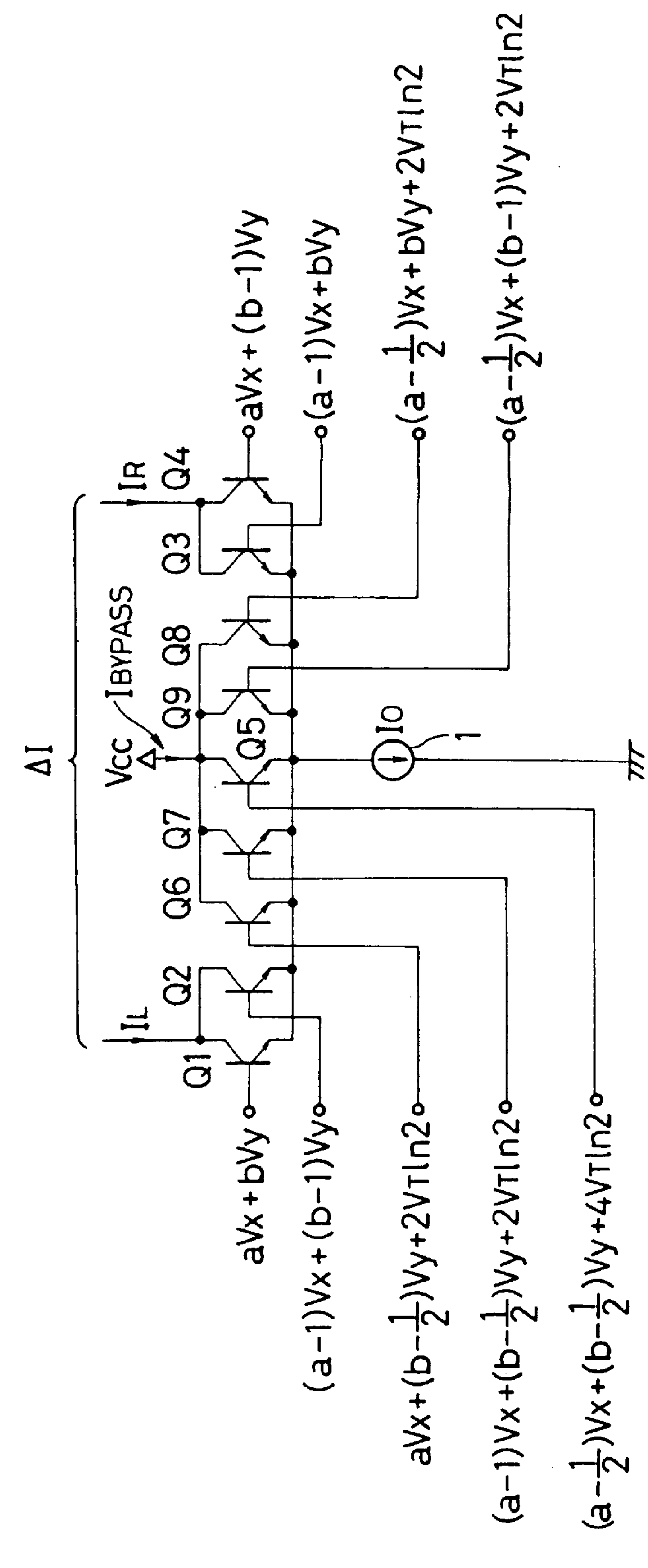
FIG. 14 is a circuit diagram of a bipolar multiplier according to a fourth embodiment of the present invention.

FIG. 14 shows a four-quadrant bipolar multiplier according to a fourth embodiment of the present invention.

As shown in FIG. 14, this multiplier is equivalent to one composed of the multiplier according to the first aspect and newly added npn-type bipolar transistors Q6, Q7, Q8 and Q9. The transistors Q6 and Q7 form a third transistor pair, and the transistors Q8 and Q9 form a fourth transistor pair.

The transistors Q6, Q7, Q8 and Q9 have the same emitter area as that of the transistors Q1, Q2, Q3, Q4 and Q5. This multiplier is of a symmetrical input type.

Emitters of the transistors Q6, Q7, Q8 and Q9 are coupled together to be connected to one end of the constant current source 1 (current value: $I_0$). The multitail cell is driven by a common tail current $I_0$ from the current source 1.

Collectors (or output ends) of the transistors Q6 and Q7 are connected in common to the collector of the transistor Q5. Collectors of the transistors Q8 and Q9 also are connected in common to the collector of the transistor Q5.

Here, the multitail cell in this multiplier includes nine transistors Q1, Q2, Q3, Q4, Q5, Q6, Q7, Q8 and Q9 and therefore, it may be termed a "nonuple-tail cell".

Bases (or input ends) of the transistors Q1, Q2, Q3 and Q4 are respectively applied with the same input signal voltages $V_1$, $V_2$, $V_3$ and $V_4$ as those in the first embodiment.

The dc voltage $V_C$ applied to the transistor Q5 is set as ($4V_T \cdot \ln2$) and therefore, the input signal voltage $V_5$ applied to the transistor Q5 is $(\{a-(½)\}V_x+\{b-(½)\}V_y+4V_T\cdot\ln2)$.

The input signal voltages $V_6$, $V_7$, $V_8$ and $V_9$ applied respectively to the transistors Q6, Q7, Q8 and Q9 are $V_6=(aV_x+\{b-(½)\}V_y+2V_T\cdot\ln2)$, $V_7=((a-1)V_x+\{b-(½)\}V_y+2V_T\cdot\ln2)$, $V_8=(\{a-(½)\}V_x+bV_y+2V_T\cdot\ln2)$, and $V_9=(\{a-(½)\}V_x+(b-1)V_y+2V_T\cdot\ln2)$, respectively.

Collector currents $I_{ci}$ (i=1 to 9) of these nine bipolar transistors Q1, Q2, Q3, Q4, Q5, Q6, Q7, Q8 and Q9 are expressed by the following equations (23) to (31), respectively, where $V_E$ is the common emitter voltage.

$$I_{C1} = I_S\exp\left(\frac{aV_x + bV_y + V_R - V_E}{V_T}\right) \tag{23}$$

$$I_{C2} = I_S\exp\left\{\frac{(a-1)V_x + (b-1)V_y + V_R - V_E}{V_T}\right\} \tag{24}$$

$$I_{C3} = I_S\exp\left\{\frac{aV_x + (b-1)V_y + V_R - V_E}{V_T}\right\} \tag{25}$$

$$I_{C4} = I_S\exp\left\{\frac{(a-1)V_x + bV_y + V_R - V_E}{V_T}\right\} \tag{26}$$

$$I_{C5} = I_S\exp\left\{\frac{\left(a-\frac{1}{2}\right)V_x + \left(b-\frac{1}{2}\right)V_y + V_R - V_E + 4V_T\ln2}{V_T}\right\} \tag{27}$$

$$I_{C6} = I_S\exp\left\{\frac{aV_x + \left(b-\frac{1}{2}\right)V_y + V_R - V_E + 2V_T\ln2}{V_T}\right\} \tag{28}$$

$$I_{C7} = I_S\exp\left\{\frac{(a-1)V_x + \left(b-\frac{1}{2}\right)V_y + V_R - V_E + 2V_T\ln2}{V_T}\right\} \tag{29}$$

-continued $$I_{C8} = I_S\exp\left\{\frac{\left(a-\frac{1}{2}\right)V_x + bV_y + V_R - V_E + 2V_T\ln 2}{V_T}\right\} \quad (30)$$

$$I_{C9} = I_S\exp\left\{\frac{\left(a-\frac{1}{2}\right)V_x + (b-1)V_y + V_R - V_E + 2V_T\ln 2}{V_T}\right\} \quad (31)$$

The relationship of the tail current $I_0$ with the collector currents $I_{ci}$ provides the following equation (32) as $$I_{C1}+I_{C2}+I_{C3}+I_{C4}+I_{C5}+I_{C6}+I_{C7}+I_{C8}+I_{C9}=\alpha_F I_0 \quad (32)$$

By solving the equation (23) to (32), the following equation (33) can be obtained, which represents the differential output current ΔI of the bipolar multiplier.

$$\Delta I = (I_{C1} + I_{C2}) - (I_{C3} + I_{C4}) = \frac{\alpha_F I_0 \sinh\left(\frac{V_x}{2V_T}\right)\sinh\left(\frac{V_y}{2V_T}\right)}{\left\{\cosh\left(\frac{V_x}{2V_T}\right)+2\right\}\left\{\cosh\left(\frac{V_y}{2V_T}\right)+2\right\}} \quad (33)$$

Figure 15:
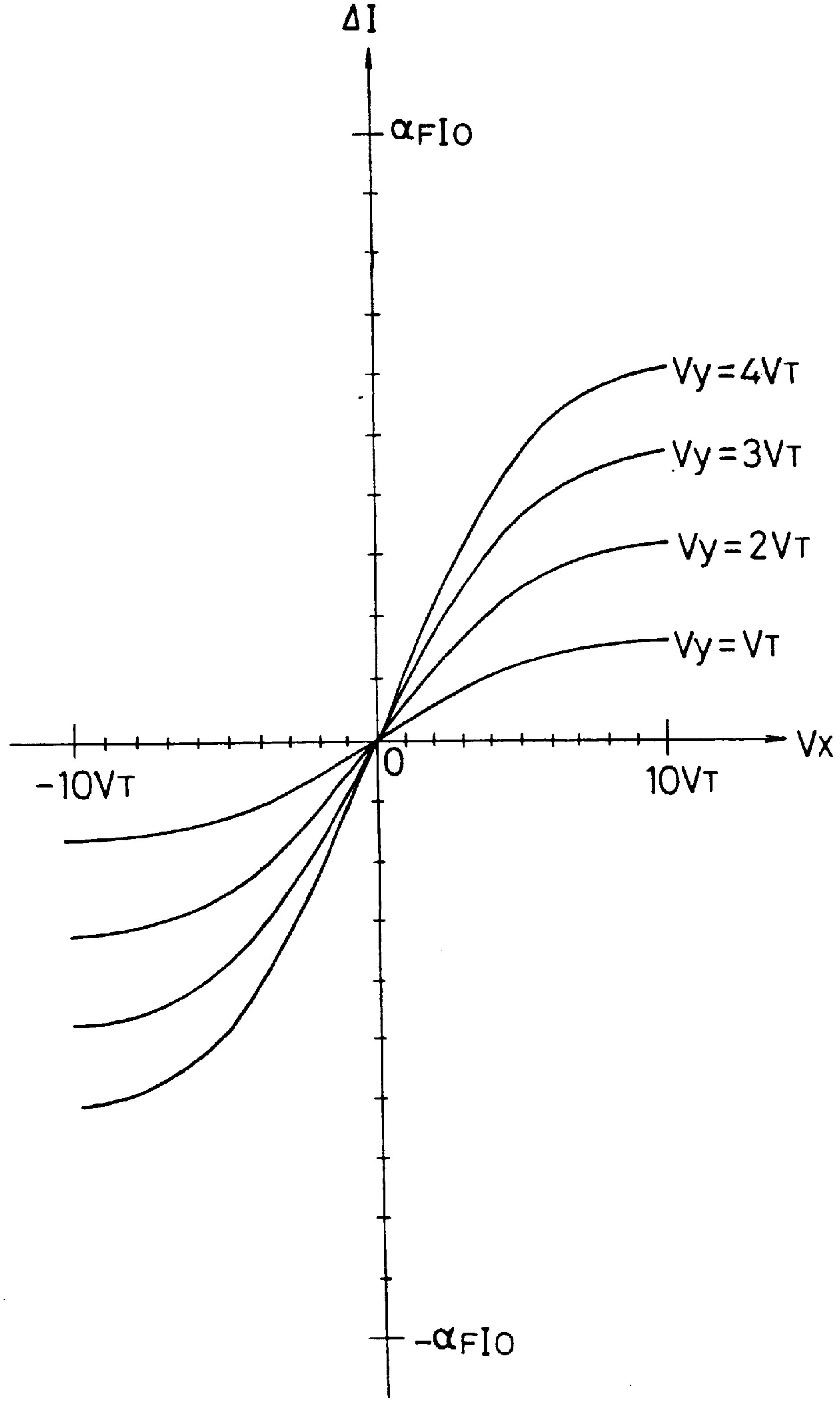
FIG. 15 is a graph showing the transfer characteristic of the multiplier according to the fourth embodiment.

FIG. 15 shows the transfer characteristic of the multiplier according to the fourth embodiment, which is obtained from the equation (33).

The transconductance characteristic of this multiplier can be expressed by the following equation (34) as $$\frac{d(\Delta I)}{dV_X} = \frac{\alpha_V I_0}{2V_T}\left[\frac{\left\{2\cosh\left(\frac{V_x}{2V_T}\right)+1\right\}\sinh\left(\frac{V_y}{2V_T}\right)}{\left\{\cosh\left(\frac{V_x}{2V_T}\right)+2\right\}^2\left\{\cosh\left(\frac{V_y}{2V_T}\right)+2\right\}}\right] \quad (34)$$

Figure 16:
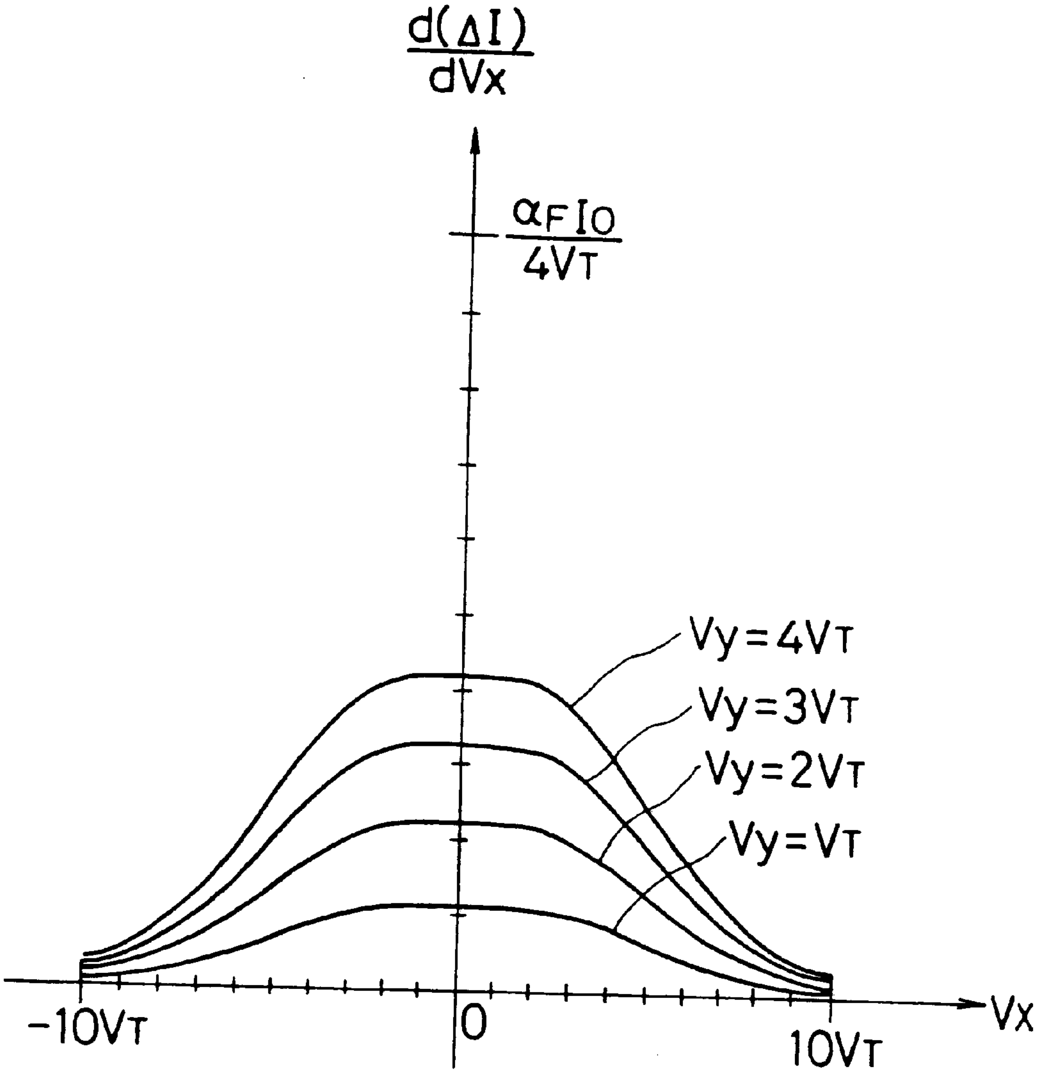
FIG. 16 is a graph showing the transconductance characteristic of the multiplier according to the fourth embodiment.

FIG. 16 shows the transconductance characteristic of this multiplier, which is obtained from the equation (34).

As described above, it can be concluded that the multitail cell as shown in FIG. 14 can realize a four-quadrant bipolar multiplier having a wide linear input voltage range.

In this case, the current $I_{BYPASS}$ bypassed by the five transistors Q5, Q6, Q7, Q8 and Q9 for linearization can be expressed by the following equation (35) as $$I_{BYPASS} = I_{C5} + I_{C6} + I_{C7} + I_{C8} + I_{C9} = \alpha_F I_0\left[1 - \frac{\cosh\left(\frac{V_x}{2V_t}\right)\cosh\left(\frac{V_y}{2V_T}\right)}{\left\{\cosh\left(\frac{V_x}{2V_T}\right)+2\right\}\left\{\cosh\left(\frac{V_y}{2V_T}\right)+2\right\}}\right] \quad (35)$$

Figure 17:
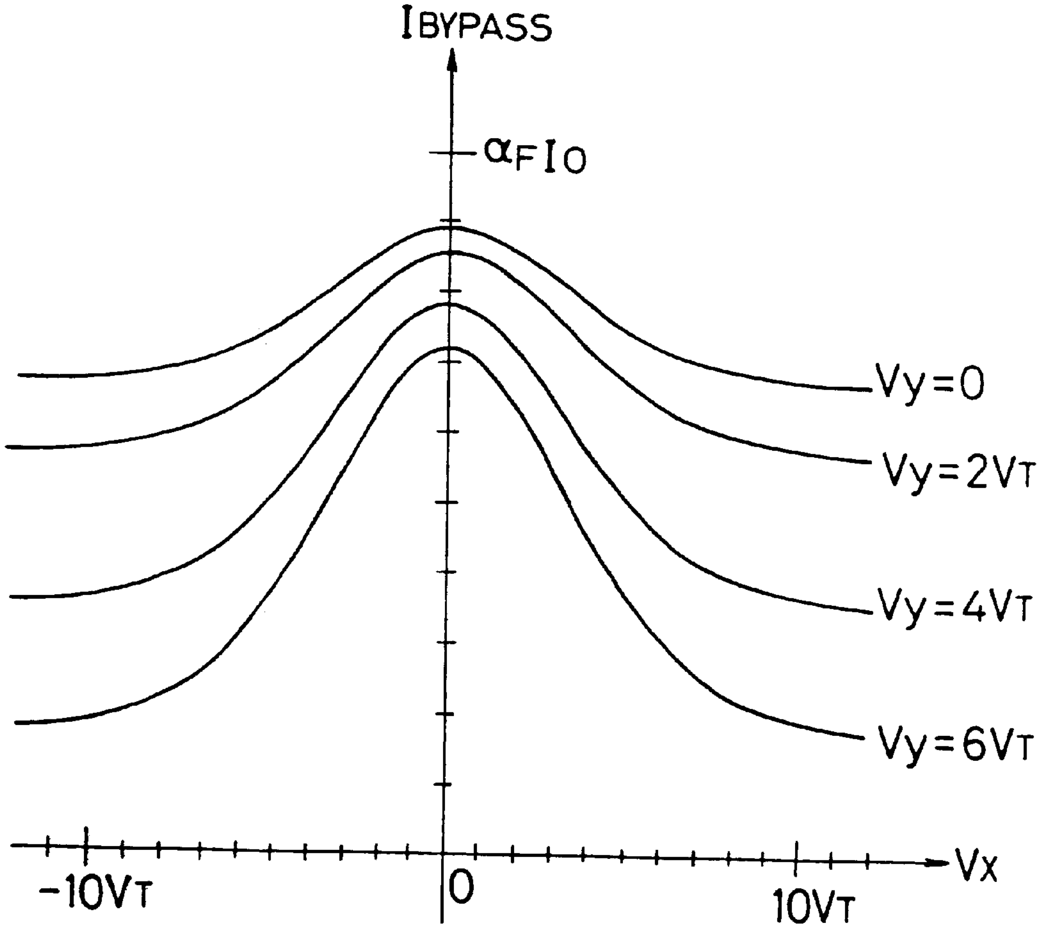
FIG. 17 is graph showing the bypass current characteristic of the multiplier according to the fourth embodiment.

FIG. 17 shows the characteristic of the bypass current $I_{BYPASS}$. The transconductance characteristic of the bypass current $I_{BYPASS}$ can be expressed by the following equation (36) as $$\frac{dI_{BYPASS}}{dV_X} = -\frac{\alpha_V I_0}{2V_T}\left[\frac{\cosh\left(\frac{V_x}{2V_T}\right)\cosh\left(\frac{V_y}{2V_T}\right)}{\left\{\cosh\left(\frac{V_y}{2V_T}\right)+2\right\}\left\{\cosh\left(\frac{V_x}{2V_T}\right)+2\right\}^2}\right] \quad (36)$$

Additionally, the last component including "$V_T$•ln2" in the parentheses of the exponential term in each of the above equations (27), (28), (29), (30), and (31) can be taken out from the parentheses. The last components thus taken out have coefficients of 16, 4, 4, 4, and 4, respectivley.

It is seen from this fact that the configuration where the emitter areas of the transistors Q5, Q6, Q7, Q8 and Q9 have a ratio of 16:4:4:4:4 with respect to the emitter areas of the transistors Q1, Q2, Q3 and Q4 is equivalent the configuration where the transistors Q5, Q6, Q7, Q8 and Q9 have the same emitter area as those of the transistors Q1, Q2, Q3 and Q4 and at the same time, the dc voltages applied to the bases of the transistors Q5, Q6, Q7, Q8 and Q9 are set as $4V_T\ln 2$, $2V_T\ln 2$, $2V_T\ln 2$, $2V_T\ln 2$, and $2V_T\ln 2$, respectively.

Figure 14A:
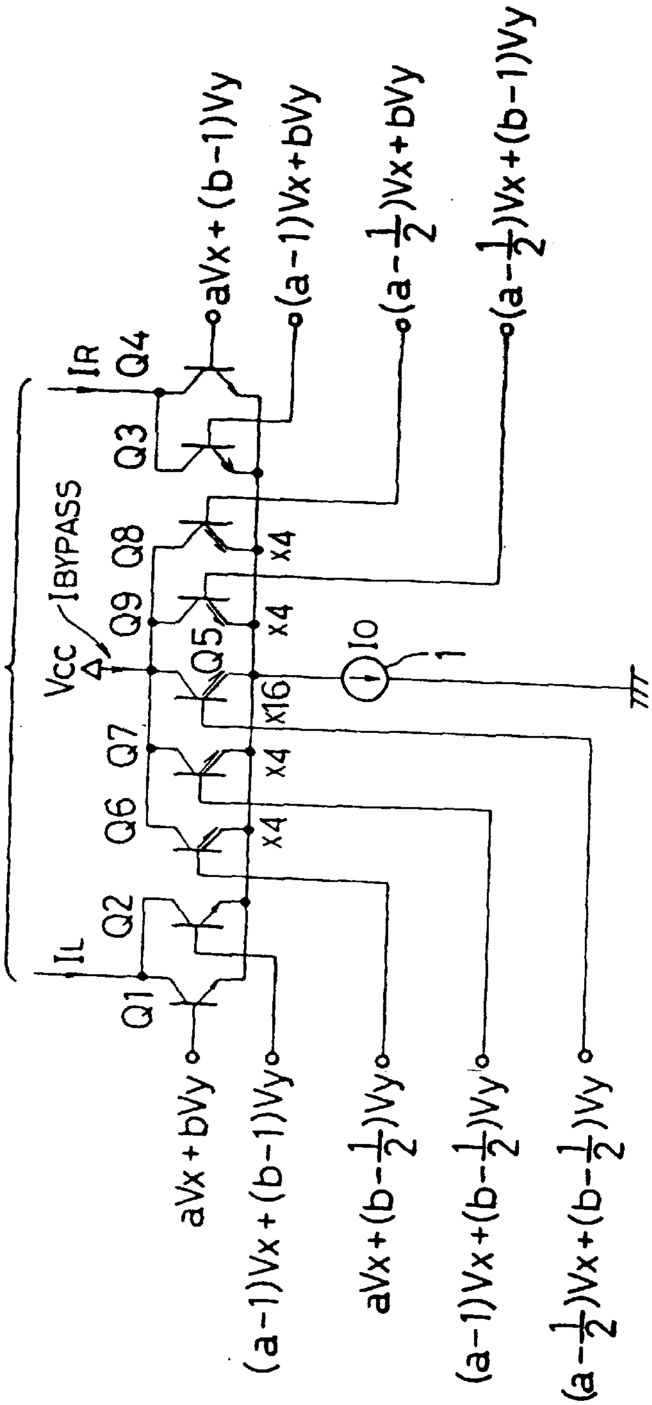
FIG. 14A is a circuit diagram of a bipolar multiplier showing a modified example of the fourth embodiment of the present invention.

The former configuration is shown in FIG. 14 and the latter one is in FIG. 14A.

FIFTH EMBODIMENT

Figure 18:
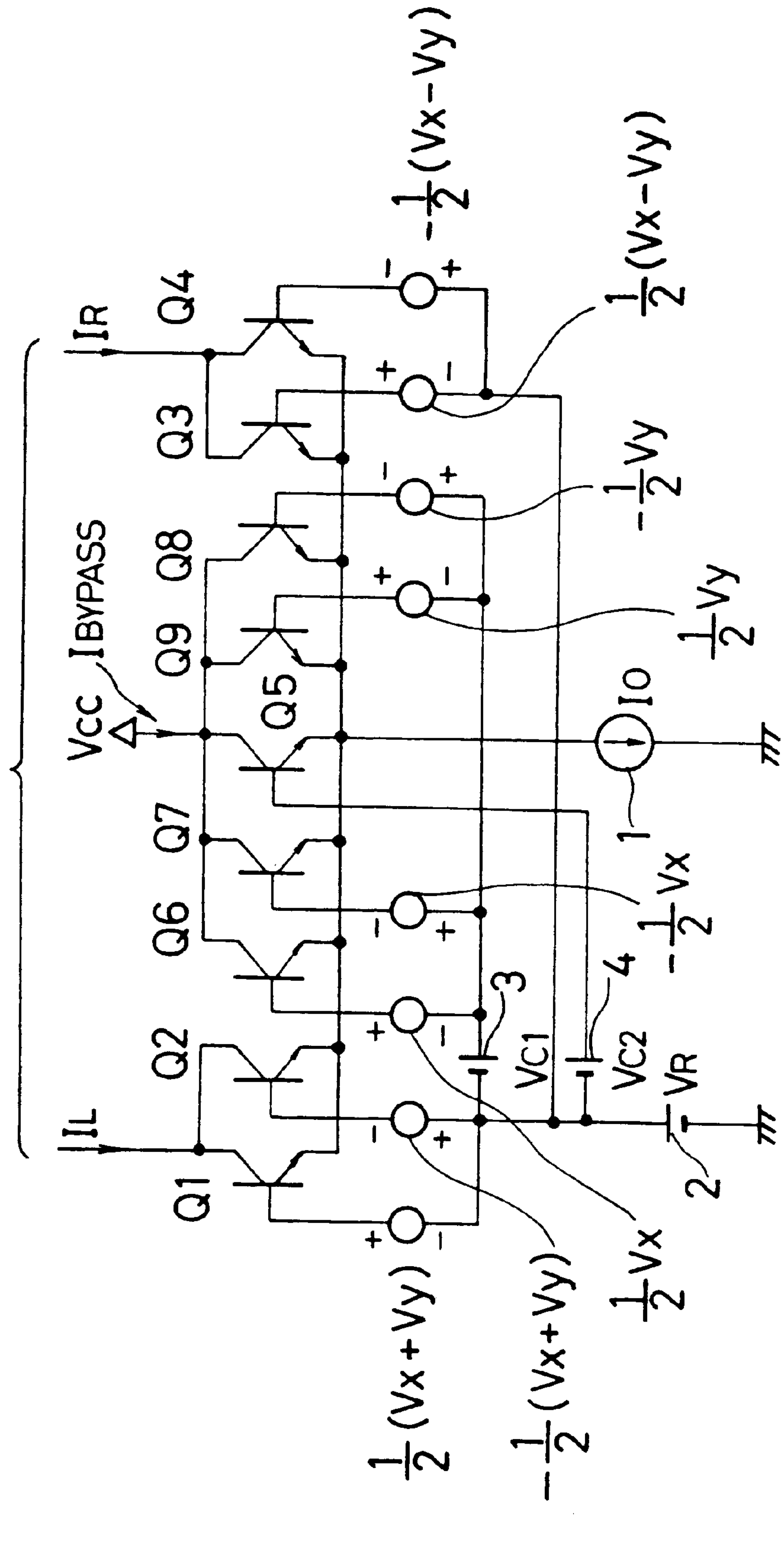
FIG. 18 is a circuit diagram of a bipolar multiplier according to a fifth embodiment of the present invention.

FIG. 18 shows a four-quadrant bipolar multiplier according to a fifth embodiment of the present invention.

This multiplier is obtained by setting the constants a and b as a=b=(½) in the multiplier according to the fourth embodiment. In the fifth embodiment, the input signal voltage $V_5$ applied to the base of the transistor Q5 is only the dc voltage $V_C$. This leads to an additional advantage of simplified production of the voltage $V_5$.

In FIG. 18, the symbol o indicates a signal source, the reference numerals 3 and 4 are positive dc voltage sources whose supply voltages are $V_{c1}$ and $V_{c2}$, respectively, where dc voltages $V_{C1}$ and $V_{C2}$ are set as $V_{C1}=2V_T$•ln2 and $V_{C2}=4V_T$•ln2.

SIXTH EMBODIMENT

Figure 19:
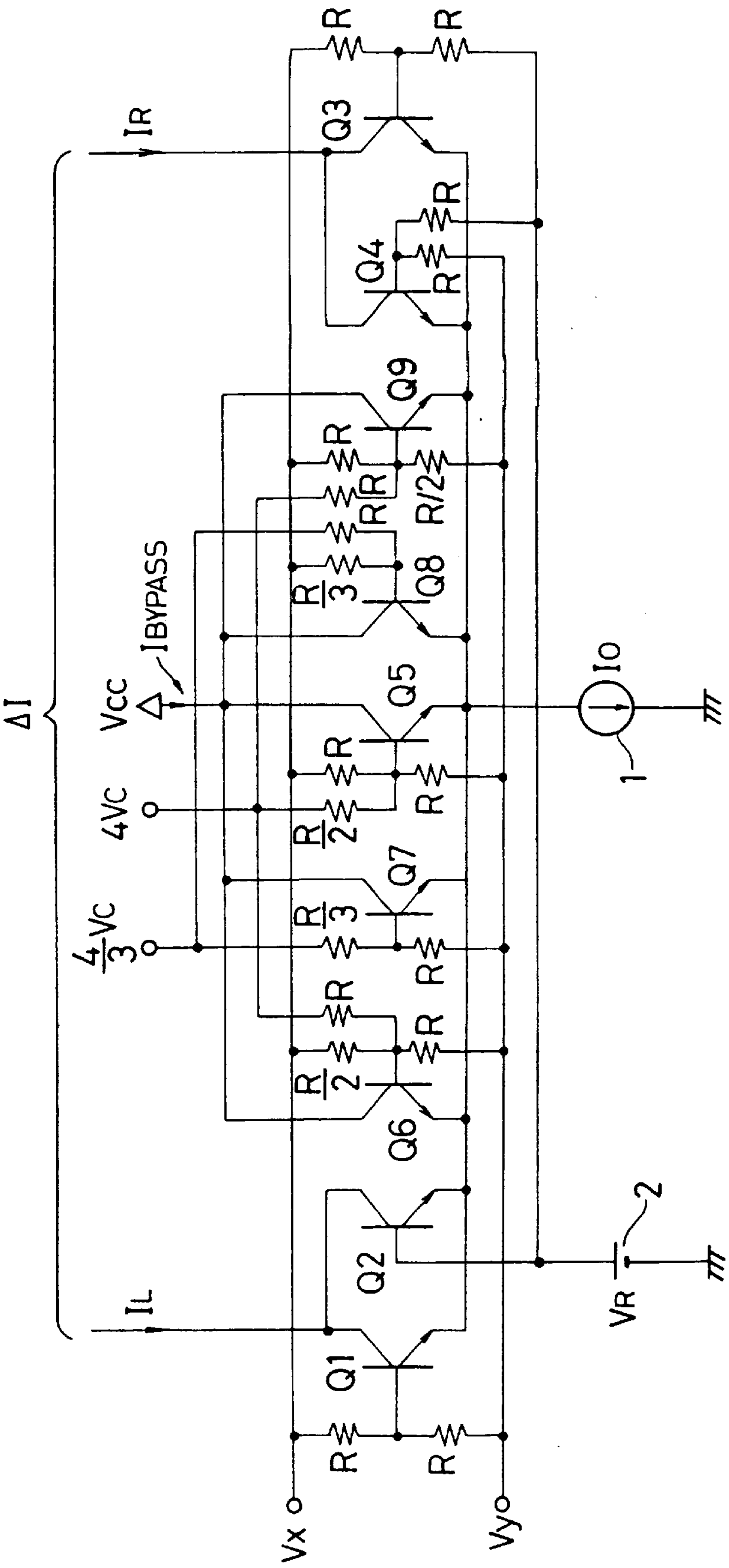
FIG. 19 is a circuit diagram of a bipolar multiplier according to a sixth embodiment of the present invention.

FIG. 19 shows a four-quadrant bipolar multiplier according to a sixth embodiment of the present invention.

This multiplier is obtained by setting the constants a and b to satisfy the relationships of (a−1)≧0 and (b−1)≧0 in the multiplier according to the fourth embodiment. In this case, the input signal voltages $V_1$, $V_2$, $V_3$, $V_4$, $V_5$, $V_6$, $V_7$, $V_8$ and $V_9$ applied to the bases of the transistors Q1, Q2, Q3, Q4, Q5, Q6, Q7, Q8 and Q9 can be all expressed by the sum of the voltages $V_x$ and $V_y$ Therefore, the voltages $V_1$, $V_2$, $V_3$, $V_4$, $V_5$, $V_6$, $V_7$, $V_8$ and $V_9$ can be easily realized by resistive dividers.

FIG. 19 shows the simplest structure of the voltage dividing technique using resistors, in which each of the voltages $V_1$, $V_2$, $V_3$, $V_4$, $V_5$, $V_6$, $V_7$, $V_8$ and $V_9$ is obtained by division of the sum of the voltage $V_x$ and $V_y$ using resistors.

Figure 20:
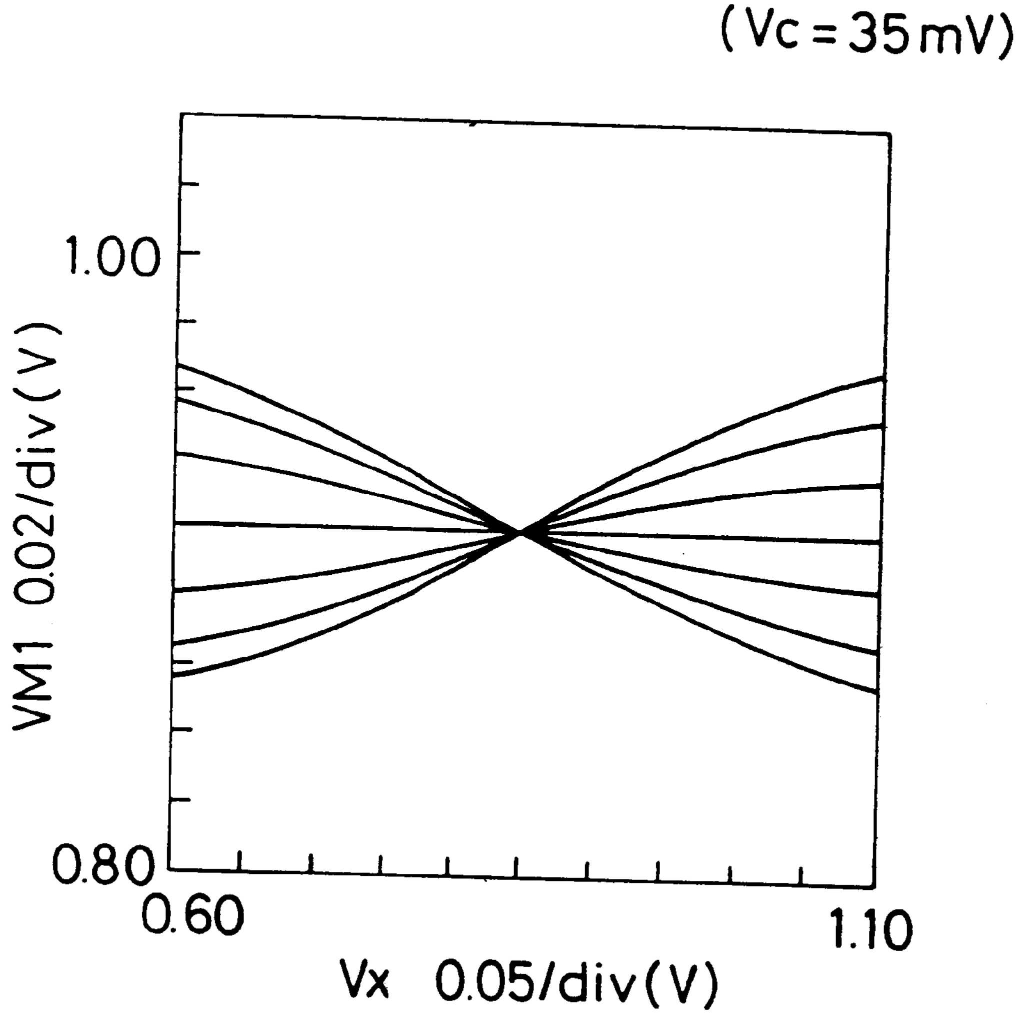
FIG. 20 is a graph showing an example of actual measurements of the transfer characteristic of the bipolar multiplier according to the sixth embodiment.

FIG. 20 shows the actual measurements for the multiplier of FIG. 18 that were obtained with the second initial input signal voltage $V_y$ being changed as a parameter in increments and decrements of 50 mV from 0 V when $V_C$=35 mV.

SEVENTH EMBODIMENT

Figure 21:
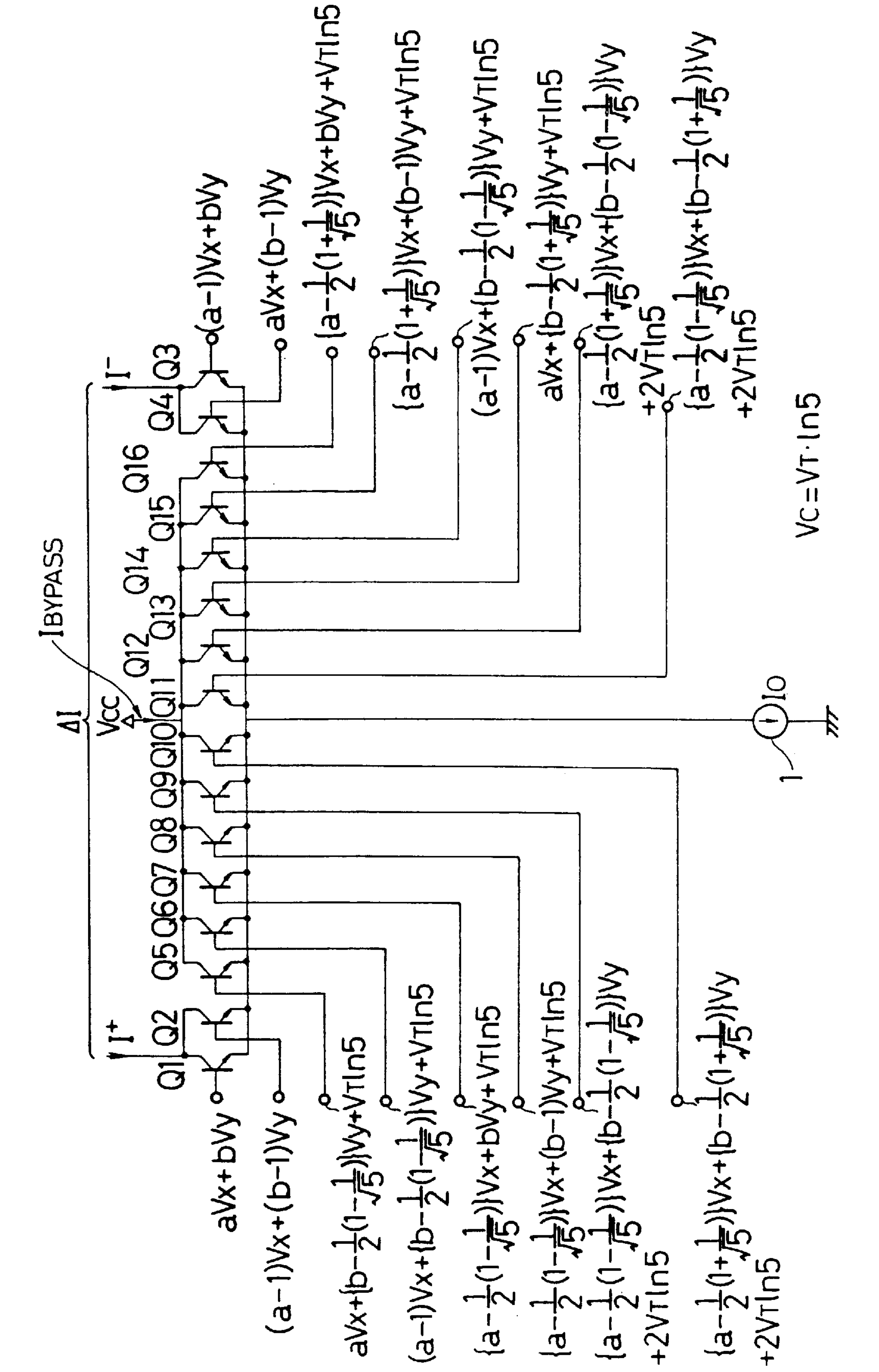
FIG. 21 is a circuit diagram of a bipolar multiplier according to a seventh embodiment of the present invention.

FIG. 21 shows a four-quadrant bipolar multiplier according to a seventh embodiment of the present invention.

As shown in FIG. 21, this multiplier has a multitail cell made of a first transistor pair of npn-type bipolar transistors Q1 and Q2, a second transistor pair of npn-type bipolar transistors Q3 and Q4, and twelve npn-type bipolar transistors Q5, Q6, Q7, Q8, Q9, Q10, Q11, Q12, Q13, Q14, Q15 and Q16. The sixteen transistors have the same emitter area. This multiplier is of a symmetrical input type.

Emitters of the transistors Q1, Q2, Q3, Q4, Q5, Q6, Q7, Q8, Q9, Q10, Q11, Q12, Q13, Q14, Q15 and Q16 are coupled together to be connected to one end of a constant current source 1 (current value: $I_0$) The other end of the current source 1 is connected to the ground. The multitail cell is driven by a common tail current Io from the current source 1.

Collectors of the transistors Q1 and Q2 are coupled together to form one of differential output ends of the multiplier. Collectors of the transistors Q3 and Q4 also are coupled together to form the other of the differential output ends of the multiplier.

Collectors of the transistors Q5, Q6, Q7, Q8, Q9, Q10, Q11, Q12, Q13, Q14, Q15 and Q16 are coupled together through which a bypass current $I_{BYPASS}$ flows.

A differential output current ΔI of this multiplier is defined as $\Delta I=I^{+}-I^{-}$, where $I^{+}$ is an output current of the first transistor pair and $I^{-}$ is an output current of the second transistor pair.

As shown in FIG. 21, this multiplier is equivalent to one composed of the multiplier according to the first aspect in which the twelve npn-type bipolar transistors Q5, Q6, Q7, Q8, Q9, Q10, Q11, Q12, Q13, Q14, Q15 and Q16 are added instead of the transistors Q5. These twelve transistors produce a bypass current $I_{BYPASS}$.

$V_8=(\{a-(½)(1-5^{-½})\}V_x+(b-1)V_y+V_c)$ $V_9=(\{a-(½)(1-5^{-½})\}V_x+\{b-(½)(1-5^{-½})\}V_y+2V_c)$ $V_{10}=(\{a-(½)(1+5^{-½})\}V_x+\{b-(½)(1+5^{-½}))V_y+2V_c)$, $V_{11}=(\{a-(½)(1-5^{-½})\}V_x+\{b-(½)(1+5^{-½})\}V_y+2V_c)$, $V_{12}=(\{a-(½)(1+5^{-½})\}V_x+\{b-(½)(1-5^{-½})\}V_y+2V_c)$ $V_{13}=(aV_x+\{-(½)(1+5^{-½})\}V_y+V_c)$, $V_{14}=((a-1)V_x+\{b-(½)(1-5^{-½}))V_y+V_c)$, $V_{15}=(\{a-(½)(1+5^{-½})\}V_x+(b-1)V_y+V_c)$, and $V_{16}=(\{a-(½)(1+5^{-½})\}V_x+bV_y+V_c)$.

The number of transistors required for a multitail cell increases according to the square of n where n is a natural number (for example, $2^2=4$, $3^2=9$, $4^2=16$), as enhancement of the input voltage range of the multiplier progresses.

In this embodiment, the differential output current AI can be expressed by the following equation (37), its transconductance $d(\Delta I)/dV_x$by the equation (38), the bypass current $I_{BYPASS}$ by the equation (39), and its transconductance by the equation (40).

$$\Delta I=\frac{\alpha_F I_0 \sinh\left(\frac{V_x}{2V_T}\right)\sinh\left(\frac{V_y}{2V_T}\right)}{\left\{\cosh\left(\frac{V_x}{2V_T}\right)+5\cosh\left(\frac{V_x}{2\sqrt{5}\,V_T}\right)\right\}\left\{\cosh\left(\frac{V_y}{2V_T}\right)+5\cosh\left(\frac{V_y}{2\sqrt{5}\,V_T}\right)\right\}} \tag{37}$$

$$\frac{d(\Delta I)}{dV_x}=\frac{\alpha_F I_0}{2V_T}\times\frac{\sinh\left(\frac{V_y}{2V_T}\right)\left\{5\cosh\left(\frac{V_x}{2V_T}\right)\cosh\left(\frac{V_x}{2\sqrt{5}\,V_T}\right)+\sqrt{5}\sinh\left(\frac{V_x}{2V_T}\right)\sinh\left(\frac{V_x}{2\sqrt{5}\,V_T}\right)+1\right\}}{\left\{\cosh\left(\frac{V_y}{2V_T}\right)+5\cosh\left(\frac{V_y}{2\sqrt{5}\,V_T}\right)\right\}\left\{\cosh\left(\frac{V_x}{2V_T}\right)+5\cosh\left(\frac{V_x}{2\sqrt{5}\,V_T}\right)\right\}^2} \tag{38}$$

$$\begin{aligned} I_{BYPASS} &= I_{C5}+I_{C6}+I_{C7}+I_{C8}+I_{C9}+I_{C10}+I_{C11}+I_{C12}+I_{C13}+I_{C14}+I_{C15}+I_{C16} \\ &= \alpha_F I_0\times\left[1-\frac{\cosh\left(\frac{V_x}{2V_T}\right)\cosh\left(\frac{V_y}{2V_T}\right)}{\left\{\cosh\left(\frac{V_x}{2V_T}\right)+5\cosh\left(\frac{V_x}{2\sqrt{5}\,V_T}\right)\right\}\left\{\cosh\left(\frac{V_y}{2V_T}\right)+5\cosh\left(\frac{V_y}{2\sqrt{5}\,V_T}\right)\right\}}\right] \end{aligned} \tag{39}$$

$$\frac{dI_{BYPASS}}{dV_x}=-\frac{\alpha_F I_0}{2V_T}\times\frac{\cosh\left(\frac{V_y}{2V_T}\right)\left\{5\sinh\left(\frac{V_x}{2V_T}\right)\cosh\left(\frac{V_x}{2\sqrt{5}\,V_T}\right)-\sqrt{5}\cosh\left(\frac{V_x}{2V_T}\right)\sinh\left(\frac{V_x}{2\sqrt{5}\,V_T}\right)\right\}}{\left\{\cosh\left(\frac{V_y}{2V_T}\right)+5\cosh\left(\frac{V_y}{2\sqrt{5}\,V_T}\right)\right\}\left\{\cosh\left(\frac{V_x}{2V_T}\right)+5\cosh\left(\frac{V_x}{2\sqrt{5}\,V_T}\right)\right\}^2} \tag{40}$$

Bases of the transistors Q1, Q2, Q3 and Q4 are respectively applied with the first, second, third, fourth and fifth input signal voltages $V_1$, $V_2$, $V_3$, $V_4$ and $V_5$ as $V_1=(aV_x+bV_y)$ $V_2=\{(a-1)V_x+(b-1)V_y\}$, $V_3=\{(a-1)V_x+bV_y\}$, and $V_4=\{aV_x+(b-1)V_y\}$, and $V_5=\{(a-½)V_x+(b-½)V_y+V_C\}$, where a and b are constants and $V_c$ is a positive dc voltage. These are equal to those of the first embodiment. However, in this embodiment, $V_C=V_T\cdot\ln5$.

Figure 22:
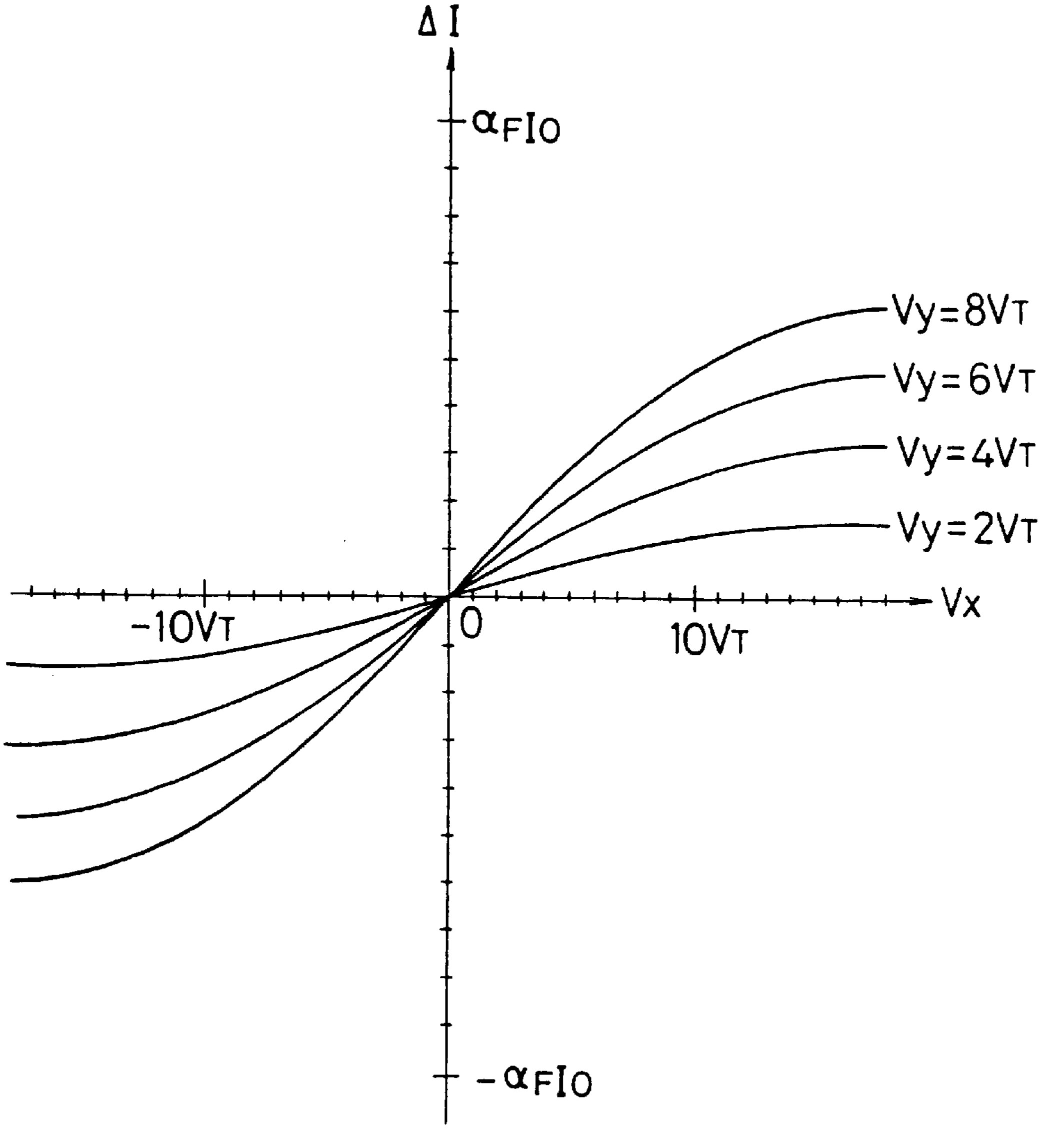
FIG. 22 is a graph showing the transfer characteristic of the multiplier according to the seventh embodiment.
Figure 23:
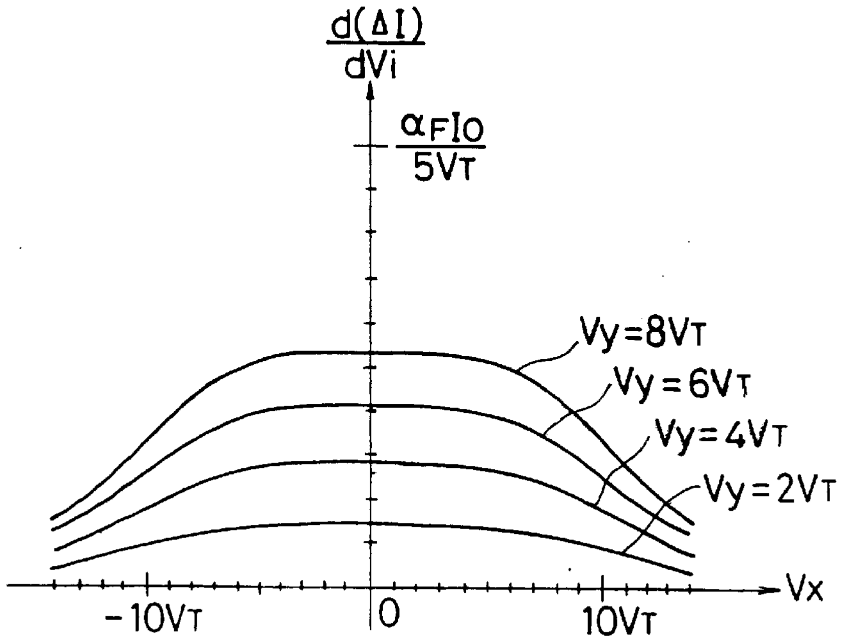
FIG. 23 is a graph showing the transconductance characteristic of the multiplier according to the seventh embodiment.
Figure 24:
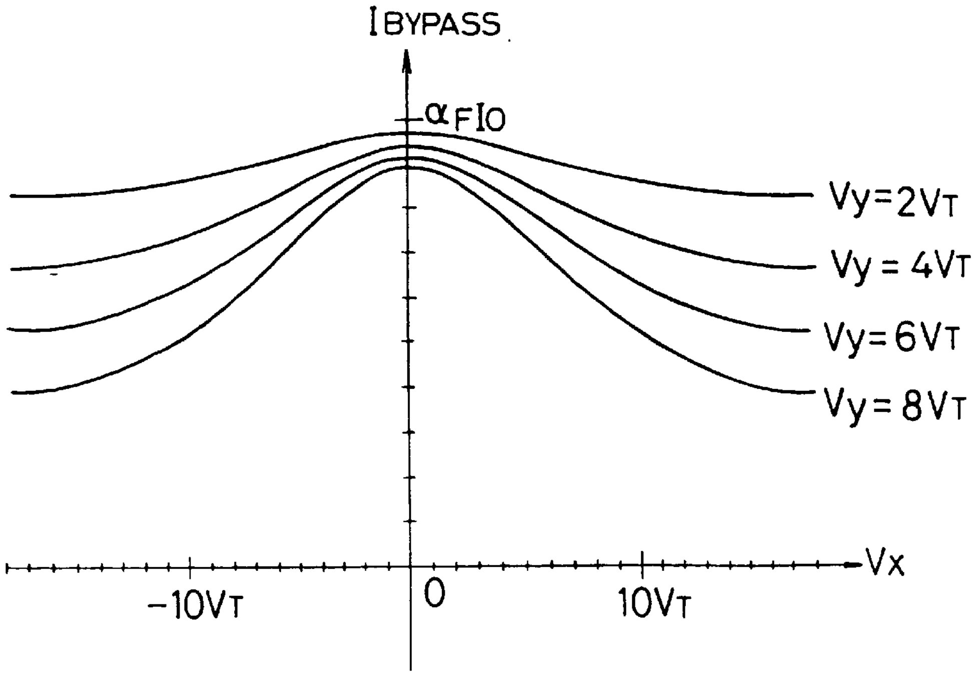
FIG. 24 is graph showing the bypass current characteristic of the multiplier according to the seventh embodiment.
Figure 25:
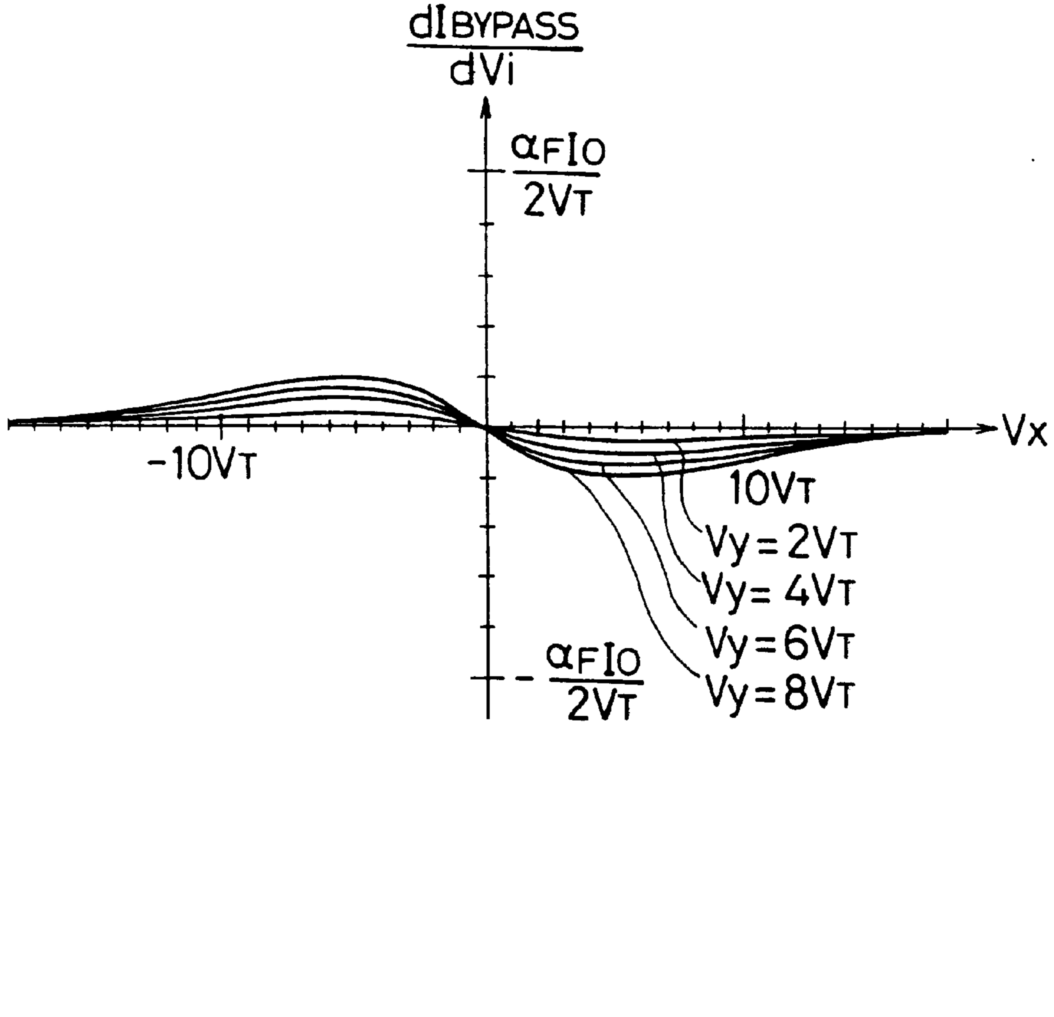
FIG. 25 is graph showing the bypass current transconductance characteristic of the multiplier according to the seventh embodiment.

Bases of the transistors Q5, Q6, Q7, Q8, Q9, Q10, Q11, Q12, Q13, Q14, Q15 and Q16 are respectively applied with the input signal voltages $V_5$, $V_6$, $V_7$, $V_8$, $V_9$, $V_{10}$, $V_{11}$, $V_{12}$, $V_{13}$, $V_{14}$, $V_{15}$ and $V_{16}$, each of which is set as follows:

$V_5=(aV_x+\{b-(½)(1-5^{-½})\}V_y+V_c)$ $V_6=((a-1)V_x+\{b-(½)(1-5^{-½})\}V_y+V_c)$, $V_7=(\{a-(½)(1-5^{-½})\}V_x+bV_y+V_c)$,

FIG. 22 shows the transfer characteristic of the seventh embodiment of FIG. 15, FIG. 23 the transconductance characteristic thereof, FIG. 18 the bypass current characteristic, and FIG. 19 the bypass current transconductance characteristic.

Figure 21A:
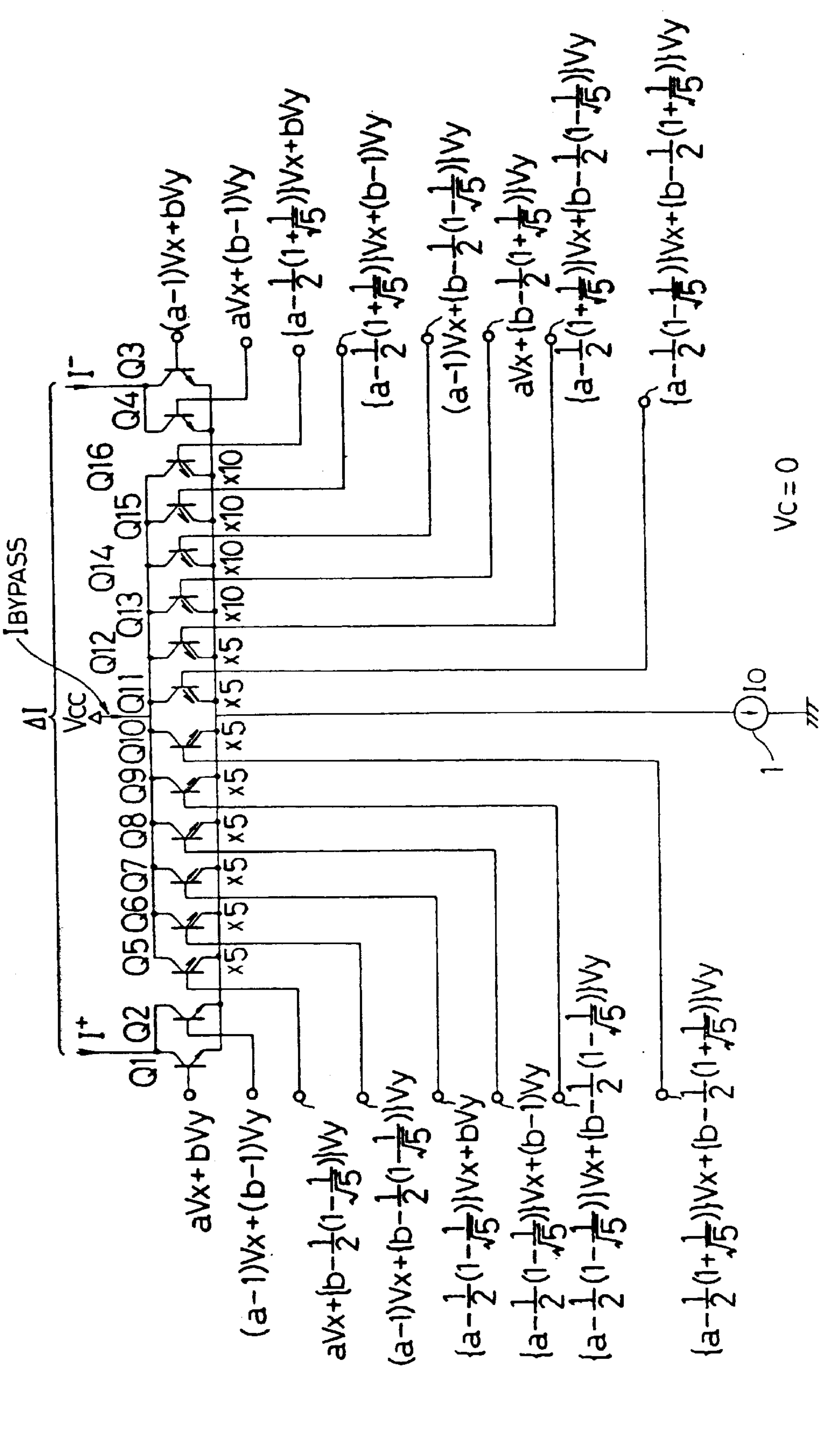
FIG. 21A is a circuit diagram of a bipolar multiplier showing a modified example of the seventh embodiment of the present invention.

In this embodiment, as shown in FIG. 21, the transistors Q5 to Q16 have the same emitter area as those of the transistors Q1, Q2, Q3 and Q4, and the dc voltage $V_C$is set as $2V_T\cdot\ln5$. However, in the same manner as that of the fourth embodiment of FIG. 14, this configuration is equivalent to the configuration where the emitter areas of the transistors Q5 to Q12 are five (5) times as much as those of the transistors Q1 to Q4, the emitter areas of the transistors Q13 to Q16 are ten (10) times as much as those of the transistors Q1 to Q4, and $V_C=0$. The latter configuration is shown in FIG. 21A.

EIGHTH EMBODIMENT

Figure 26:
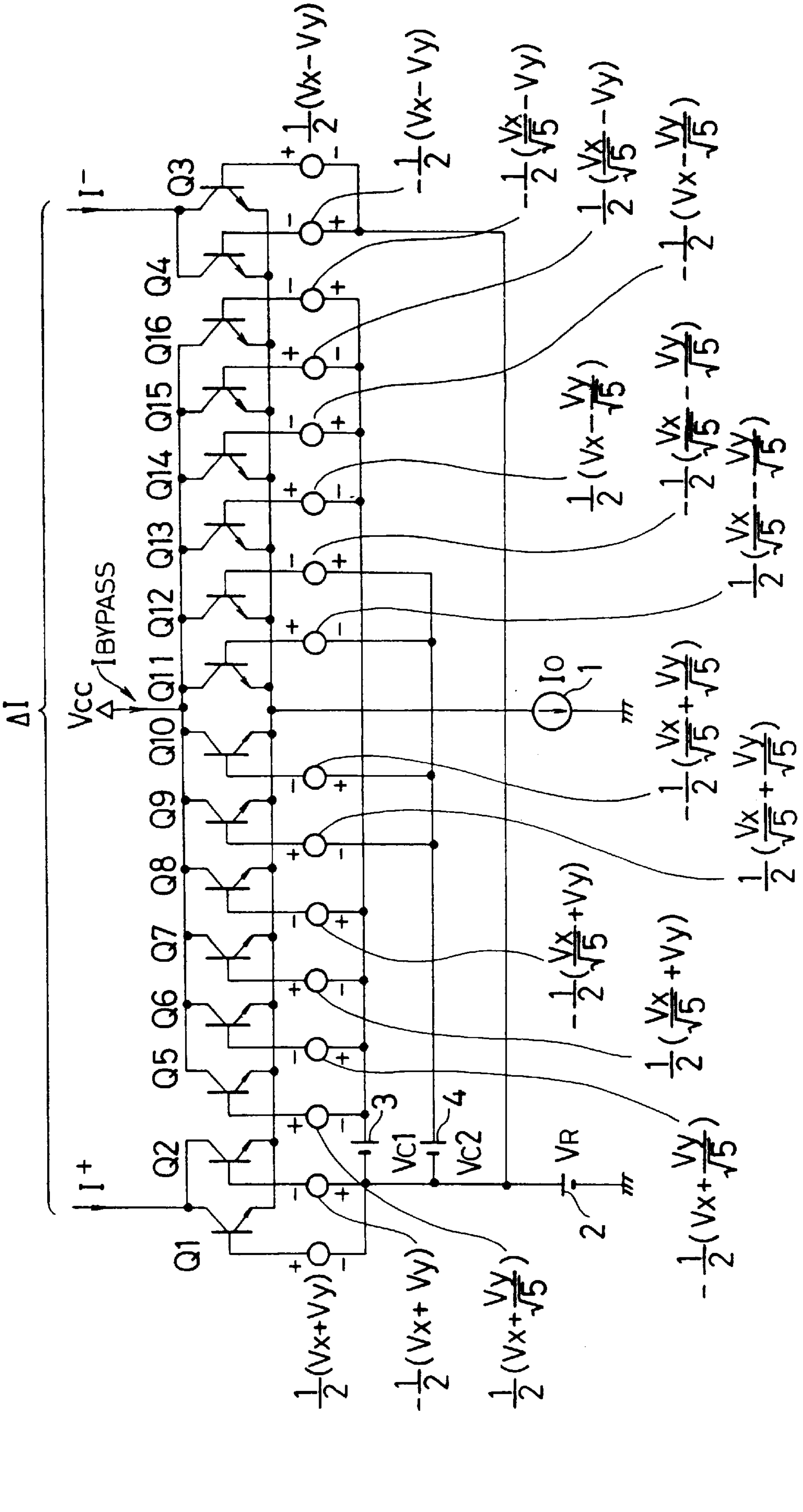
FIG. 26 is a circuit diagram of a bipolar multiplier according to an eighth embodiment of the present invention.

FIG. 26 shows a four-quadrant bipolar multiplier according to an eighth embodiment of the present invention.

This multiplier is obtained by setting the constants a and b at a=b=(½) in the multiplier according to the seventh embodiment.

In FIG. 26, the symbol 0 indicates a signal source, the reference numerals 3 and 4 are positive dc voltage sources whose supply voltages are $V_{c1}$ and $V_{c2}$, respectively.

NINTH EMBODIMENT

Figure 27:
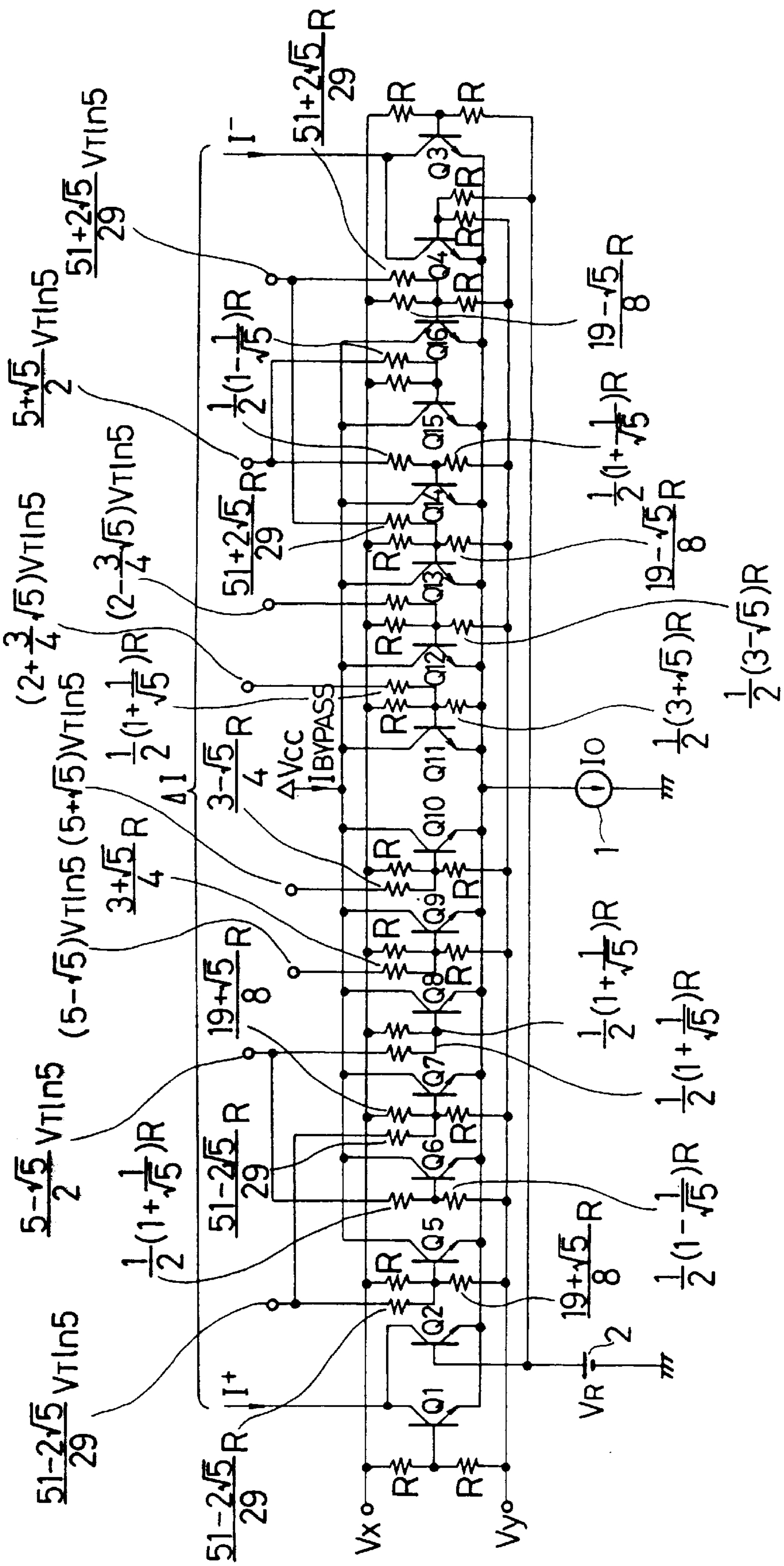
FIG. 27 is a circuit diagram of a bipolar multiplier according to a ninth embodiment of the present invention.

FIG. 27 shows a four-quadrant bipolar multiplier according to a ninth embodiment of the present invention.

This multiplier is obtained by setting the constants a and b to satisfy the relationships of (a−1)>0 and (b−1)>0 in the multiplier according to the seventh embodiment. In this case, the input signal voltages $V_1$, $V_2$, $V_3$, $V_4$, $V_5$, $V_6$, $V_7$, $V_8$, $V_9$, $V_{10}$, $V_{11}$, $V_{12}$, $V_{13}$, $V_{14}$, $V_{15}$, and $V_{16}$ can be all expressed by the sum of the first and second initial input signal voltages $V_x$ and $V_y$ Therefore, these sixteen voltages $V_1$ to $V_{16}$ can be easily realized by resistive dividers.

FIG. 27 shows the simplest structure of the voltage dividing technique using resistors, in which each of the voltages $V_1$ to $V_{16}$ is obtained by division of the sum of the voltage $V_x$ and $V_y$ using resistors.

TENTH EMBODIMENT

Figure 28:
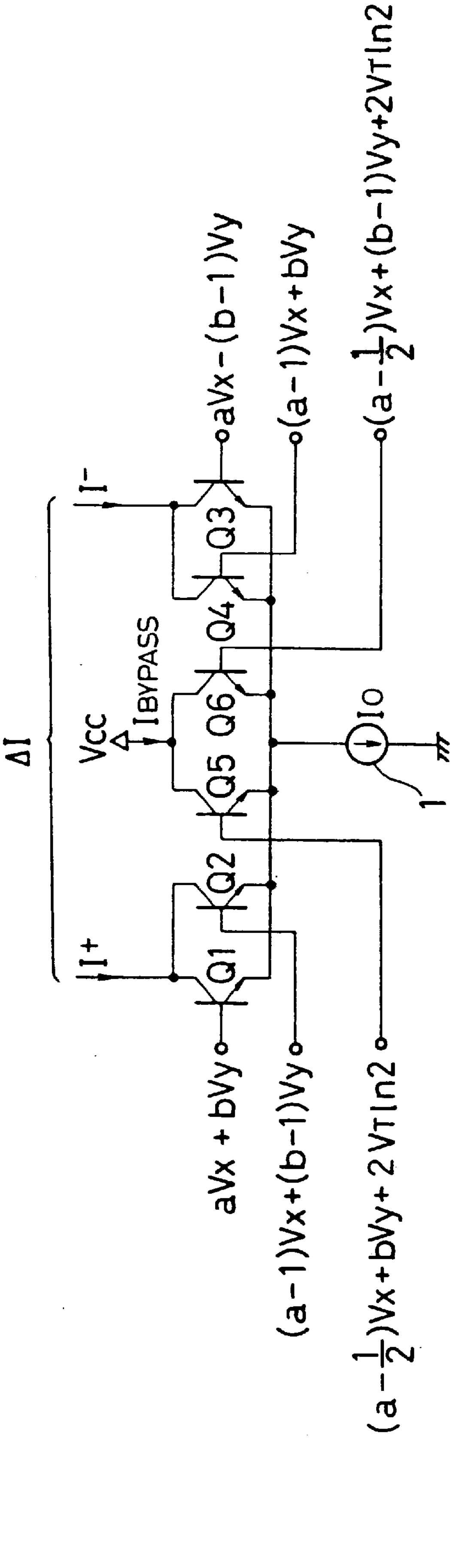
FIG. 28 is a circuit diagram of a bipolar multiplier according to a tenth embodiment of the present invention.

FIG. 28 shows a four-quadrant bipolar multiplier according to a tenth embodiment of the present invention.

As shown in FIG. 28, this multiplier has a multitail cell made of a first transistor pair of npn-type bipolar transistors Q1 and Q2, a second transistor pair of npn-type bipolar transistors Q3 and Q4, and two npn-type bipolar transistors Q5 and Q6. The six transistors Q1 to Q6 have the same emitter area. Unlike the multipliers according to the first to ninth embodiments, this multiplier is of an asymmetrical input type.

If the symmetry of the inputs is not important or critical, the number of bipolar transistors required for the multitail cell can be decreased, one example of which is this embodiment.

In the bipolar multiplier with the asymmetric inputs, the transfer function is composed on the basis of the product of the two transfer functions for such different cells as a longtail cell and a triple-tail cell, a longtail cell and a quadritail cell, and a triple-tail cell and a quadritail cell.

Emitters of the transistors Q1, Q2, Q3, Q4, Q5 and Q6 are coupled together to be connected to one end of a constant current source 1 (current value: $I_0$). The other end of the current source 1 is connected to the ground. The multitail cell is driven by a common tail current Io from the current source 1.

Collectors of the transistors Q1 and Q2 are coupled together to form one of differential output ends of the multiplier. Collectors of the transistors Q3 and Q4 also are coupled together to form the other of the differential output ends of the multiplier.

Collectors of the transistors Q5 and Q6 are coupled together through which a bypass current $I_{BYPASS}$ flows.

A differential output current ΔI of this multiplier is defined as $\Delta I = I^+ - I^-$, where $I^+$ is an output current of the first transistor pair and $I^-$ is an output current of the second transistor pair.

As shown in FIG. 28, this multiplier is equivalent to one composed of the multiplier according to the first aspect in which the two npn-type bipolar transistors Q5 and Q6 are added instead of the transistors Q5. The transistors Q5 and Q6 produce a bypass current $I_{BYPASS}$.

Bases of the transistors Q1, Q2, Q3 and Q4 are respectively applied with the same input signal voltages $V_1$, $V_2$, $V_3$ and $V_4$ as those in the first embodiment.

Bases of the transistors Q5 and Q6 are respectively applied with the following input signal voltages $V_5$ and $V_6$:

$V_5=\{(a-½)V_x+bV_y+2V_C\}$, and $V_6=\{(a-½)V_x+(b-1)V_y+2V_C\}$, where $V_C=V_T\cdot\ln 2$.

In this embodiment, the differential output current ΔI can be expressed by the following equation (41), and the bypass current $I_{BYPASS}$ is expressed by the equation (42).

$$\Delta I = \frac{\alpha_F I_0 \sinh\left(\frac{V_x}{2V_T}\right)\sinh\left(\frac{V_y}{2V_T}\right)}{\left\{\cosh\left(\frac{V_x}{2V_T}\right)+2\right\}\cosh\left(\frac{V_y}{2V_T}\right)} \tag{41}$$

$$\begin{aligned} I_{BYPASS} &= I_{C5} + I_{C6} \\ &= \alpha_F I_0\left[1 - \frac{\cosh\left(\frac{V_x}{2V_T}\right)\cosh\left(\frac{V_y}{2V_T}\right)}{\cosh\left(\frac{V_x}{2V_T}\right)+2\cosh\left(\frac{V_y}{2V_T}\right)}\right] \\ &= 2\alpha_F I_0\left[\frac{\cosh\left(\frac{V_y}{2V_T}\right)}{\cosh\left(\frac{V_y}{2V_T}\right)+2\cosh\left(\frac{V_y}{2V_T}\right)}\right] \end{aligned} \tag{42}$$

Figure 28A:
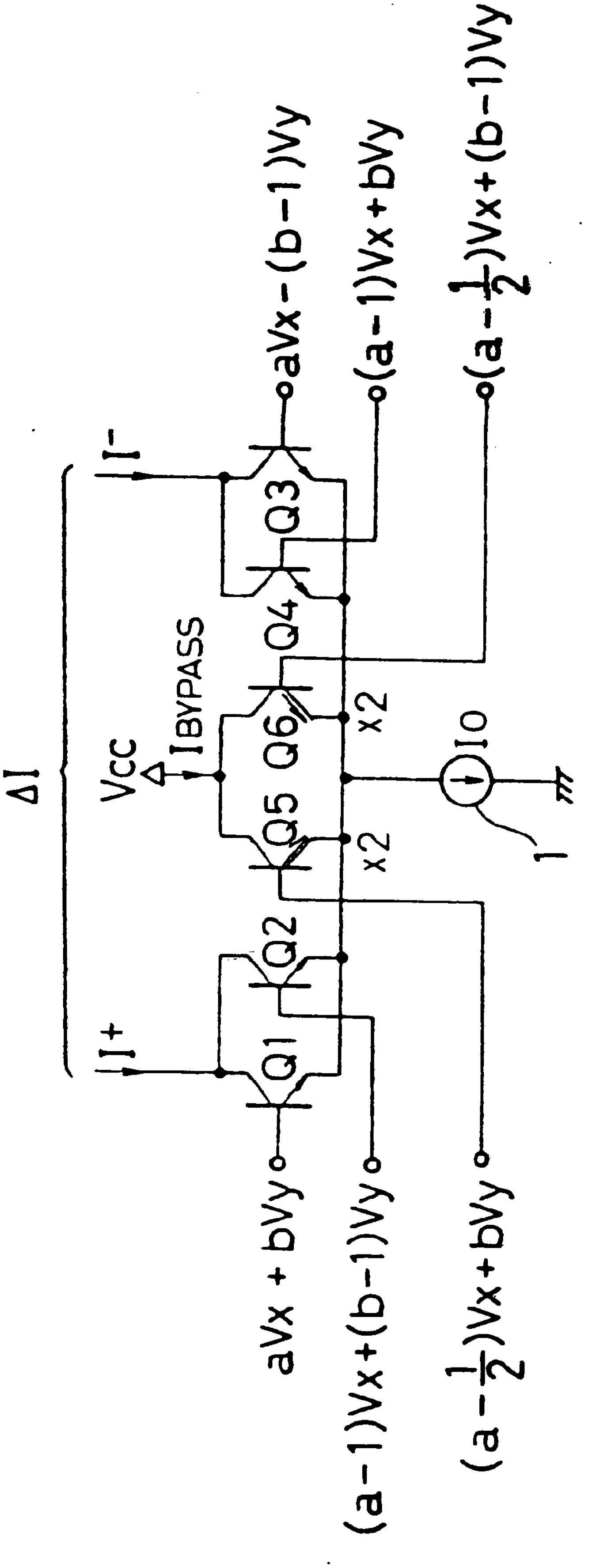
FIG. 28A is a circuit diagram of a bipolar multiplier showing a modified example of the tenth embodiment of the present invention.

In this embodiment, as shown in FIG. 28, the transistors Q5 and Q6 have the same emitter area as those of the transistors Q1, Q2, Q3 and Q4, and the dc voltage $V_C$ is set as $V_T\cdot\ln 2$. However, in the same manner as that of the fourth embodiment of FIG. 14, this configuration is equivalent to the configuration where the emitter areas of the transistors Q5 and Q6 are two (2) times as much as those of the transistors Q1 to Q4, and $V_C=0$. The latter configuration is shown in FIG. 28A.

ELEVENTH EMBODIMENT

Figure 29:
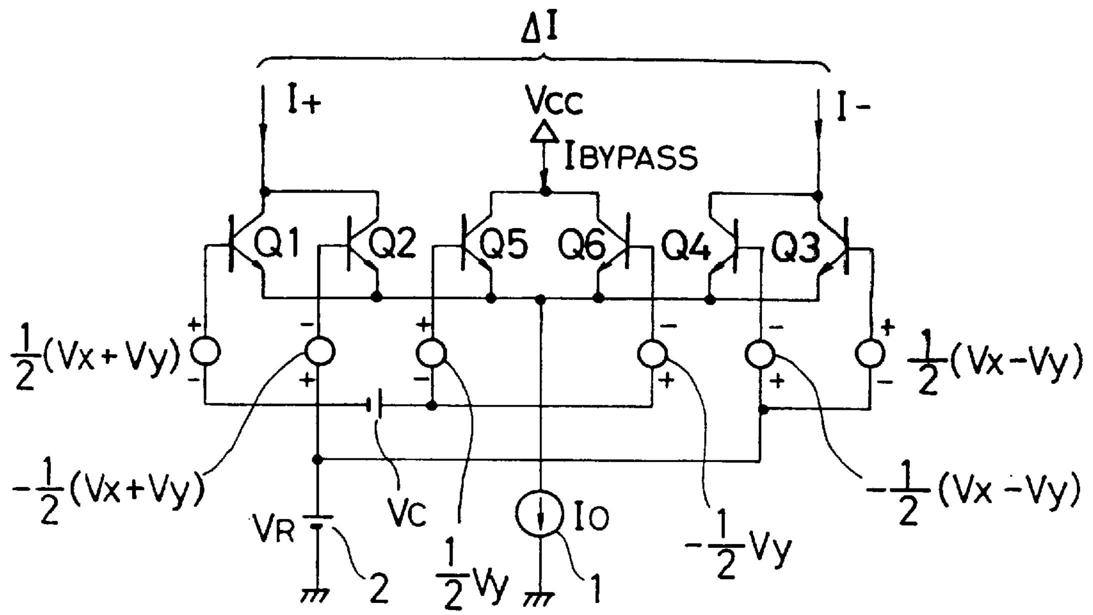
FIG. 29 is a circuit diagram of a bipolar multiplier according to an eleventh embodiment of the present invention.

FIG. 29 shows a four-quadrant bipolar multiplier according to an eleventh embodiment of the present invention.

This multiplier is obtained by setting the constants a and b at a=b=(½) in the multiplier according to the tenth embodiment.

TWELFTH EMBODIMENT

Figure 30:
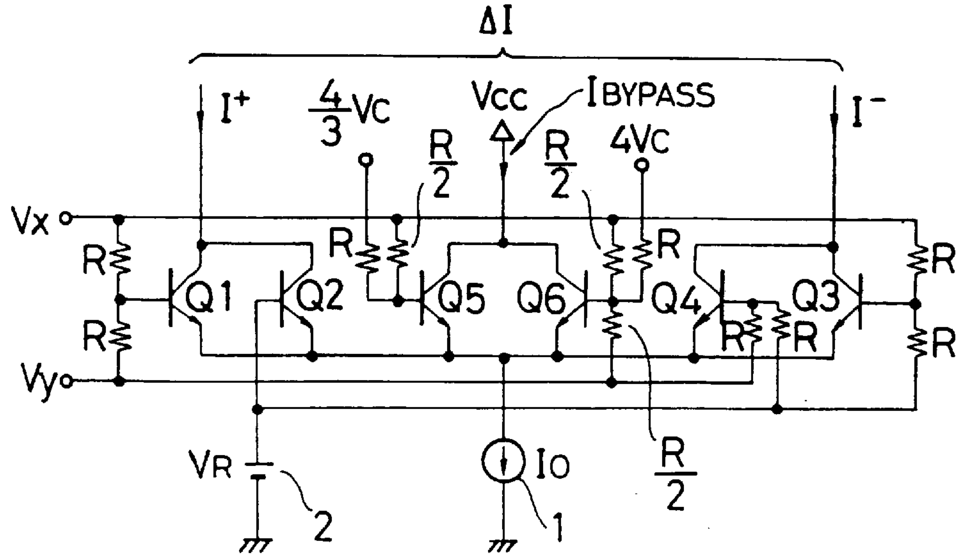
FIG. 30 is a circuit diagram of a bipolar multiplier according to a twelfth embodiment of the present invention.

FIG. 30 shows a four-quadrant bipolar multiplier according to a twelfth embodiment of the present invention.

This multiplier is obtained by setting the constants a and b to satisfy the relationships of (a−1)>0 and (b−1)>0 in the multiplier according to the tenth embodiment. In this case, the input signal voltages $V_1$, $V_2$, $V_3$, $V_4$, $V_5$ and $V_6$ can be all expressed by the sum of the first and second initial input signal voltages $V_x$ and $V_y$. Therefore, these six voltages $V_1$ to $V_6$ can be easily realized by resistive dividers.

FIG. 30 shows the simplest structure of the voltage dividing technique using resistors, in which each of the voltages $V_1$ to $V_6$ is obtained by division of the sum of the voltage $V_x$ and $V_y$ using resistors.

THIRTEENTH EMBODIMENT

Figure 31:
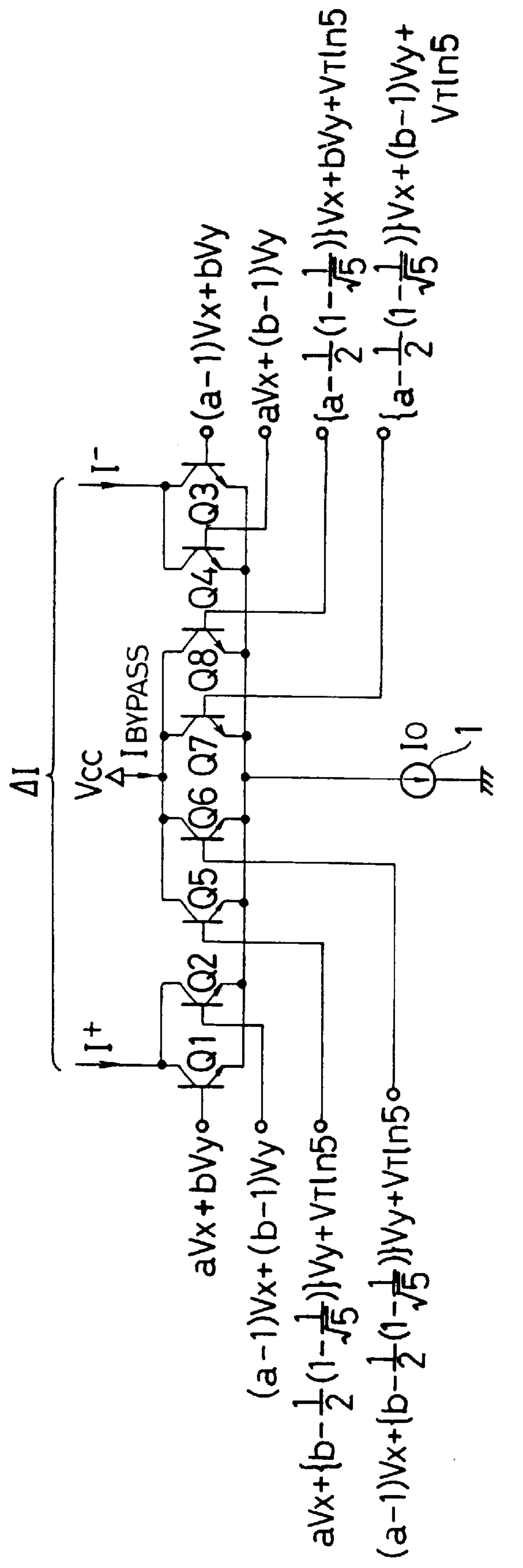
FIG. 31 is a circuit diagram of a bipolar multiplier according to a thirteenth embodiment of the present invention.

FIG. 31 shows a four-quadrant bipolar multiplier according to a thirteenth embodiment of the present invention.

As shown in FIG. 31, this multiplier is equivalent to one composed of the multiplier according to the tenth embodiment and newly added two npn-type bipolar transistors Q7 and Q8. The transistors Q5 to Q8 are utilized for producing a bypass current $I_{BYPASS}$.

The transistors Q5, Q6, Q7 and Q8 have the same emitter area as that of the transistors Q1, Q2, Q3 and Q4. This multiplier is of a symmetrical input type.

Since eight transistors are used as the multitail cell, this multiplier may be termed an "octal-tail cell".

Bases of the transistors Q1, Q2, Q3 and Q4 are respectively applied with the same input signal voltages $V_1$, $V_2$, $V_3$ and $V_4$ as those in the first embodiment.

In this embodiment, the dc voltage $V_C$ is set as ($V_T$·ln5) and therefore, the input signal voltages $V_5$, $V_6$, $V_7$, and $V_8$ applied to the respective transistors Q6, Q7, Q8 and Q9 are $V_5=(aV_x+\{b-(½)(1-5^{-½})V_y\}+V_T·\ln5)$, $V_6=((a-1)V_x+\{b-(½)(1-5^{-½})V_y\}+V_T·\ln5)$, $V_7=(\{a-(½)(1-5^{-½})\}V_x+bV_y+V_T·\ln5)$, and $V_8=(\{a-(½)(1-5^{-½})\}V_x+bV_y+V_T·\ln5)$, respectively.

The differential output current ΔI can be expressed by the following equation (43) as $$\Delta I=\frac{\alpha_F I_0 \sinh\left(\frac{V_x}{2V_T}\right)\sinh\left(\frac{V_y}{2V_T}\right)}{\left\{\cosh\left(\frac{V_x}{2V_T}\right)+5\cosh\left(\frac{V_x}{2\sqrt{5}\,V_T}\right)\right\}\cosh\left(\frac{V_y}{2V_T}\right)} \tag{43}$$

The bypass current $I_{BYPASS}$ can be expressed by the following equation (44) as $$\begin{aligned} I_{BYPASS} &= I_{C5}+I_{C6}+I_{C7}+I_{C8} \\ &= \alpha_F I_0\left[1-\frac{\cosh\left(\frac{V_x}{2V_T}\right)\cosh\left(\frac{V_y}{2V_T}\right)}{\left\{\cosh\left(\frac{V_x}{2V_T}\right)+5\cosh\left(\frac{V_x}{2\sqrt{5}\,V_T}\right)\right\}\cosh\left(\frac{V_y}{2V_T}\right)}\right] \\ &= 5\alpha_F I_0\left[\frac{\cosh\left(\frac{V_x}{2\sqrt{5}\,V_T}\right)\cosh\left(\frac{V_y}{2V_T}\right)}{\left\{\cosh\left(\frac{V_x}{2V_T}\right)+5\cosh\left(\frac{V_x}{2\sqrt{5}\,V_T}\right)\right\}\cosh\left(\frac{V_y}{2V_T}\right)}\right] \end{aligned} \tag{44}$$

FOURTEENTH EMBODIMENT

Figure 32:
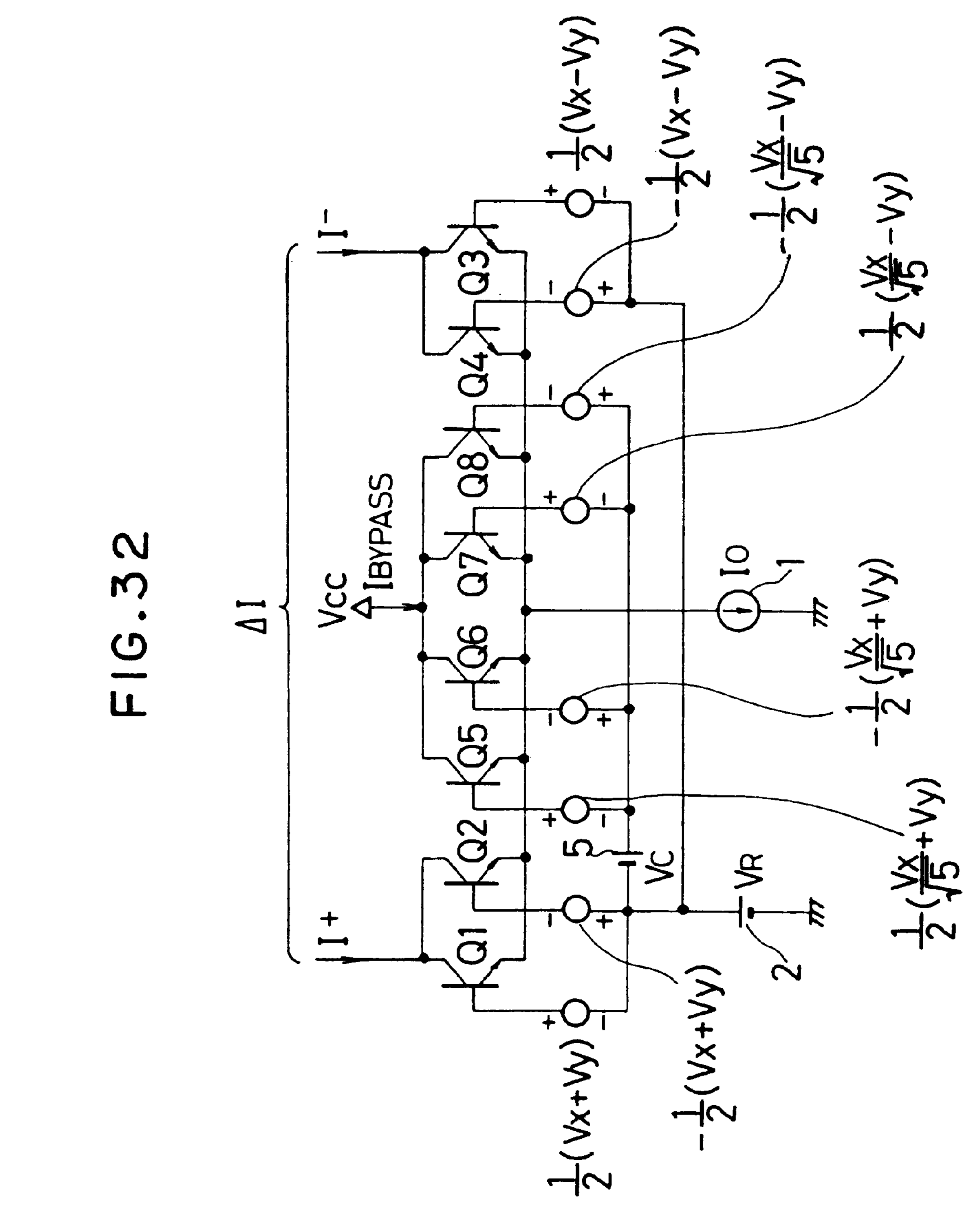
FIG. 32 is a circuit diagram of a bipolar multiplier according to a fourteenth embodiment of the present invention.

FIG. 32 shows a four-quadrant bipolar multiplier according to a fourteenth embodiment of the present invention.

This multiplier is obtained by setting the constants a and b at a=b=(½) in the multiplier according to the thirteenth embodiment.

In FIG. 32, the reference numeral 5 indicates a voltage source supplying a dc voltage of $V_c$.

FIFTEENTH EMBODIMENT

Figure 33:
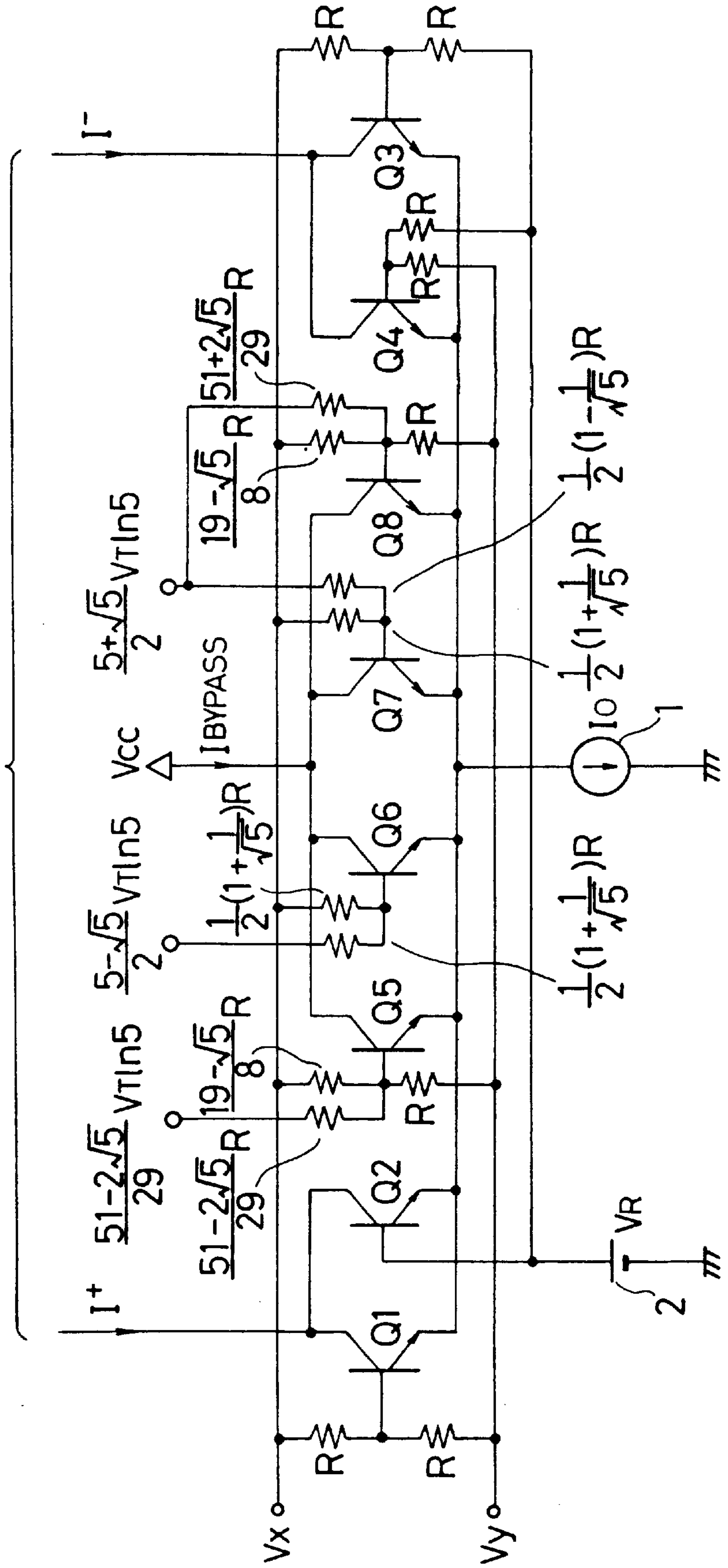
FIG. 33 is a circuit diagram of a bipolar multiplier according to a fifteenth embodiment of the present invention.

FIG. 33 shows a four-quadrant bipolar multiplier according to a fifteenth embodiment of the present invention.

This multiplier is obtained by setting the constants a and b to satisfy the relationships of $(a-1)>0$, $(b-1)>0$, $\{a-(½)(1-5^{-½})\}>0$, and $\{b-(½)(1-5^{-½})\}>0$ in the multiplier according to the thirteenth embodiment. In this case, the input signal voltages $V_1$, $V_2$, $V_3$, $V_4$, $V_5$, $V_6$, $V_7$ and $V_8$ can be all expressed by the sum of the first and second initial input signal voltages $V_x$ and $V_y$. Therefore, these six voltages $V_1$ to $V_8$ can be easily realized by resistive dividers.

FIG. 33 shows the simplest structure of the voltage dividing technique using resistors, in which each of the voltages $V_1$ to $V_8$ is obtained by division of the sum of the voltage $V_x$ and $V_y$ using resistors.

SIXTEENTH EMBODIMENT

Figure 34:
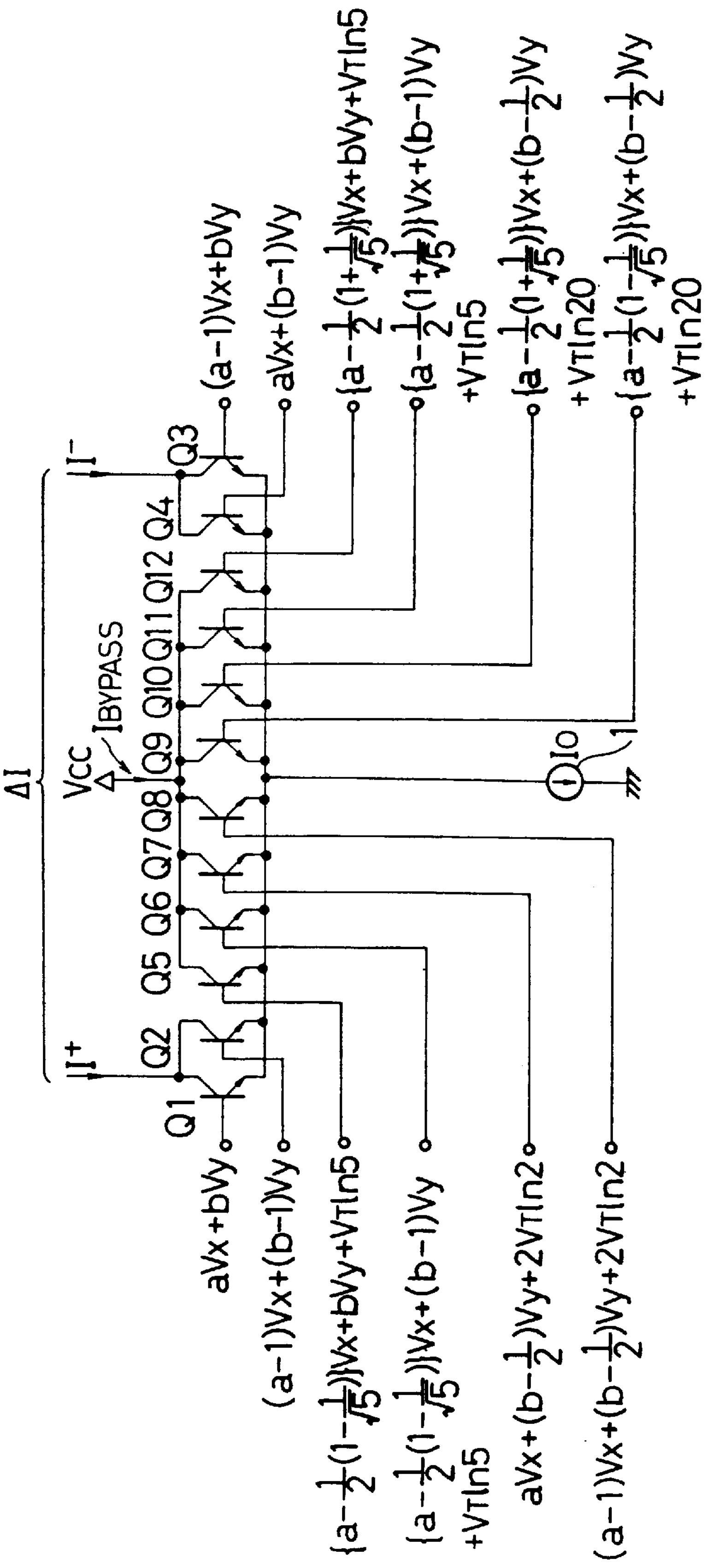
FIG. 34 is a circuit diagram of a bipolar multiplier according to a sixteenth embodiment of the present invention.

FIG. 34 shows a four-quadrant bipolar multiplier according to a sixteenth embodiment of the present invention.

As shown in FIG. 34, this multiplier is equivalent to one composed of the multiplier according to the thirteenth embodiment and newly added four npn-type bipolar transistors Q9, Q10, Q11 and Q12. The transistors Q5 to Q12 are utilized for producing a bypass current $I_{BYPASS}$.

The transistors Q9, Q10, Q11 and Q12 have the same emitter area as that of the transistors Q1, Q2, Q3, Q4, Q5, Q6, Q7 and Q8. This multiplier is of an asymmetrical input type.

Bases of the transistors Q1, Q2, Q3 and Q4 are respectively applied with the same input signal voltages $V_1$, $V_2$, $V_3$ and $V_4$ as those in the first embodiment.

In this embodiment, the input signal voltages $V_5$, V6, $V_7$, $V_8$, $V_9$, $V_{10}$, $V_{11}$, and $V_{12}$ applied to the respective transistors Q5 to Q12 are as follows:

$V_5=(\{a-(½)(1-5^{-½})\}V_x+bV_y+V_T·\ln5)$ $V_6=(\{a-(½)(1-5^{-½})\}V_x+\{b-1\}V_y+V_T·\ln5)$, $V_7=(aV_x+\{b-(½)\}V_y+2V_T·\ln2)$ $V_8=(a-1)V_x+\{b-(½)\}V_y+2V_T·\ln2)$;

$V_9=(\{a-(½)(1-5^{-½})\}V_x+\{b-(½)\}V_y+V_T·\ln20)$ $V_{10}=(\{a-(½)(1+5^{-½})\}V_x+\{b-(½)\}V_y+V_T·\ln20)$, $V_{11}=(\{a-(½)(1+5^{-½})\}V_x+\{b-(½)\}V_y+V_T·\ln5)$; and $V_{12}=(\{a-(½)(1+5^{-2/1})\}V_x+bV_y+V_T·\ln5)$.

The differential current ΔI can be expressed by the following equation (45) as $$\Delta I=\frac{\alpha_F I_0 \sinh\left(\frac{V_x}{2V_T}\right)\sinh\left(\frac{V_y}{2V_T}\right)}{\left\{\cosh\left(\frac{V_x}{2V_T}\right)+5\cosh\left(\frac{V_x}{2\sqrt{5}\,V_T}\right)\right\}\left\{\cosh\left(\frac{V_y}{2V_T}\right)+2)\right\}} \tag{45}$$

The bypass current $I_{BYPASS}$ can be expressed by the following equation (46) as $$\begin{aligned} I_{BYPASS} &= I_{C5}+I_{C6}+I_{C7}+I_{C8}+I_{C9} \\ &= \alpha_F I_0\left[1-\frac{\cosh\left(\frac{V_x}{2V_T}\right)\cosh\left(\frac{V_y}{2V_T}\right)}{\left\{\cosh\left(\frac{V_x}{2V_T}\right)+5\cosh\left(\frac{V_x}{2\sqrt{5}\,V_T}\right)\right\}}\left\{\cosh\left(\frac{V_y}{2V_T}\right)+2\right\}\right] \end{aligned} \tag{46}$$

SEVENTEENTH EMBODIMENT

Figure 35:
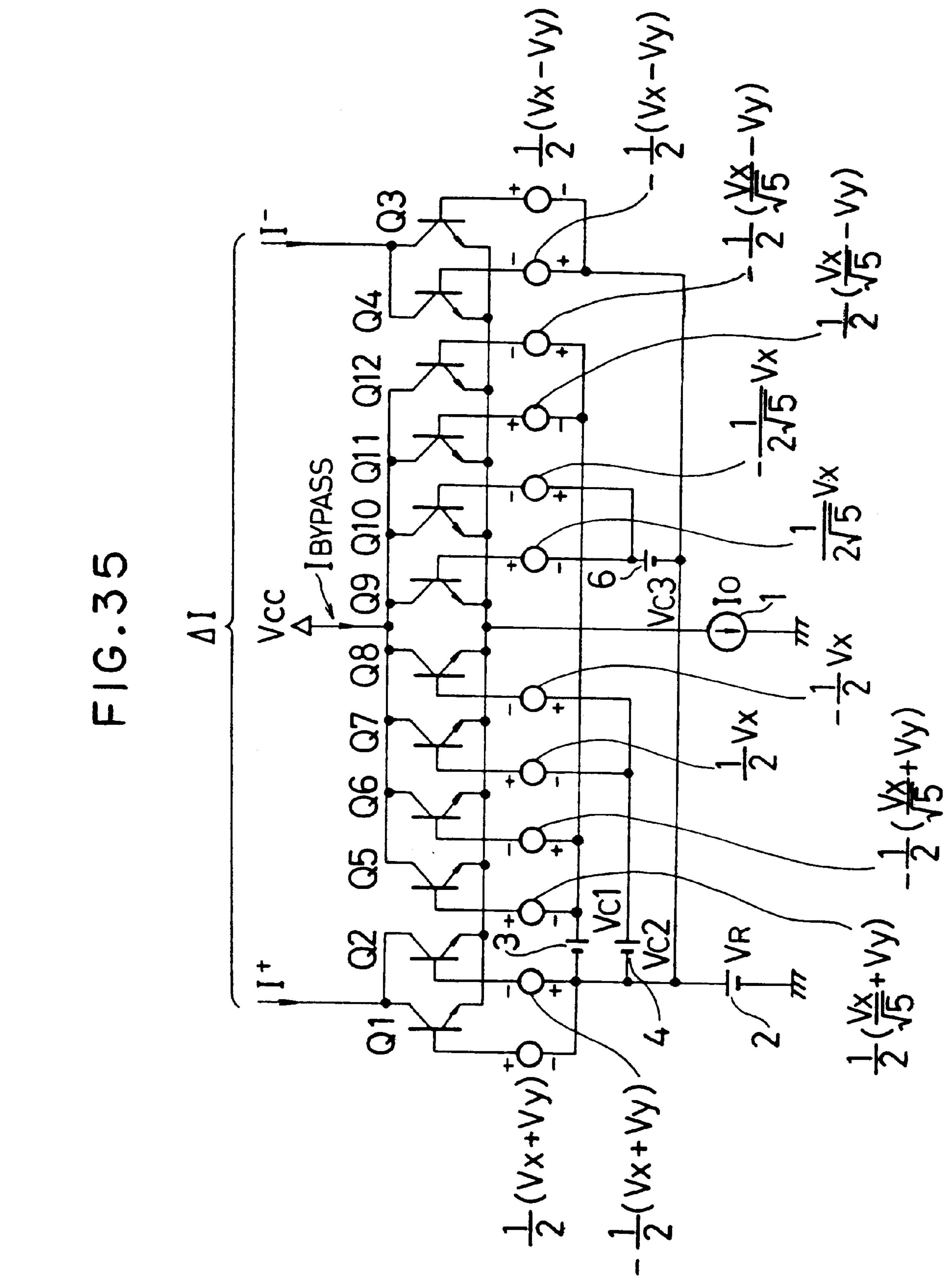
FIG. 35 is a circuit diagram of a bipolar multiplier according to a seventeenth embodiment of the present invention.

FIG. 35 shows a four-quadrant bipolar multiplier according to a seventeenth embodiment of the present invention.

This multiplier is obtained by setting the constants a and b at a=b=(½) in the multiplier according to the sixteenth embodiment.

In FIG. 35, the reference numeral 2, 3 and 6 indicate voltage sources supplying dc voltages of $V_{c1}$, $V_{c2}$ and $V_{c3}$, respectively.

EIGHTEENTH EMBODIMENT

Figure 36:
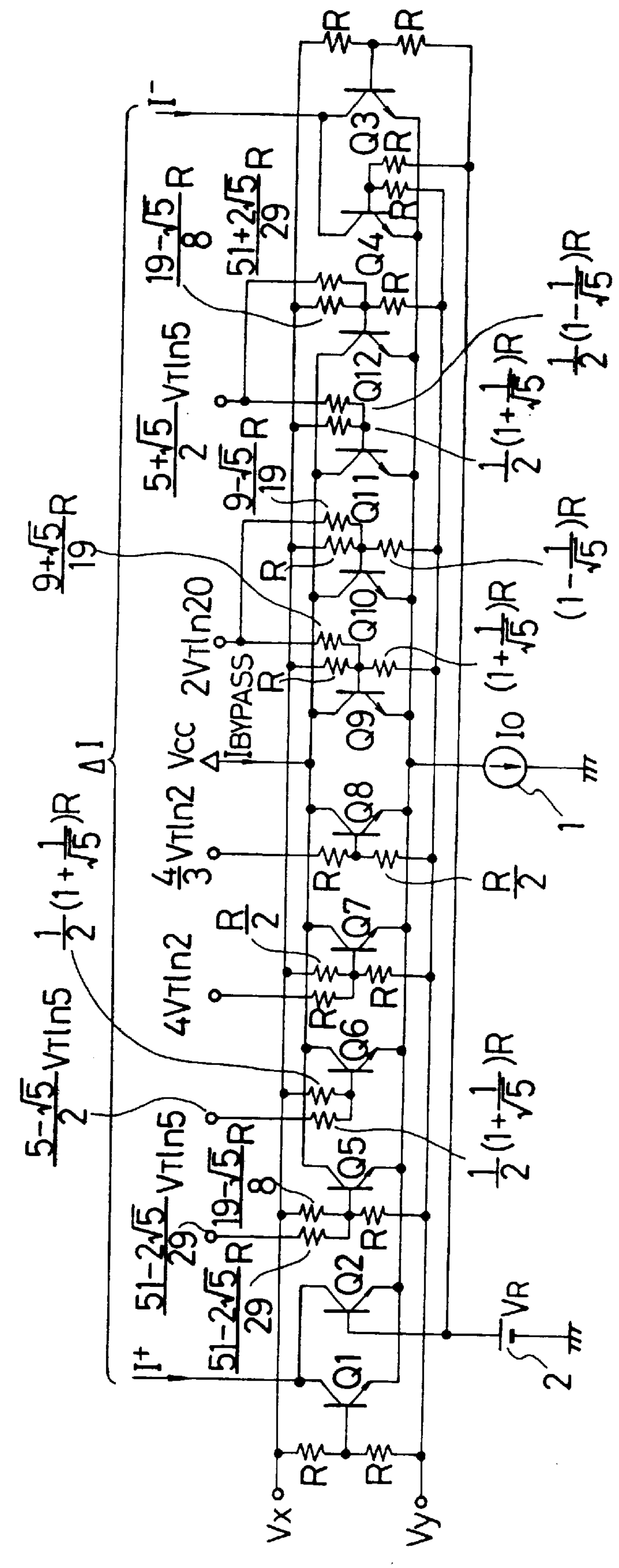
FIG. 36 is a circuit diagram of a bipolar multiplier according to an eighteenth embodiment of the present invention.

FIG. 36 shows a four-quadrant bipolar multiplier according to an eighteenth embodiment of the present invention.

This multiplier is obtained by setting the constants a and b to satisfy the relationships of $(a-1)>0$, $(b-1)>0$, and $\{a-(½)(1+5^{-½})\}>0$ in the multiplier according to the sixteenth embodiment. In this case, the input signal voltages $V_1$, $V_2$, $V_3$, $V_4$, $V_5$, $V_6$, V7, $V_8$, $V_9$, $V_{10}$, $V_{11}$, and $V_{12}$ can be all expressed by the sum of the first and second initial input signal voltages $V_x$ and $V_y$ Therefore, these twelve voltages $V_1$ to $V_{12}$ can be easily realized by resistive dividers.

FIG. 36 shows the simplest structure of the voltage dividing technique using resistors, in which each of the voltages $V_1$ to $V_{12}$ is obtained by division of the sum of the voltage $V_x$ and $V_y$ using resistors.

NINETEENTH EMBODIMENT

Figure 37:
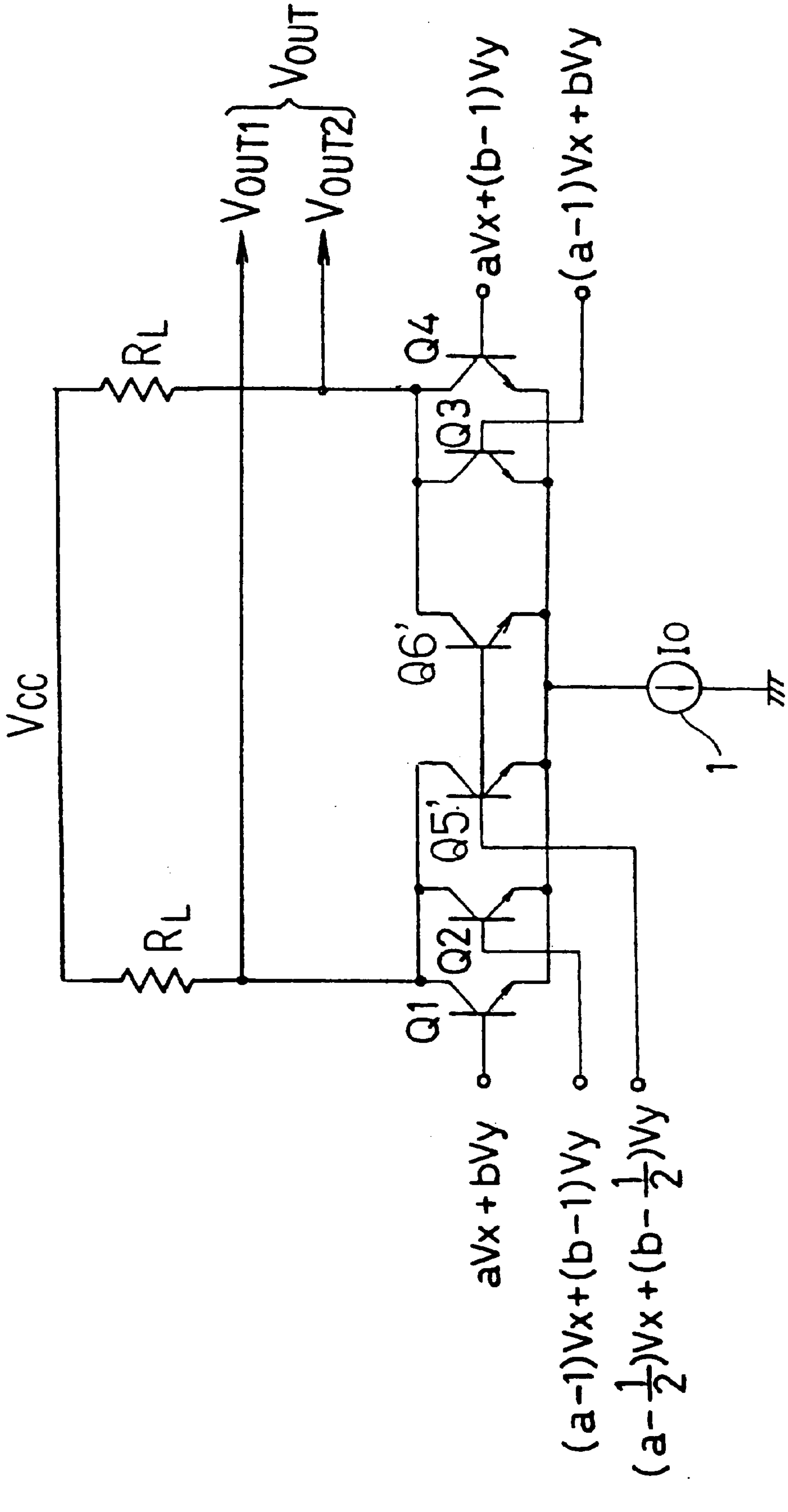
FIG. 37 is a circuit diagram of a bipolar multiplier according to a nineteenth embodiment of the present invention.

FIG. 37 shows a four-quadrant bipolar multiplier according to a nineteenth embodiment of the present invention.

This multiplier is obtained by replacing the npn bipolar transistor Q5 with a third pair of npn-type bipolar transistors Q5' and Q6' in the multiplier according to the first embodiment of FIG. 7A. Therefore, the description about the same configuration is omitted here by adding the same reference characters to the corresponding elements for the sake of simplification.

As shown in FIG. 37, the multitail cell of this multiplier includes a third pair of npn-type bipolar transistors Q5' and Q6' instead of the transistor Q5 in the first embodiment. Emitters of the transistors Q5' and Q6' are commonly connected to the coupled emitters of the transistors Q1, Q2, Q3, and Q4 and are connected to the constant current source 1. The multitail cell is driven by the common tail current $I_0$ from the current source 1.

A collector of the transistor Q5' is connected to the coupled collectors (or output ends) of the transistors Q1 and Q2 which serve as one of the output ends of the multiplier. A collector of the transistor Q6' is connected to the coupled collectors of the transistors Q3 and Q4 which serve as the other of the output ends of the multiplier.

Bases (or input ends) of the transistors Q5' and Q6' are coupled together to be applied with the fifth input signal voltage $V_5$ as $V_5=(a-½)V_x+(b-½)V_y$.

The transistors Q5' and Q6' have the same emitter area as those of the transistors Q1, Q2, Q3 and Q4.

One end of a load resistor $R_L$ is connected to the coupled collectors of the transistors Q1, Q2 and Q5'. One end of another load resistor $R_L$ is connected to the coupled collectors of the transistors Q3, Q4 and Q6'. The other ends of the two resistors $R_L$ are connected to a power supply terminal (not shown) applied with the power supply voltage $V_{CC}$. In other words, the two load resistors $R_L$ are connected to the corresponding output ends of the multiplier and the power supply terminal, respectively.

Two output voltages $V_{OUT1}$ and $V_{OUT2}$ of this multiplier are derived from the corresponding output ends of the multiplier, respectively. It is needless to say that a differential output voltage $V_{OUT}$ which is defined as $V_{OUT}=V_{OUT1}-V_{OUT2}$, may be obtained in the same manner as that of the first embodiment.

The third pair of the transistors Q5 and Q6 having the same emitter area as those of the transistors Q1 to Q4 corresponds to the transistor Q5 having the emitter area twice as much as those of the transistors Q1 to Q4 in the first embodiment where K=2 and $V_C=0$.

In the multiplier according to the first embodiment of FIG. 7A, since the bypass current $I_{BYPASS}$ flows through the transistor Q5, the dc components of the output currents $I_L$ and $I_R$ are not constant, resulting in fluctuation of the operating point. Therefore, it is essential that the multiplication result is obtained from the differential output current $\Delta I=I_L-{}^{I}{}_{R}$.

However, the multiplication result can be obtained from at least one of the output ends of the multiplier in this nineteenth embodiment. The reason is as follows.

The multitail cell is driven by the common tail current Io. As shown in FIG. 37, the bypass current $I_{BYPASS}$ flowing through the transistor Q5 in the first embodiment is equally divided into two branches flowing through the transistors Q5' and Q6'. The two branch currents are then added to the output current of the pair of the transistors Q1 and Q2 and that of the pair of the transistors Q3 and Q4, respectively, thereby generating the output currents $I_L$ and $I_R$. As a result, both of the dc components of the output currents $I_L$ and $I_R$ are kept at a constant of $I_0/2$, which means that the dc operating point is fixed.

Accordingly, even if the load resistors $R_L$ are used for a multiplier as shown in this nineteenth embodiment, the multiplication result can be obtained from not only any one of the output ends of the multiplier but also both of the output end thereof differentially.

The following additional advantages occurs in this embodiment.

First, when an active load is used for a multiplier, the active load is typically formed by using pnp-type bipolar transistors. The pnp-type bipolar transistors are inferior in frequency characteristic to npn-type bipolar transistors. Therefore, no pnp-type bipolar transistors are necessary to be used.

Second, in the viewpoint of fabrication processes for integrated circuits, the combination of npn-type bipolar transistors, pnp-type bipolar transistors, and resistors is lower in maximum operating frequency than the combination of npn-type bipolar transistors and resistors. Therefore, the maximum operating frequency can be prevented from degrading.

Third, in the viewpoint of circuit design, voltage output through resistors is more preferable than the current output itself. Because of the use of the load resistors $R_L$, circuit design is more readily.

TWENTIETH EMBODIMENT

Figure 38:
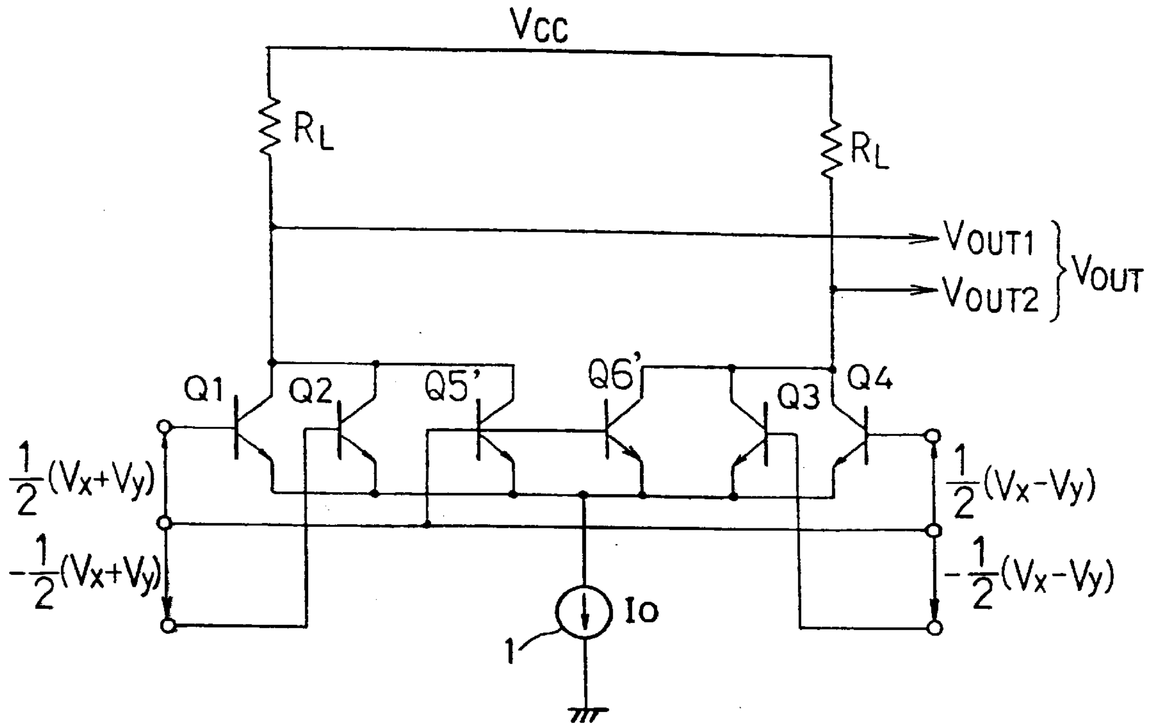
FIG. 38 is a circuit diagram of a bipolar multiplier according to a twentieth embodiment of the present invention.

FIG. 38 shows a four-quadrant bipolar multiplier according to a twentieth embodiment of the present invention.

This multiplier is obtained by replacing the npn bipolar transistor Q5 with a third pair of npn-type bipolar transistors Q5' and Q6' in the multiplier according to the second embodiment of FIG. 11, where the constants a and b are set as a=½ and b=½.

The configuration about the third pair of the transistors Q5' and Q6' is the same as that of the nineteenth embodiment of FIG. 37 and consequently, detailed description is omitted here.

Since $V_C=0$, the coupled bases of the transistors Q5' and Q6' are connected to a reference point, and the first to fourth input voltages $V_1=(½)(V_x+V_y)$, $V_2=(-½)(V_x+V_y)$, $V_3=(½)(V_x-V_y)$, and $V_4=(-½)(V_x-V_y)$ are applied to the bases of the transistors Q1, Q2, Q3, and Q4 with respect to the reference point, respectively.

TWENTY-FIRST EMBODIMENT

Figure 39:
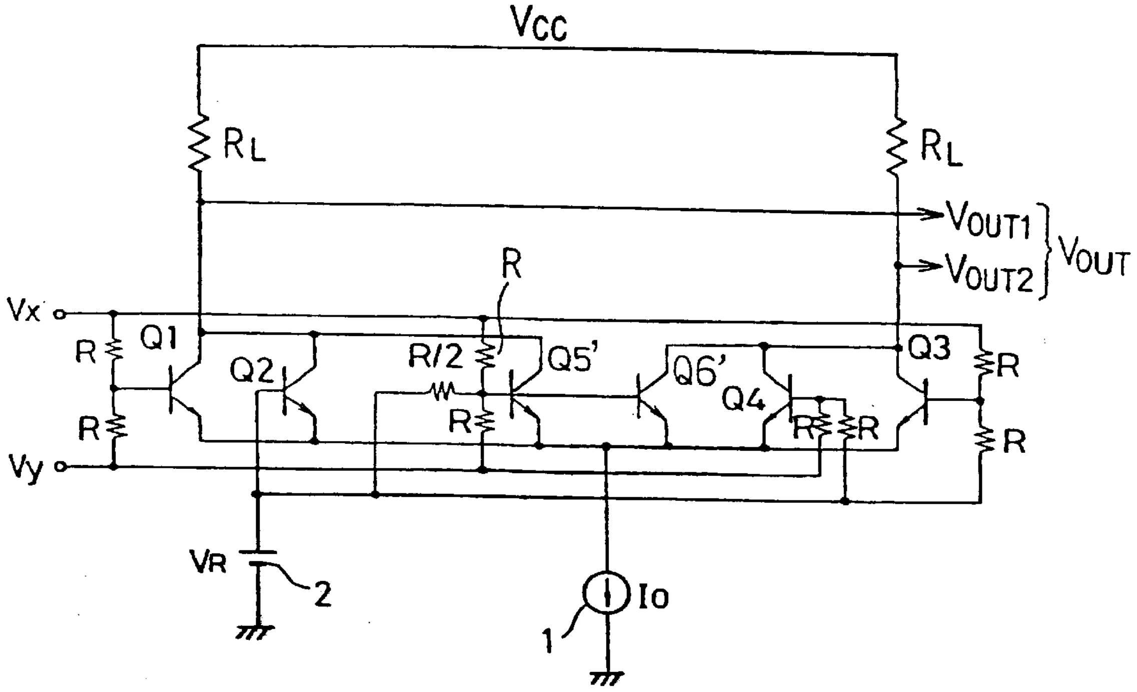
FIG. 39 is a circuit diagram of a bipolar multiplier according to a twenty-first embodiment of the present invention.

FIG. 39 shows a four-quadrant bipolar multiplier according to a twenty-first embodiment of the present invention.

This multiplier is obtained by replacing the npn bipolar transistor Q5 with a third pair of npn-type bipolar transistors Q5' and Q6' in the multiplier according to the third embodiment of FIG. 12.

The configuration about the third pair of the transistors Q5' and Q6' is the same as that of the nineteenth embodiment of FIG. 37 and consequently, detailed description is omitted here.

TWENTY-SECOND EMBODIMENT

Figure 40:
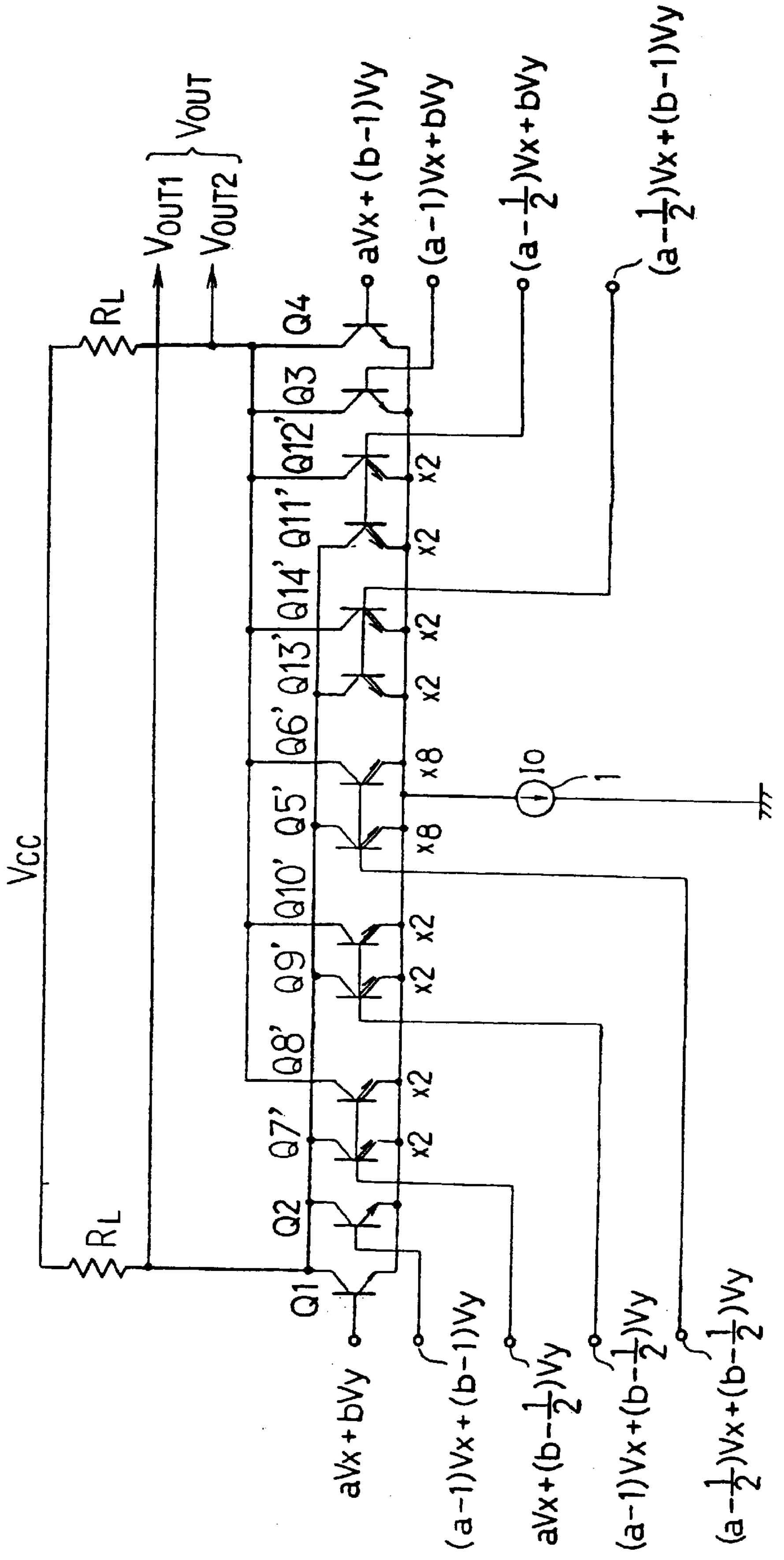
FIG. 40 is a circuit diagram of a bipolar multiplier according to a twenty-second embodiment of the present invention.

FIG. 40 shows a four-quadrant bipolar multiplier according to a twenty-second embodiment of the present invention.

This multiplier is obtained by replacing the npn bipolar transistor Q5, Q6, Q7, Q8 and Q9 with third, fourth, fifth, sixth and seventh pairs of npn-type bipolar transistors Q5' and Q6', Q7' and Q8', Q9' and Q10', Q11' and Q12', and Q13' and Q14' in the multiplier according to the fourth embodiment of FIG. 14A, respectively. Therefore, the description about the same configuration is omitted here by adding the same reference characters to the corresponding elements for the sake of simplification.

As shown in FIG. 40, the multitail cell of this multiplier includes a third pair of npn-type bipolar transistors Q5' and Q6' whose emitter areas are eight (8) times as much as those of the transistors Q1 to Q4 instead of the transistor Q5 whose emitter areas are sixteen (16) times as much as those of the transistors Q1 to Q4 in the fourth embodiment of FIG. 14A.

Emitters of the transistors Q5' and Q6' are commonly connected to the coupled emitters of the transistors Q1, Q2, Q3, and Q4 and are connected to the constant current source 1.

A collector of the transistor Q5' is connected to the coupled collectors of the transistors Q1 and Q2 which serve as one of the output ends of the multiplier. A collector of the transistor Q6' is connected to the coupled collectors of the transistors Q3 and Q4 which serve as the other of the output ends of the multiplier.

Bases of the transistors Q5' and Q6' are coupled together to be applied with the fifth input signal voltage $V_5$ as $V_5=(a-½)V_x+(b-½)V_y$.

The multitail cell further includes a fourth pair of npn-type bipolar transistors Q7' and Q8' whose emitter areas are twice as much as those of the transistors Q1 to Q4 instead of the transistor Q6 whose emitter areas are four (4) times as much as those of the transistors Q1 to Q4 in the fourth embodiment of FIG. 14A.

A fifth pair of npn-type bipolar transistors Q9' and Q10' whose emitter areas are twice as much as those of the transistors Q1 to Q4 is provided instead of the transistor Q7 whose emitter areas are four (4) times as much as those of the transistors Q1 to Q4 in the fourth embodiment of FIG. 14A.

A sixth pair of npn-type bipolar transistors Q11' and Q12' whose emitter areas are twice as much as those of the transistors Q1 to Q4 is provided instead of the transistor Q8 whose emitter areas are four (4) times as much as those of the transistors Q1 to Q4 in the fourth embodiment of FIG. 14A.

A seventh pair of npn-type bipolar transistors Q13' and Q14' whose emitter areas are twice as much as those of the transistors Q1 to Q4 is provided instead of the transistor Q9 whose emitter areas are four (4) times as much as those of the transistors Q1 to Q4 in the fourth embodiment of FIG. 14A.

Emitters of the transistors Q7' to Q14' are commonly connected to the coupled emitters of the transistors Q1, Q2, Q3, and Q4 and are connected to the constant current source 1.

Collectors of the transistors Q7', Q9', Q11' and Q13' are commonly connected to the coupled collectors of the transistors Q1 and Q2 which serve as one of the output ends of the multiplier. Collector of the transistor Q8', Q10', Q12' and Q14' are commonly connected to the coupled collectors of the transistors Q3 and Q4 which serve as the other of the output ends of the multiplier.

Bases of the transistors Q7' and Q8' are coupled together to be applied with the sixth input signal voltage $V_6$ as $V_6=aV_x+(b-½)V_y$.

Bases of the transistors Q9' and Q10' are coupled together to be applied with the seventh input signal voltage $V_7$ as $V_7=(a-1)V_x+(b-½)V_y$.

Bases of the transistors Q11' and Q12' are coupled together to be applied with the eighth input signal voltage $V_8$ as $V_8=(a-½)V_x+bV_y$.

Bases of the transistors Q13' and Q14' are coupled together to be applied with the ninth input signal voltage $V_9$ as $V_9=(a-½)V_x+(b-1)V_y$.

One end of a load resistor $R_L$ is connected to the coupled collectors of the transistors Q1, Q2, Q5', Q7', Q9', Q11' and Q13'. One end of another load resistor $R_L$ is connected to the coupled collectors of the transistors Q3, Q4, Q6', Q8', Q10', Q12' and Q14'. The other ends of the two resistors $R_L$ are connected to a power supply terminal (not shown) applied with the power supply voltage $V_{CC}$. In other words, the two load resistors $R_L$ are connected to the corresponding output ends of the multiplier and the power supply terminal, respectively.

Two output voltages $V_{OUT1}$ and $V_{OUT2}$ of this multiplier are derived from the corresponding output ends of the multiplier, respectively. It is needless to say that a differential output voltage $V_{OUT}$, which is defined as $V_{OUT}=V_{OUT1}-V_{OUT2}$, may be obtained in the same manner as that of the first embodiment.

The third pair of the transistors Q5' and Q6' having the emitter areas eight times as much as those of the transistors Q1 to Q4 corresponds to the transistor Q5 having the emitter area sixteen times as much as those of the transistors Q1 to Q4 in the fourth embodiment where $V_C=0$.

As already stated in the nineteenth embodiment of FIG. 37, the multiplication result can be obtained from at least one of the output ends of the multiplier because of the following reason.

The multitail cell is driven by the common tail current $I_0$. As shown in FIG. 40, each part of the bypass current $I_{BYPASS}$ flowing through the corresponding transistors Q5 to Q9 in the fourth embodiment is equally divided into two branches flowing through the corresponding transistors Q5' and Q6', Q7' and Q8', Q9' and Q10', Q11' and Q12', and Q13' and Q14'. The branch currents flowing through the transistors Q5', Q7', Q9', Q11', and Q13' are then added to the output current of the pair of the transistors Q1 and Q2, and the branch currents flowing through the transistors Q6', Q8', Q10', Q12', and Q14' are then added to that of the pair of the transistors Q3 and Q4, respectively, thereby generating the output currents $I_L$ and $I_R$. As a result, both of the dc components of the output currents $I_L$ and $I_R$ are kept at a constant of $I_0/2$, which means that the dc operating point is fixed.

Accordingly, even if the load resistors $R_L$ are used for a multiplier as shown in this twenty-second embodiment, the multiplication result can be obtained from not only any one of the output ends of the multiplier but also both of the output end thereof differentially.

The same additional advantages as those in the nineteenth embodiment of FIG. 37 is obtained.

TWENTY-THIRD EMBODIMENT

Figure 41:
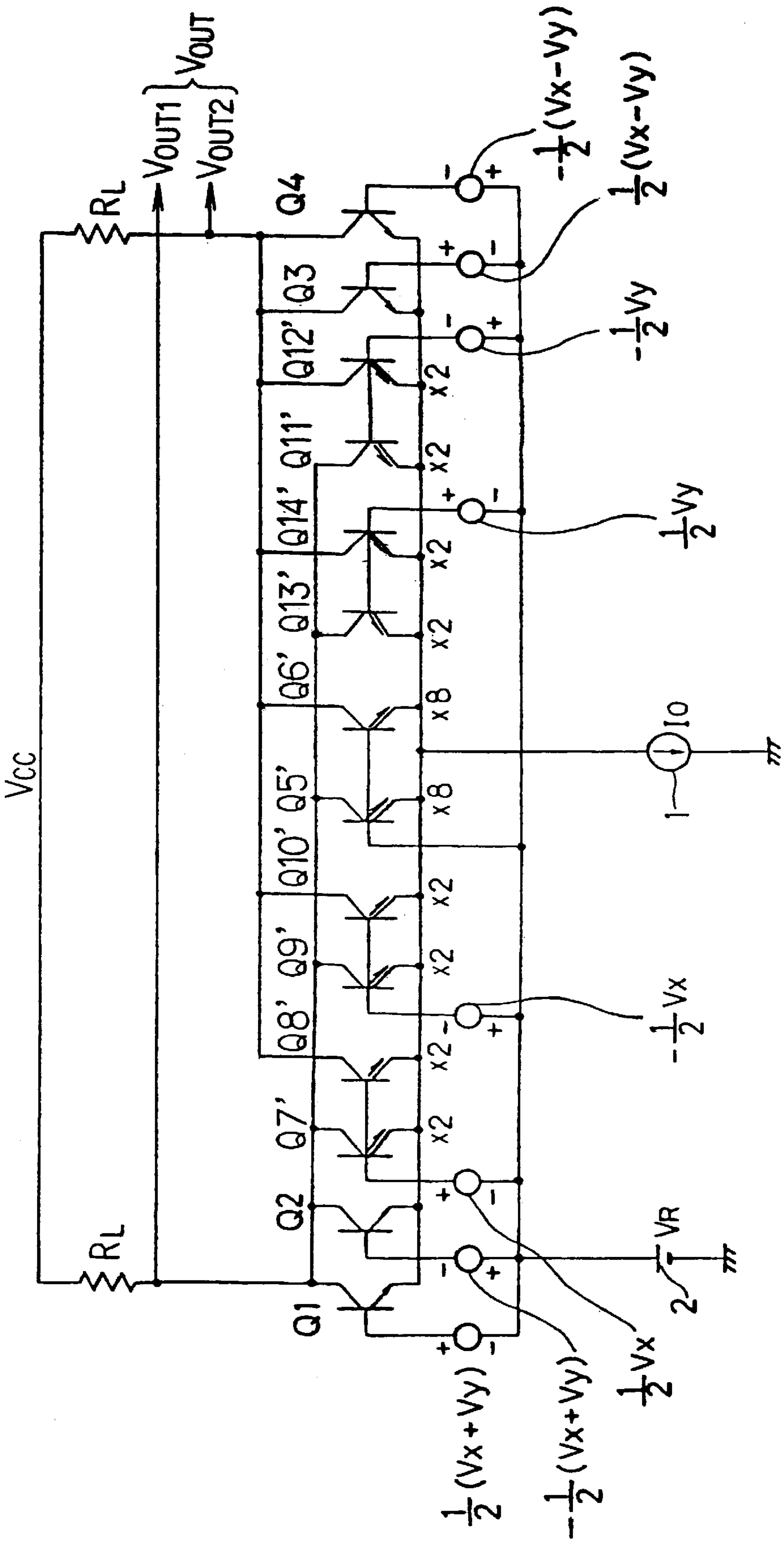
FIG. 41 is a circuit diagram of a bipolar multiplier according to a twenty-third embodiment of the present invention.

FIG. 41 shows a four-quadrant bipolar multiplier according to a twenty-third embodiment of the present invention.

This multiplier is obtained by replacing the npn bipolar transistors Q5 to Q9 with third to seventh pairs of npn-type bipolar transistors Q5' and Q6', Q7' and Q8', Q9' and Q1O', Q11' and Q12', and Q13' and Q14' in the multiplier according to the fifth embodiment of FIG. 18, where a=½ and b=½.

The configuration about the third to seventh transistor pairs is the same as that of the twenty-second embodiment of FIG. 40 and consequently, detailed description is omitted here.

TWENTY-FOURTH EMBODIMENT

Figure 42:
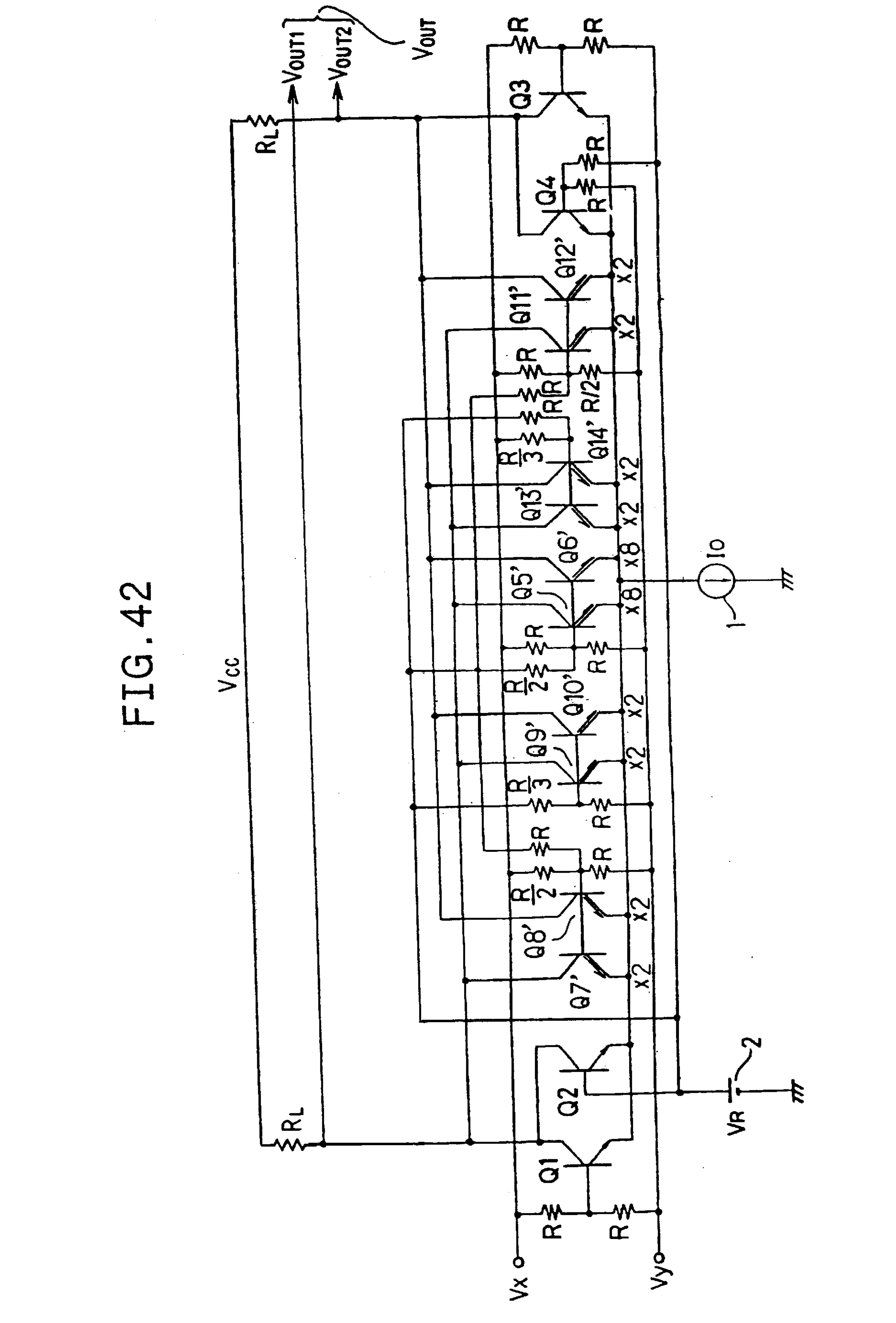
FIG. 42 is a circuit diagram of a bipolar multiplier according to a twenty-fourth embodiment of the present invention.

FIG. 42 shows a four-quadrant bipolar multiplier according to a twenty-fourth embodiment of the present invention.

This multiplier is obtained by replacing the npn bipolar transistors Q5 to Q9 with third to seventh pairs of npn-type bipolar transistors Q5' and Q6', Q7' and Q8', Q9' and Q10', Q11' and Q12', and Q13' and Q14' in the multiplier according to the sixth embodiment of FIG. 19.

The configuration about the third to seventh transistor pairs is the same as that of the twenty-second embodiment of FIG. 40 and consequently, detailed description is omitted here.

TWENTY-FIFTH EMBODIMENT

Figure 43:
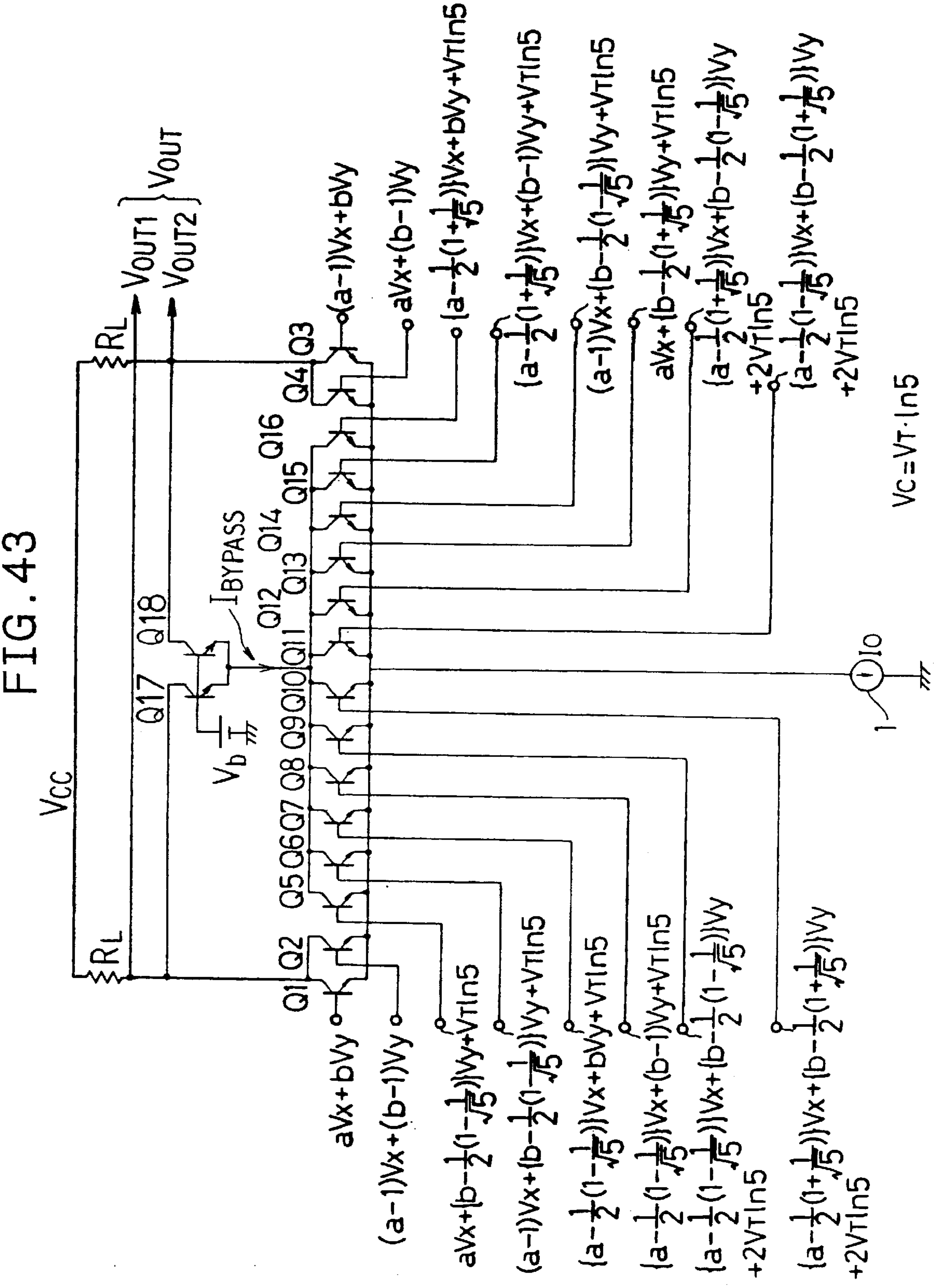
FIG. 43 is a circuit diagram of a bipolar multiplier according to a twenty-fifth embodiment of the present invention.

FIG. 43 shows a four-quadrant bipolar multiplier according to a twenty-fifth embodiment of the present invention.

This multiplier is obtained by adding a pair of npn-type bipolar transistors Q17 and Q18 having the same emitter area with each other to the multiplier according to the seventh embodiment of FIG. 21. Therefore, the description about the same configuration is omitted here by adding the same reference characters to the corresponding elements for the sake of simplification.

As shown in FIG. 43, emitters of the transistors Q17 and Q18 are commonly connected to the coupled emitters of the transistors Q5 to Q16 and are connected to the constant current source 1.

A collector of the transistor Q17 is connected to the coupled collectors of the transistors Q1 and Q2 which serve as one of the output ends of the multiplier. A collector of the transistor Q18 is connected to the coupled collectors of the transistors Q3 and Q4 which serve as the other of the output ends of the multiplier.

Bases of the transistors Q17 and Q18 are coupled together to be connected to a constant voltage source whose supply voltage is $V_b$.

One end of a load resistor $R_L$ is connected to the coupled collectors of the transistors Q1, Q2 and Q17. One end of another load resistor $R_L$ is connected to the coupled collectors of the transistors Q3, Q4 and Q17. The other ends of the two resistors $R_L$ are connected to a power supply terminal (not shown) applied with the power supply voltage $V_{CC}$. In other words, the two load resistors $R_L$ are connected to the corresponding output ends of the multiplier and the power supply terminal, respectively.

Two output voltages $V_{OUT1}$ and $V_{OUT2}$ of this multiplier are derived from the corresponding output ends of the multiplier, respectively. It is needless to say that a differential output voltage $V_{OUT}$, which is defined as $V_{OUT}=V_{OUT1}-V_{OUT2}$, may be obtained in the same manner as that of the first embodiment.

In the twenty-fifth embodiment of FIG. 43, the multiplication result can be obtained from at least one of the output ends of the multiplier because of the following reason.

The multitail cell is driven by the common tail current $I_0$. As shown in FIG. 43, the bypass current $I_{BYPASS}$ flowing through the transistors Q5 to Q16 is equally divided into two branches flowing through the transistors Q17 and Q18. The branch current flowing through the transistor Q17 is then added to the output current of the pair of the transistors Q1 and Q2, and the branch current flowing through the transistor Q18 is then added to that of the pair of the transistors Q3 and Q4, thereby generating the output currents $I_L$ and $I_R$. As a result, both of the dc components of the output currents $I^+$ and $I^-$ are kept at a constant of $I_0/2$, which means that the dc operating point is fixed.

Accordingly, even if the load resistors $R_L$ are used for a multiplier as shown in this twenty-fifth embodiment, the multiplication result can be obtained from not only any one of the output ends of the multiplier but also both of the output end thereof differentially.

The same additional advantages as those in the nineteenth embodiment of FIG. 37 is obtained.

Also in the multiplier according to the twenty-fifth embodiment, the same method as that in the nineteenth and twenty-second embodiments of FIGS. 37 and 40 where a specific transistor is replaced with a balanced pair of bipolar transistors whose emitter areas are equal to a half of that of the specific transistor can be applied. However, the use of this method increase the number of the transistors.

An advantage that the number of the necessary transistors are restricted in the multiplier according to the twenty-fifth embodiment is obtained.

TWENTY-SIXTH EMBODIMENT

Figure 44:
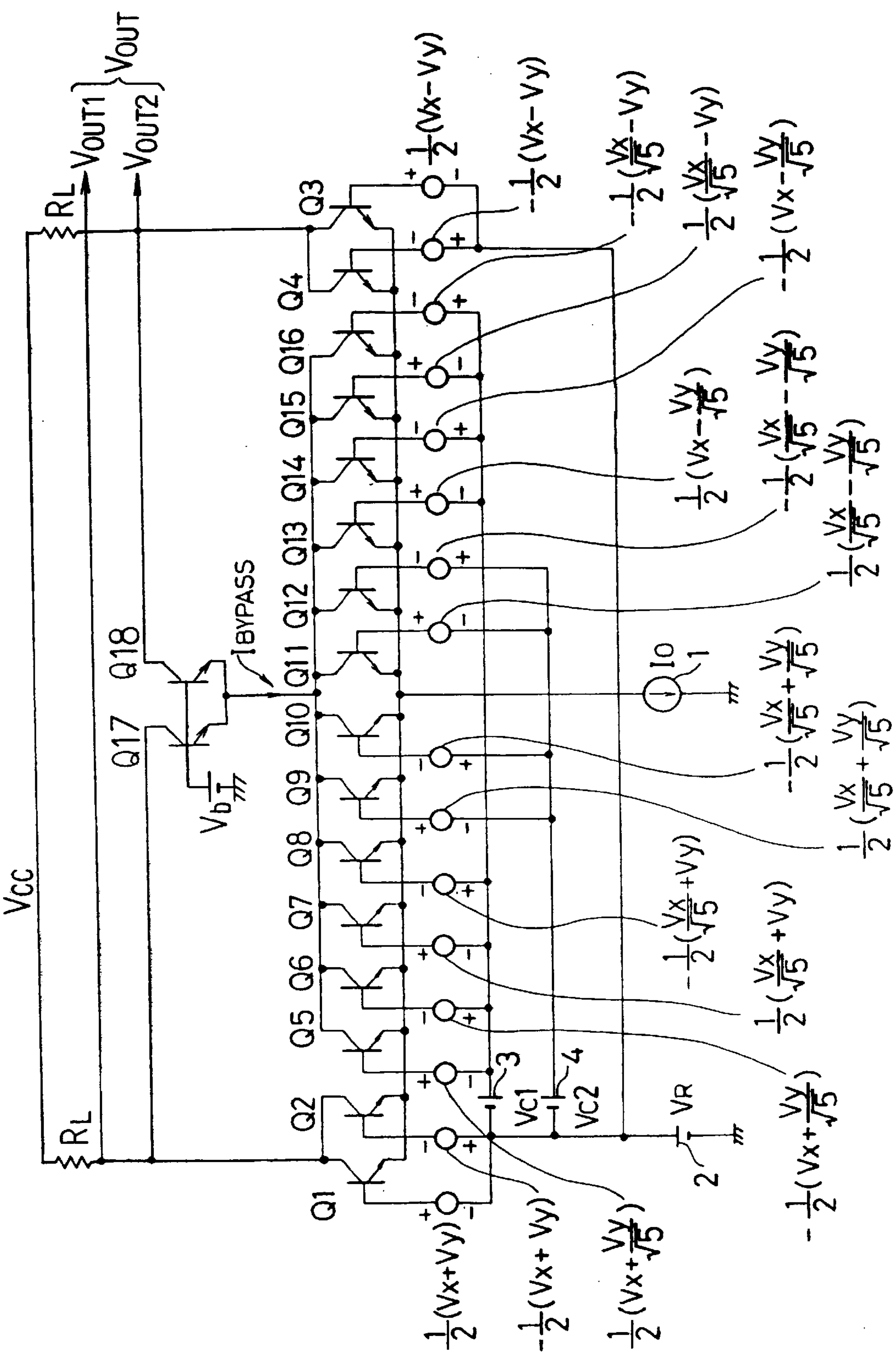
FIG. 44 is a circuit diagram of a bipolar multiplier according to a twenty-sixth embodiment of the present invention.

FIG. 44 shows a four-quadrant bipolar multiplier according to a twenty-sixth embodiment of the present invention.

This multiplier is obtained by adding a pair of npn-type bipolar transistors Q17 and Q18 having the same emitter area with each other to the multiplier according to the eighth embodiment of FIG. 26.

The configuration about the pair of the transistors Q17 and Q18 is the same as that of the twenty-fifth embodiment of FIG. 43 and consequently, detailed description is omitted here.

TWENTY-SEVENTH EMBODIMENT

Figure 45:
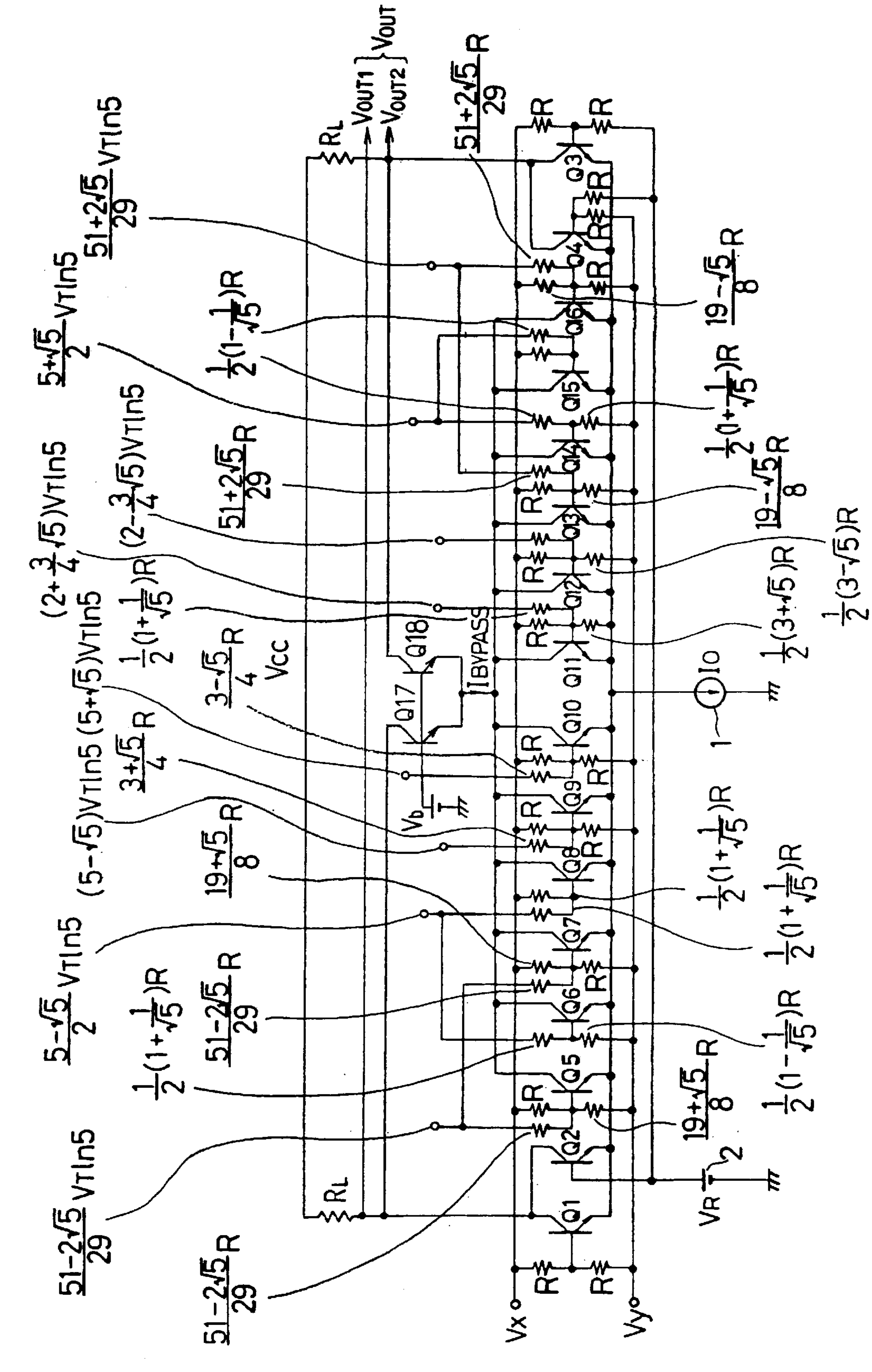
FIG. 45 is a circuit diagram of a bipolar multiplier according to a twenty-seventh embodiment of the present invention.

FIG. 45 shows a four-quadrant bipolar multiplier according to a twenty-seventh embodiment of the present invention.

This multiplier is obtained by adding a pair of npn-type bipolar transistors Q17 and Q18 having the same emitter area with each other to the multiplier according to the ninth embodiment of FIG. 27.

The configuration about the pair of the transistors Q17 and Q18 is the same as that of the twenty-fifth embodiment of FIG. 43 and consequently, detailed description is omitted here.

TWENTY-EIGHTH EMBODIMENT

Figure 46:
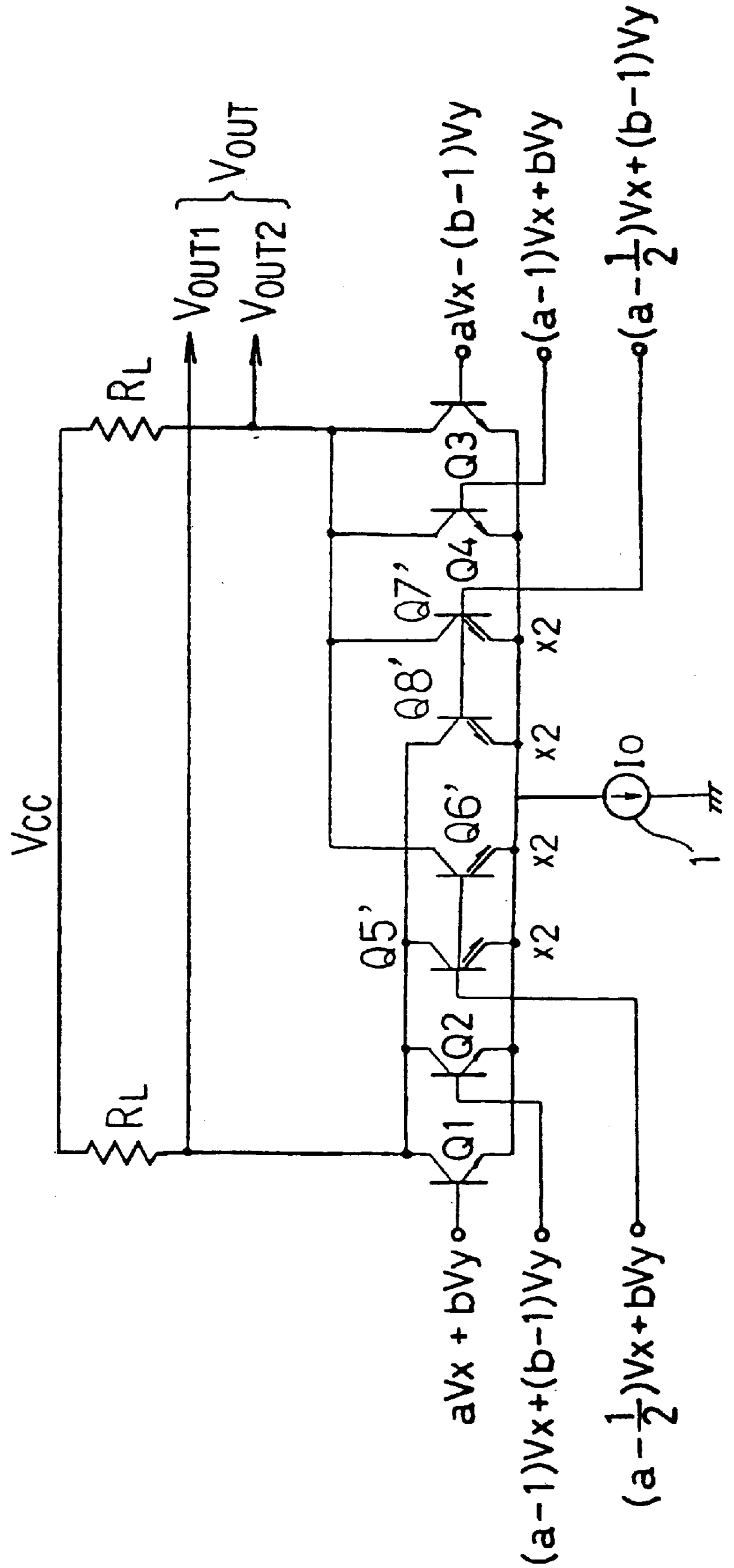
FIG. 46 is a circuit diagram of a bipolar multiplier according to a twenty-eighth embodiment of the present invention.

FIG. 46 shows a four-quadrant bipolar multiplier according to a twenty-eighth embodiment of the present invention.

This multiplier is obtained by replacing the npn bipolar transistors Q5 and Q6 with a third pair of npn-type bipolar transistors Q5' and Q6' and a fourth pair of npn-type bipolar transistors Q7' and Q8' in the multiplier according to the tenth embodiment of FIG. 28. Therefore, the description about the same configuration is omitted here by adding the same reference characters to the corresponding elements for the sake of simplification.

As shown in FIG. 46, the multitail cell of this multiplier includes a third pair of npn-type bipolar transistors Q5' and Q6' instead of the transistor Q5 in the tenth embodiment.

Emitters of the transistors Q5' and Q6' are commonly connected to the coupled emitters of the transistors Q1, Q2, Q3, and Q4 and are connected to the constant current source 1. The multitail cell is driven by the common tail current $I_0$ from the current source 1.

A collector of the transistor Q5' is connected to the coupled collectors of the transistors Q1 and Q2 which serve as one of the output ends of the multiplier. A collector of the transistor Q6' is connected to the coupled collectors of the transistors Q3 and Q4 which serve as the other of the output ends of the multiplier.

Bases of the transistors Q5' and Q6' are coupled together to be applied with the fifth input signal voltage $V_5$ as $V_5=(a-½)V_x+bV_y$.

The transistors Q5' and Q6' have emitter areas twice as much as those of the transistors Q1, Q2, Q3 and Q4.

The multitail cell of this multiplier further includes a fourth pair of npn-type bipolar transistors Q7' and Q8' instead of the transistor Q6 in the tenth embodiment.

Emitters of the transistors Q7' and Q8' are commonly connected to the coupled emitters of the transistors Q1, Q2, Q3, and Q4 and are connected to the constant current source 1.

A collector of the transistor Q7' is connected to the coupled collectors of the transistors Q1 and Q2. A collector of the transistor Q8' is connected to the coupled collectors of the transistors Q3 and Q4.

Bases of the transistors Q7' and Q8' are coupled together to be applied with the sixth input signal voltage $V_6$ as $V_6=(a-½)V_x+(b-1)V_y$.

The transistors Q7' and Q8' have emitter areas twice as much as those of the transistors Q1, Q2, Q3 and Q4.

One end of a load resistor $R_L$ is connected to the coupled collectors of the transistors Q1, Q2, Q5' and Q6'. One end of another load resistor $R_L$ is connected to the coupled collectors of the transistors Q3, Q4, Q7' and Q8'. The other ends of the two resistors $R_L$ are connected to a power supply terminal (not shown) applied with the power supply voltage $V_{CC}$. In other words, the two load resistors $R_L$ are connected to the corresponding output ends of the multiplier and the power supply terminal, respectively.

Two output voltages $V_{OUT1}$ and $V_{OUT2}$ of this multiplier are derived from the corresponding output ends of the multiplier, respectively. It is needless to say that a differential output voltage $V_{OUT}$, which is defined as $V_{OUT}$32 $V_{OUT1}-V_{OUT2}$, may be obtained in the same manner as that of the first embodiment.

The dc voltage $V_C$ (=$2V_T \cdot \ln 2$) in the tenth embodiment of FIG. 28 is equivalent to the configuration that the emitter areas of the transistors Q5 and Q6 are set as four (4) times as much as those of the transistors Q1 to Q4.

Therefore, to set the dc voltage $V_C$ as zero in the tenth embodiment, (i.e., $V_C=0$) the transistor Q5 whose emitter area is the same as those of the transistors Q1 to Q4 is replaced with the pair of the transistor Q5' and Q6' whose emitter areas are twice as much as those of the transistors Q1 to Q4. Similarly, the transistor Q6 whose emitter area is the same as those of the transistors Q1 to Q4 is replaced with the pair of the transistor Q7' and Q8' whose emitter areas are twice as much as those of the transistors Q1 to Q4.

In the multiplier according to this twenty-eighth embodiment, a half of the bypass current $I_{BYPASS}$ flowing through the transistor Q5 in the tenth embodiment is equally divided into two branches flowing through the transistors Q5' and Q6'. The two branch currents are then added to the output current of the pair of the transistors Q1 and Q2. Similarly, the other half of the bypass current $I_{BYPASS}$ flowing through the transistor Q6 in the tenth embodiment is equally divided into two branches flowing through the transistors Q7' and Q8'. The two branch currents are then added to the output current of the pair of the transistors Q3 and Q4. Thus, the output currents $I_L$ and $I_R$ are generated.

As a result, both of the dc components of the output currents $I^+$ and $I^-$ are kept at a constant of $I_0/2$, which means that the dc operating point is fixed.

Accordingly, even if the load resistors $R_L$ are used for a multiplier as shown in this embodiment, the multiplication result can be obtained from not only any one of the output ends of the multiplier but also both of the output end thereof differentially.

The same additional advantages as those in the nineteenth embodiment of FIG. 37 occur in this embodiment.

TWENTY-NINTH EMBODIMENT

Figure 47:
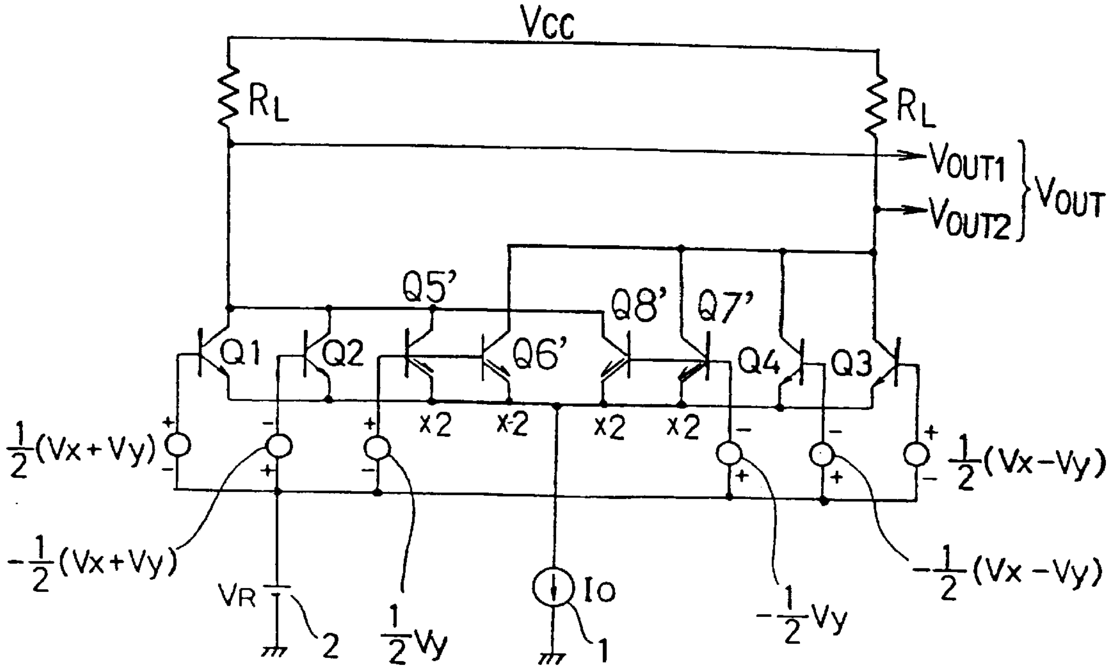
FIG. 47 is a circuit diagram of a bipolar multiplier according to a twenty-ninth embodiment of the present invention.

FIG. 47 shows a four-quadrant bipolar multiplier according to a twenty-ninth embodiment of the present invention.

This multiplier is obtained by replacing the npn bipolar transistors Q5 and Q6 with a third pair of npn-type bipolar transistors Q5' and Q6' and a fourth pair of npn-type bipolar transistors Q7' and Q8' in the multiplier according to the eleventh embodiment of FIG. 29.

The configuration about the third and fourth pairs of the transistors Q5' and Q6' and Q7' and Q8' are the same as that of the twenty-eighth embodiment of FIG. 46 and consequently, detailed description is omitted here.

THIRTIETH EMBODIMENT

Figure 48:
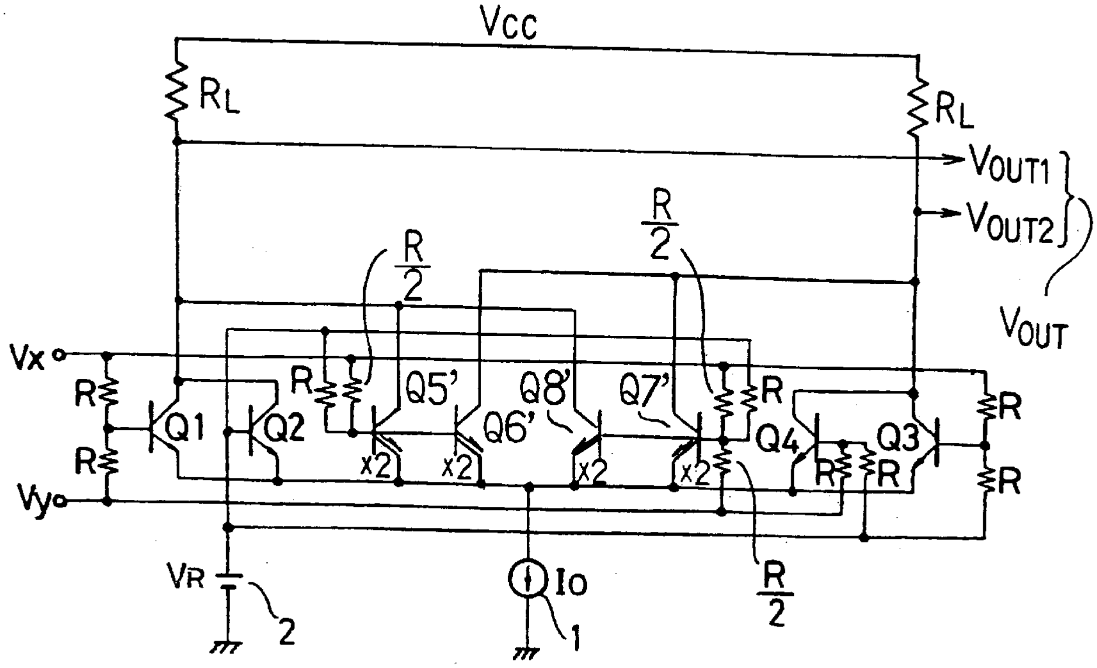
FIG. 48 is a circuit diagram of a bipolar multiplier according to a thirtieth embodiment of the present invention.

FIG. 48 shows a four-quadrant bipolar multiplier according to a thirtieth embodiment of the present invention.

This multiplier is obtained by replacing the npn bipolar transistors Q5 and Q6 with a third pair of npn-type bipolar transistors Q5' and Q6' and a fourth pair of npn-type bipolar transistors Q7' and Q8' in the multiplier according to the twelfth embodiment of FIG. 30.

The configuration about the third and fourth pairs of the transistors Q5' and Q6' and Q7' and Q8' are the same as that of the twenty-eighth embodiment of FIG. 46 and consequently, detailed description is omitted here.

THIRTY-FIRST EMBODIMENT

Figure 49:
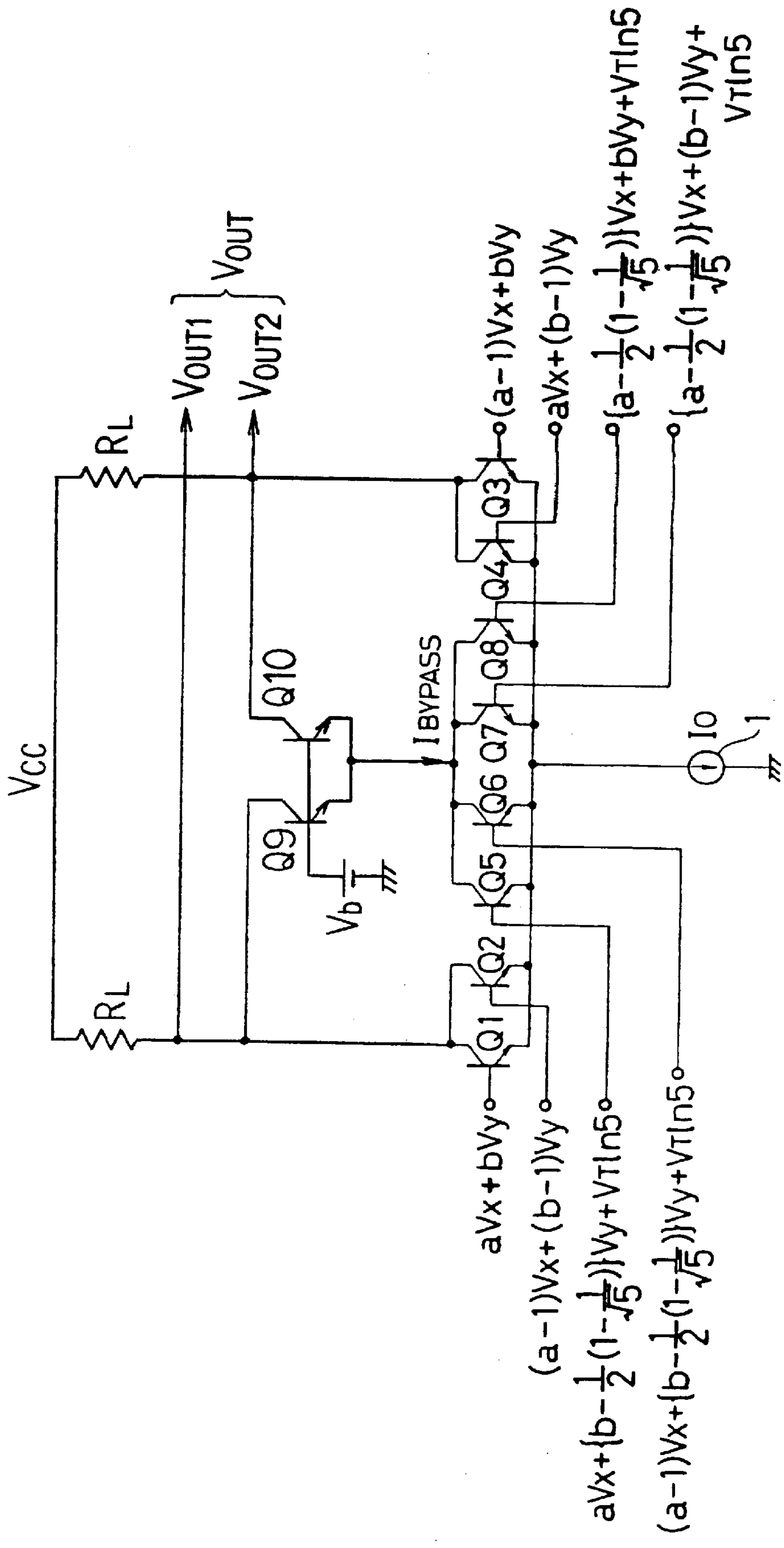
FIG. 49 is a circuit diagram of a bipolar multiplier according to a thirty-first embodiment of the present invention.

FIG. 49 shows a four-quadrant bipolar multiplier according to a thirty-first embodiment of the present invention.

This multiplier is obtained by adding a pair of npn-type bipolar transistors Q9 and Q10 having the same emitter area with each other to the multiplier according to the thirteenth embodiment of FIG. 31. Therefore, the description about the same configuration is omitted here by adding the same reference characters to the corresponding elements for the sake of simplification.

As shown in FIG. 49, emitters of the transistors Q9 and Q10 are commonly connected to the coupled emitters of the transistors Q5 to Q8 and are connected to the constant current source 1.

A collector of the transistor Q9 is connected to the coupled collectors of the transistors Q1 and Q2 which serve as one of the output ends of the multiplier. A collector of the transistor Q10 is connected to the coupled collectors of the transistors Q3 and Q4 which serve as the other of the output ends of the multiplier.

Bases of the transistors Q9 and Q10 are coupled together to be connected to a constant voltage source whose supply voltage is $V_b$.

One end of a load resistor $R_L$ is connected to the coupled collectors of the transistors Q1, Q2 and Q9. One end of another load resistor $R_L$ is connected to the coupled collectors of the transistors Q3, Q4 and Q10 . The other ends of the two resistors $R_L$ are connected to a power supply terminal (not shown) applied with the power supply voltage $V_{CC}$. In other words, the two load resistors $R_L$ are connected to the corresponding output ends of the multiplier and the power supply terminal, respectively.

Two output voltages $V_{OUT1}$ and $V_{OUT2}$ of this multiplier are derived from the corresponding output ends of the multiplier, respectively. It is needless to say that a differential output voltage $V_{OUT}$, which is defined as $V_{OUT}=V_{OUT1}-V_{OUT2}$, may be obtained in the same manner as that of the first embodiment.

In the thirty-first embodiment of FIG. 49, the multiplication result can be obtained from at least one of the output ends of the multiplier because of the following reason.

As shown in FIG. 49, the bypass current $I_{BYPASS}$ flowing through the transistors Q5 to Q8 is equally divided into two branches flowing through the transistors Q9 and Q10. The branch current flowing through the transistor Q9 is then added to the output current of the pair of the transistors Q1 and Q2, and the branch current flowing through the transistor Q10 is then added to that of the pair of the transistors Q3 and Q4, thereby generating the output currents $I_L$ and $I_R$. As a result, both of the dc components of the output currents $I^+$ and $I^-$ are kept at a constant of $I_0/2$, which means that the dc operating point is fixed.

Accordingly, even if the load resistors $R_L$ are used for a multiplier as shown in this thirty-first embodiment, the multiplication result can be obtained from not only any one of the output ends of the multiplier but also both of the output end thereof differentially.

The same additional advantages as those in the nineteenth embodiment of FIG. 37 is obtained.

Also in the multiplier according to the thirty-first embodiment, the same method as that in the nineteenth and twenty-second embodiments of FIGS. 37 and 40 where a specific transistor is replaced with a balanced pair of bipolar transistors whose emitter areas are equal to a half of that of the specific transistor can be applied. However, the use of this method increase the number of the transistors.

An advantage that the number of the necessary transistors are restricted in the multiplier according to the thirty-first embodiment is obtained.

THIRTY-SECOND EMBODIMENT

Figure 50:
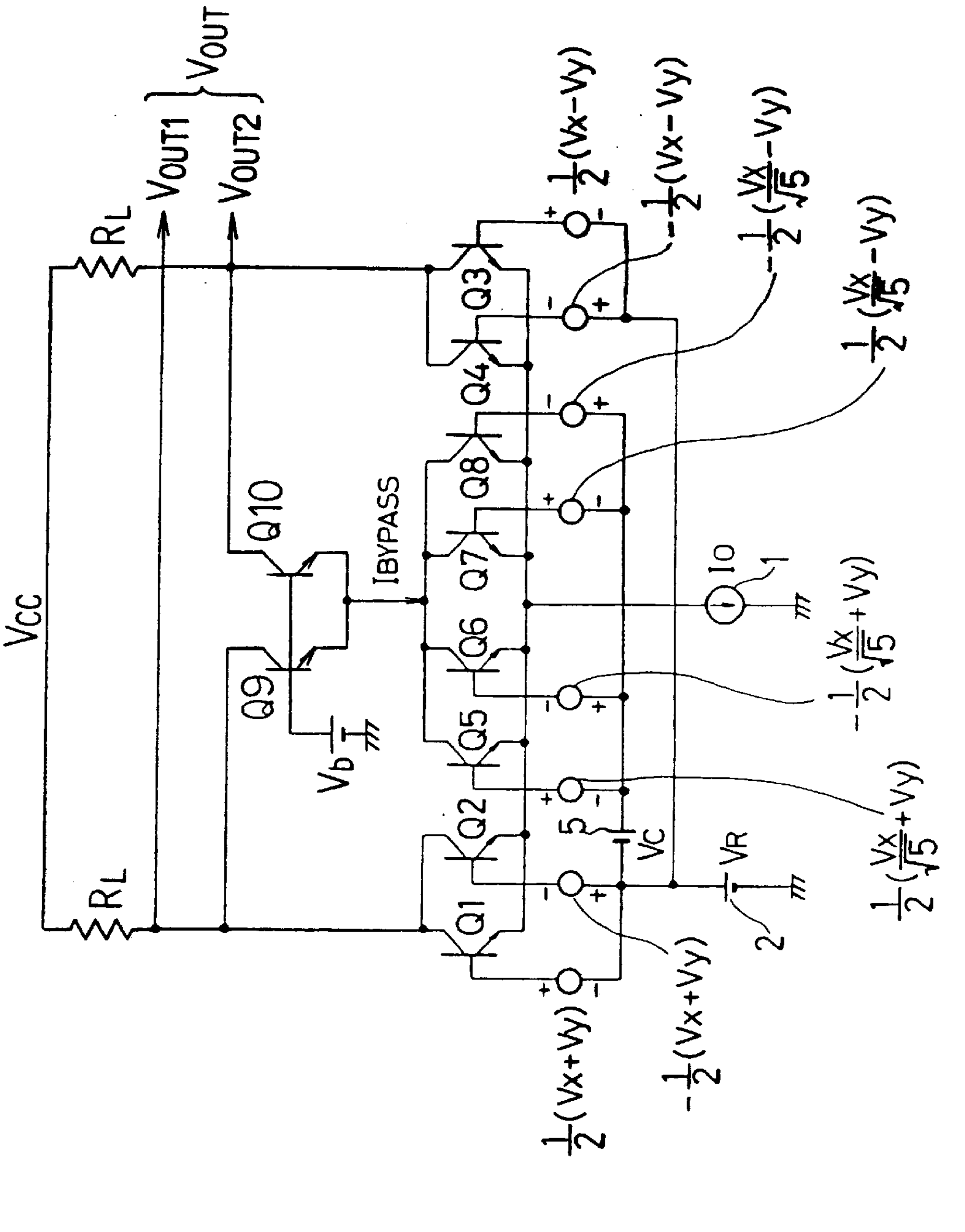
FIG. 50 is a circuit diagram of a bipolar multiplier according to a thirty-second embodiment of the present invention.

FIG. 50 shows a four-quadrant bipolar multiplier according to a thirty-second embodiment of the present invention.

This multiplier is obtained by adding a pair of npn-type bipolar transistors Q9 and Q10 having the same emitter area with each other to the multiplier according to the fourteenth embodiment of FIG. 32.

The configuration about the pair of the transistors Q9 and Q10 is the same as that of the thirty-first embodiment of FIG. 43 and consequently, detailed description is omitted here.

THIRTY-THIRD EMBODIMENT

Figure 51:
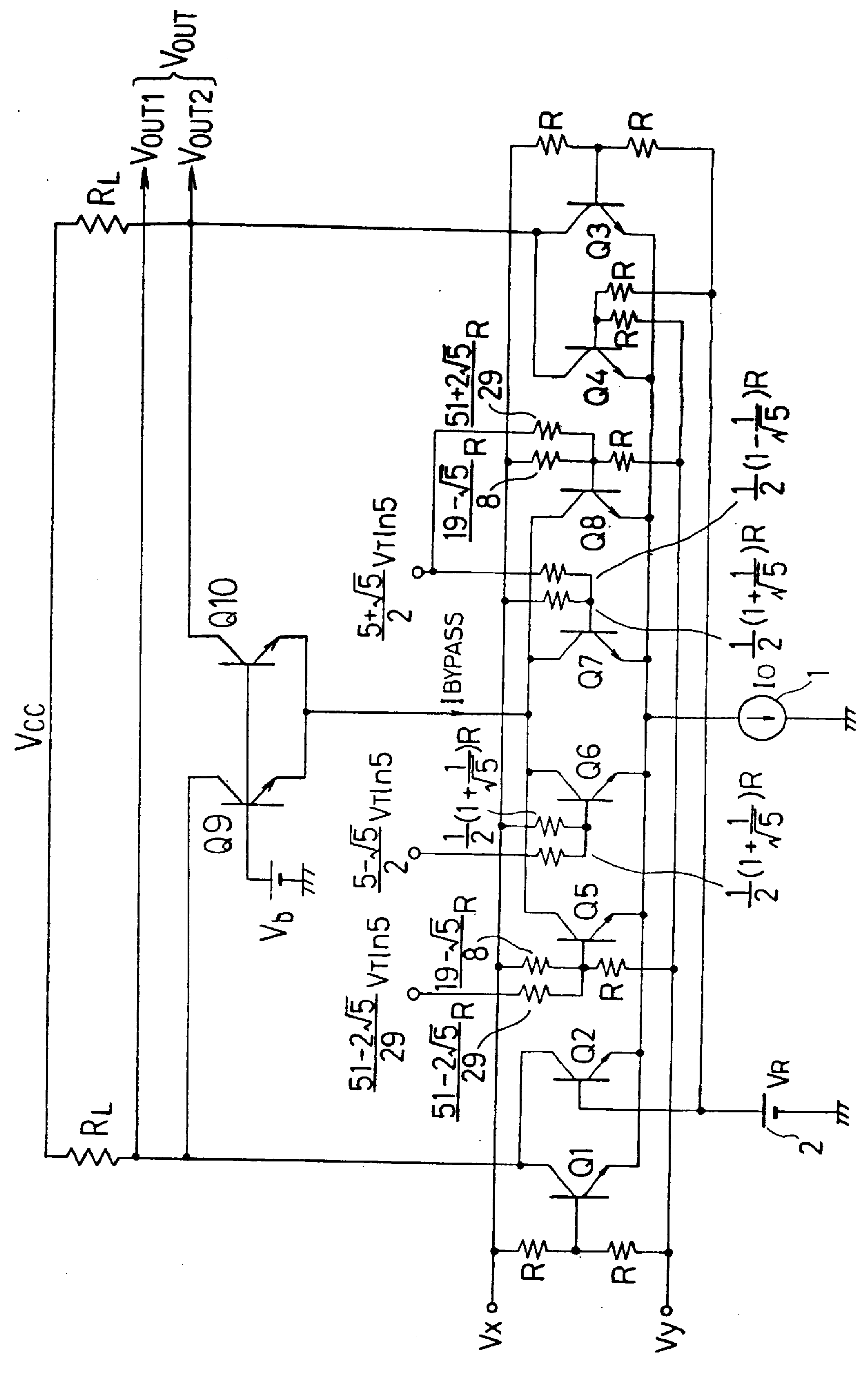
FIG. 51 is a circuit diagram of a bipolar multiplier according to a thirty-third embodiment of the present invention.

FIG. 51 shows a four-quadrant bipolar multiplier according to a thirty-third embodiment of the present invention.

This multiplier is obtained by adding a pair of npn-type bipolar transistors Q9 and Q10 having the same emitter area with each other to the multiplier according to the fifteenth embodiment of FIG. 33.

The configuration about the pair of the transistors Q9 and Q10 is the same as that of the thirty-first embodiment of FIG. 43 and consequently, detailed description is omitted here.

THIRTY-FOURTH EMBODIMENT

Figure 52:
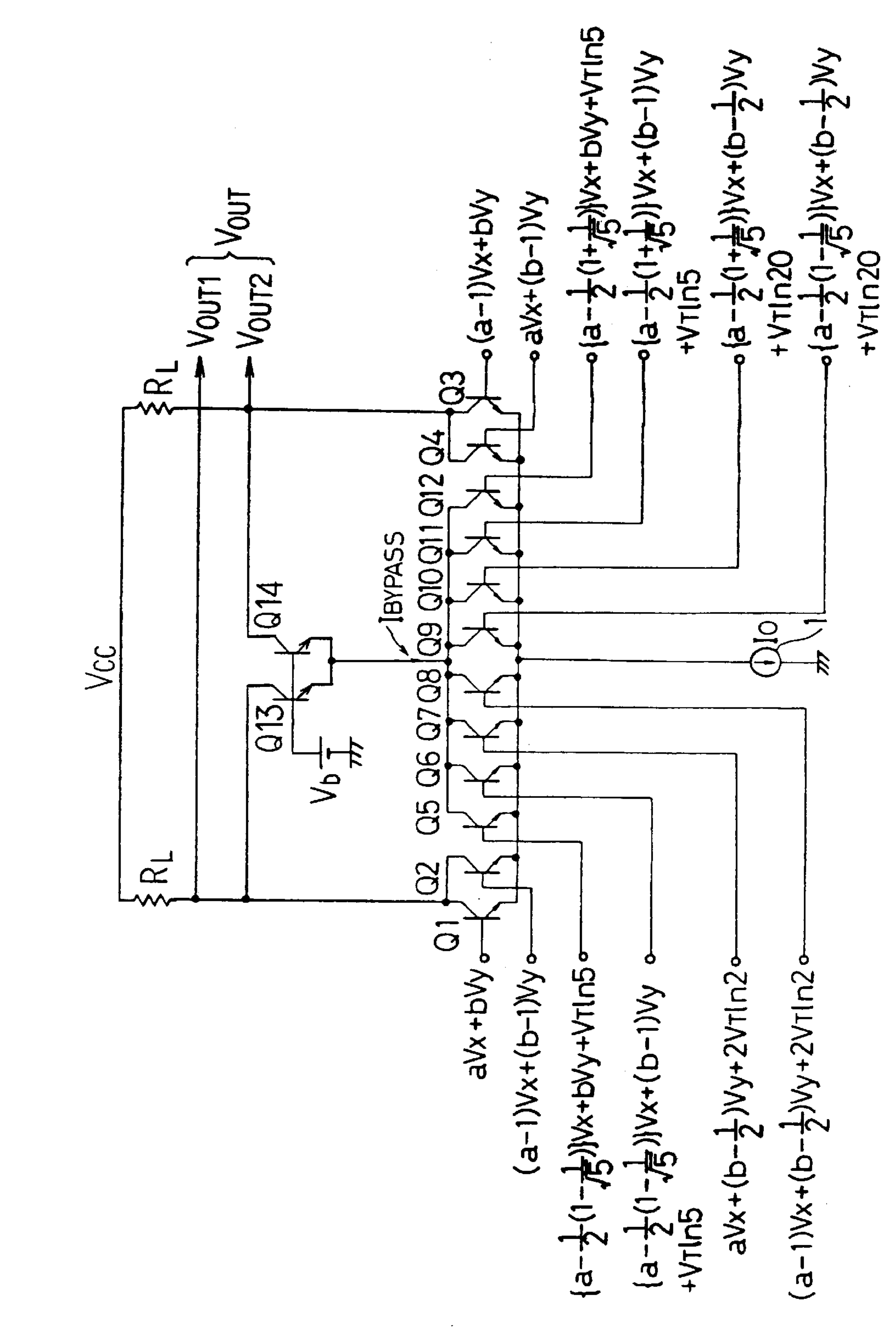
FIG. 52 is a circuit diagram of a bipolar multiplier according to a thirty-fourth embodiment of the present invention.

FIG. 52 shows a four-quadrant bipolar multiplier according to a thirty-fourth embodiment of the present invention.

This multiplier is obtained by adding a pair of npn-type bipolar transistors Q13 and Q14 having the same emitter area with each other to the multiplier according to the sixteenth embodiment of FIG. 34. Therefore, the description about the same configuration is omitted here by adding the same reference characters to the corresponding elements for the sake of simplification.

As shown in FIG. 52, emitters of the transistors Q13 and Q14 are commonly connected to the coupled emitters of the transistors Q5 to Q12 and are connected to the constant current source 1.

A collector of the transistor Q13 is connected to the coupled collectors of the transistors Q1 and Q2 which serve as one of the output ends of the multiplier. A collector of the transistor Q14 is connected to the coupled collectors of the transistors Q3 and Q4 which serve as the other of the output ends of the multiplier.

Bases of the transistors Q13 and Q14 are coupled together to be connected to a constant voltage source whose supply voltage is $V_b$.

One end of a load resistor $R_L$ is connected to the coupled collectors of the transistors Q1, Q2 and Q13. One end of another load resistor $R_L$ is connected to the coupled collectors of the transistors Q3, Q4 and Q14. The other ends of the two resistors $R_L$ are connected to a power supply terminal (not shown) applied with the power supply voltage $V_{CC}$. In other words, the two load resistors $R_L$ are connected to the corresponding output ends of the multiplier and the power supply terminal, respectively.

Two output voltages $V_{OUT1}$ and $V_{OUT2}$ of this multiplier are derived from the corresponding output ends of the multiplier, respectively. It is needless to say that a differential output voltage $V_{OUT}$, which is defined as $V_{OUT}=V_{OUT1}-V_{OUT2}$, may be obtained in the same manner as that of the first embodiment.

In the thirty-fourth embodiment of FIG. 52, the multiplication result can be obtained from at least one of the output ends of the multiplier because of the following reason.

As shown in FIG. 52, the bypass current $I_{BYPASS}$ flowing through the transistors Q5 to Q12 is equally divided into two branches flowing through the transistors Q13 and Q14. The branch current flowing through the transistor Q13 is then added to the output current of the pair of the transistors Q1 and Q2, and the branch current flowing through the transistor Q14 is then added to that of the pair of the transistors Q3 and Q4, thereby generating the output currents $I^+$ and $I^-$. As a result, both of the dc components of the output currents $I^+$ and $I^-$ are kept at a constant of $I_0/2$, which means that the dc operating point is fixed.

Accordingly, even if the load resistors $R_L$ are used for a multiplier as shown in this thirty-fourth embodiment, the multiplication result can be obtained from not only any one of the output ends of the multiplier but also both of the output end thereof differentially.

The same additional advantages as those in the nineteenth embodiment of FIG. 37 is obtained.

Also in the multiplier according to the thirty-fourth embodiment, the same method as that in the nineteenth and twenty-second embodiments of FIGS. 37 and 40 where a specific transistor is replaced with a balanced pair of bipolar transistors whose emitter areas are equal to a half of that of the specific transistor can be applied. However, the use of this method increase the number of the transistors.

An advantage that the number of the necessary transistors are restricted in the multiplier according to the thirty-first embodiment is obtained.

THIRTY-FIFTH EMBODIMENT

Figure 53:
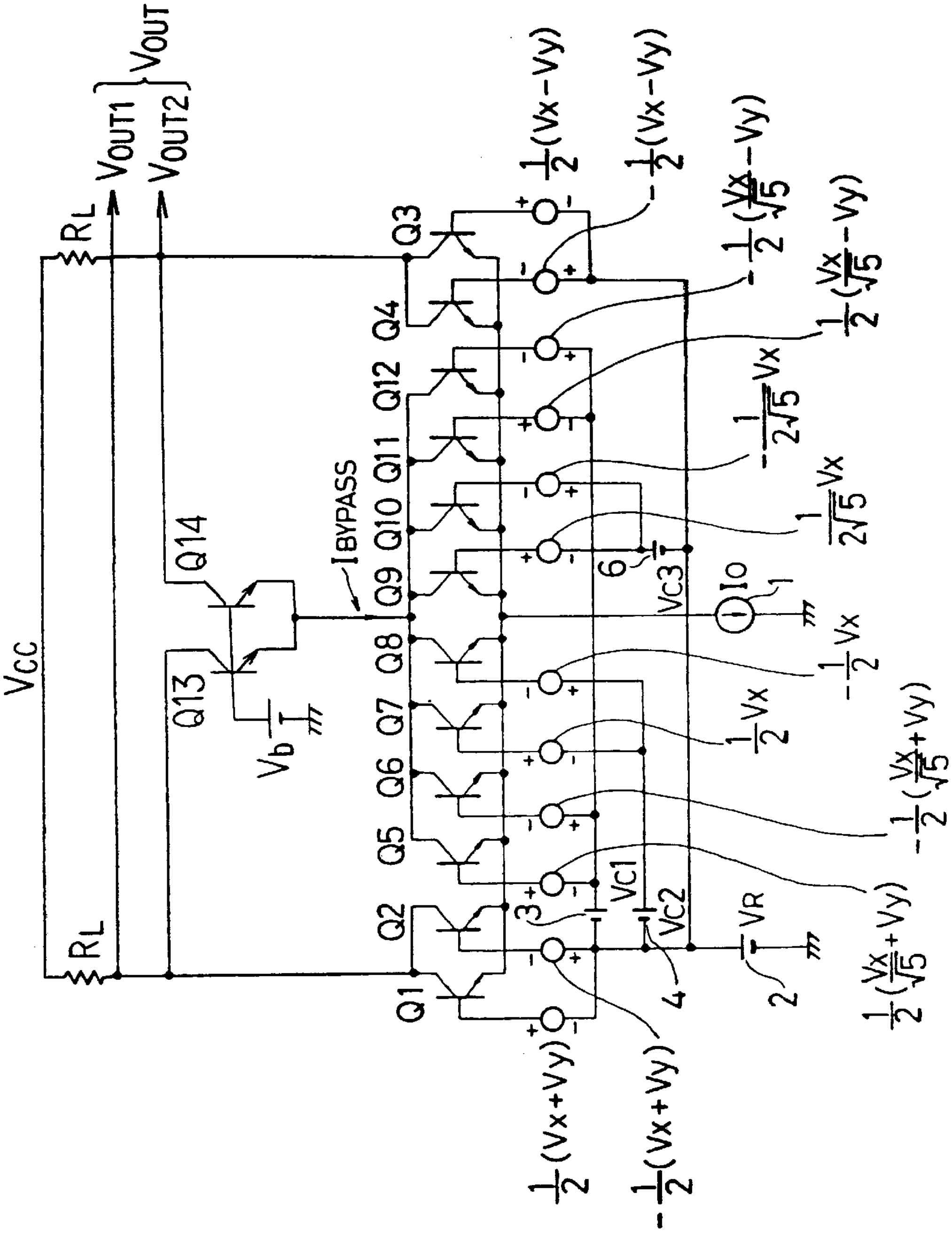
FIG. 53 is a circuit diagram of a bipolar multiplier according to a thirty-fifth embodiment of the present invention.

FIG. 53 shows a four-quadrant bipolar multiplier according to a thirty-fifth embodiment of the present invention.

This multiplier is obtained by adding a pair of npn-type bipolar transistors Q13 and Q14 having the same emitter area with each other to the multiplier according to the seventeenth embodiment of FIG. 35.

The configuration about the pair of the transistors Q13 and Q14 is the same as that of the thirty-fourth embodiment of FIG. 52 and consequently, detailed description is omitted here.

THIRTY-SIXTH EMBODIMENT

Figure 54:
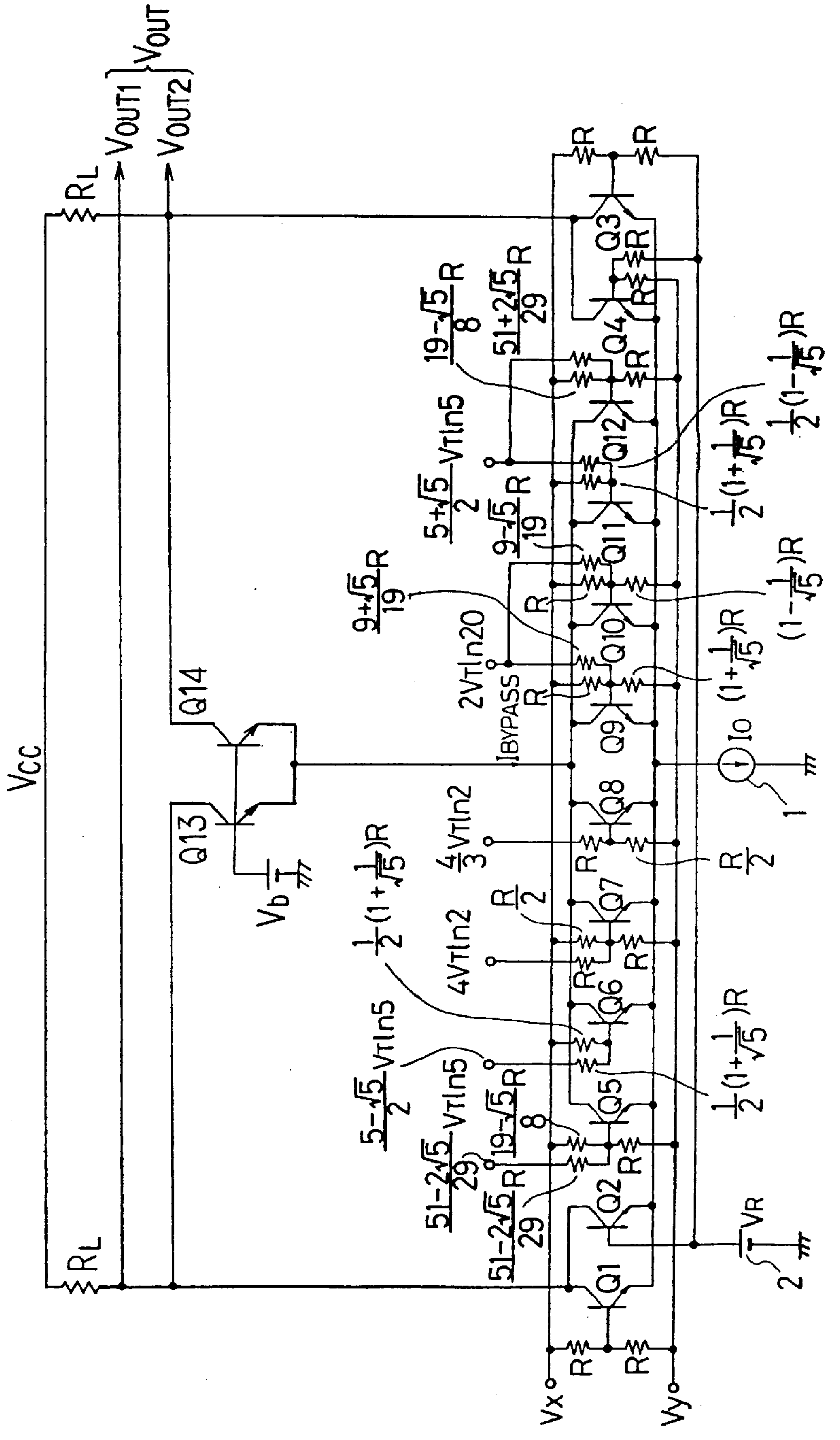
FIG. 54 is a circuit diagram of a bipolar multiplier according to a thirty-sixth embodiment of the present invention.

FIG. 54 shows a four-quadrant bipolar multiplier according to a thirty-sixth embodiment of the present invention.

This multiplier is obtained by adding a pair of npn-type bipolar transistors Q13 and Q14 having the same emitter area with each other to the multiplier according to the eighteenth embodiment of FIG. 36.

The configuration about the pair of the transistors Q13 and Q14 is the same as that of the thirty-fourth embodiment of FIG. 52 and consequently, detailed description is omitted here.

As described above, with the present invention having the multitail cell configuration, the number of bipolar transistors can be changed, depending upon such factors as whether the inputs are to be of symmetrical type or asymmetrical one, and the desired degree of input linearization by the bypass current. Thus, a variety of bipolar multipliers that can be operated at a low voltage such as 1 V are provided, which is because the transistors are not vertically stacked. At the same time, these multipliers can have an enlarged input voltage range providing a good linearity.

The multitail cell may be composed of a first transistor pair of two bipolar transistors whose output ends are coupled together, a second transistor pair of two bipolar transistors whose output ends are coupled together, and at least one additional bipolar transistor. Accordingly, the number of the additional bipolar transistor is optionally decided dependent upon the necessary performance of the multiplier.

While the preferred forms of the present invention have been described, it is to be understood that modifications will be apparent to those skilled in the art without departing from the spirit of the invention. The scope of the invention, therefore, is to be determined solely by the following claims.

What is claimed is:

1. A bipolar multiplier for multiplying a first initial input signal $V_x$ and a second initial input signal $V_y$, said multiplier comprising:

(a) a first transistor pair of a first bipolar transistor having an input end and an output end and a second bipolar transistor having an input end and an output end;

said output ends of said first and second bipolar transistors being coupled together, thereby forming one of differential output ends of said multiplier;

said input end of said first bipolar transistor being applied with a first input signal of $(aV_x+bV_y)$, where a and b are constants;

said input end of said second bipolar transistor being applied with a second input signal of $((a-1)V_x+(b-1)V_y)$;

(b) a second transistor pair of a third bipolar transistor having an input end and an output end and a fourth bipolar transistor having an input end and an output end;

said output ends of said third and fourth bipolar transistors being coupled together, thereby forming the other of said differential output ends of said multiplier;

said input end of said third bipolar transistor being applied with a third input signal of $((a-1)V_x+bV_y)$;

said input end of said fourth bipolar transistor being applied with a fourth input signal of $(aV_x+(b-1)V_y)$;

(c) a fifth bipolar transistor having an input end and an output end;

said input end of said fifth bipolar transistor being applied with a fifth input signal of $(\{a-(½)\}V_x+\{b-(½)\}V_y+V_C)$, where $V_C$ is a positive dc voltage;

(d) said first to fourth bipolar transistors having the same emitter area;

(e) said first transistor pair of said first and second bipolar transistors, said second transistor pair of said third and fourth bipolar transistors, and said fifth bipolar transistor being driven by a common tail current, thereby forming a multitail cell;

(f) wherein the multiplication result $V_x \cdot V_y$ of said first initial input signal $V_x$ and said second initial input signal $V_y$ is differentially outputted from said differential output ends of said multiplier.

2. A bipolar multiplier as claimed in claim 1, wherein said fifth bipolar transistor has the same emitter area as those of said first to fourth bipolar transistors;

and wherein said positive dc voltage $V_C$ satisfies a relationship of $V_C=V_T \cdot \ln 2$, where $V_T$ is the thermal voltage.

3. A bipolar multiplier as claimed in claim 1, wherein said fifth bipolar transistor has an emitter area twice as much as those of said first to fourth bipolar transistors;

and wherein said positive dc voltage $V_C$ satisfies a relationship of $V_C=0$.

4. A bipolar multiplier as claimed in claim 1, wherein said constants a and b satisfy relationships of $(a-1)>0$ and $(b-1)>0$ respectively.

5. A bipolar multiplier as claimed in claim 4, wherein each of said first to fifth input signals is produced by using at least one resistive voltage divider.

6. A bipolar multiplier as claimed in claim 1, wherein said constants a and b satisfy relationships of a=1 and b=1, respectively.

7. A bipolar multiplier for multiplying a first initial input signal $V_x$ and a second initial input signal $V_y$, said multiplier comprising:

(a) a first transistor pair of a first bipolar transistor having an input end and an output end and a second bipolar transistor having an input end and an output end;

said output ends of said first and second bipolar transistors being coupled together, thereby forming one of differential output ends of said multiplier;

said input end of said first bipolar transistor being applied with a first input signal of $(aV_x+bV_y)$, where a and b are constants;

said input end of said second bipolar transistor being applied with a second input signal of $((a-1)V_x+(b-1)V_y)$;

(b) a second transistor pair of a third bipolar transistor having an input end and an output end and a fourth bipolar transistor having an input end and an output end;

said output ends of said third and fourth bipolar transistors being coupled together, thereby forming the other of said differential output ends of said multiplier;

said input end of said third bipolar transistor being applied with a third input signal of $((a-1)V_x+bV_y)$;

said input end of said fourth bipolar transistor being applied with a fourth input signal of $(aV_x+(b-1)V_y)$;

(c) said first to fourth bipolar transistors having the same emitter area;

(d) a fifth bipolar transistor having an input end and an output end;

said input end of said fifth bipolar transistor being applied with a fifth input signal of $(\{a-(½)\}V_x+\{b-(½)\}V_y+4V_T\cdot\ln2)$, where $V_C$ is a positive dc voltage;

(e) a sixth bipolar transistor having an input end and an output end;

said input end of said sixth transistor being applied with a sixth input signal of $(aV_x+\{b-(½)\}V_y+2V_T\cdot\ln2)$;

(f) a seventh bipolar transistor having an input end and an output end;

said input end of said seventh transistor being applied with a seventh input signal of $((a-1)V_x+\{b-(½)\}V_y+2V_T\cdot\ln2)$;

(g) an eighth bipolar transistor having an input end and an output end;

said input end of said eighth transistor being applied with an eighth input signal of $(\{a-(½)\}V_x+bV_y+2V_T\cdot\ln2)$; and (h) a ninth bipolar transistor having an input end and an output end;

said input end of said ninth transistor being applied with a ninth input signal of $(\{a-(½)\}V_x+(b-1)V_y+2V_T\cdot\ln2)$;

(i) said fifth to ninth bipolar transistors having the same emitter area as those of said first to fourth bipolar transistors, respectively;

(j) said output ends of said fifth to ninth bipolar transistors being coupled together; and (k) said first transistor pair of said first and second bipolar transistors, said second transistor pair of said third and fourth bipolar transistors, and said fifth to ninth bipolar transistors being driven by a common tail current, thereby forming a multitail cell;

(1) wherein the multiplication result $V_x \cdot V_y$ of said first initial input signal $V_x$ and said second initial input signal $V_y$ is differentially outputted from said differential output ends of said multiplier.

8. A bipolar multiplier as claimed in claim 7, wherein said constants a and b satisfy the relationships of $(a-1)>0$ and $(b-1)>0$.

9. A bipolar multiplier as claimed in claim 7, wherein said constants a and b satisfy the relationships of a=1 and b=1.

10. A bipolar multiplier as claimed in claim 7, wherein each of said first to ninth input signals is produced by using at least one resistive divider.

11. A bipolar multiplier for multiplying a first initial input signal $V_x$ and a second initial input signal $V_y$, said multiplier comprising:

(a) a first transistor pair of a first bipolar transistor having an input end and an output end and a second bipolar transistor having an input end and an output end;

said output ends of said first and second bipolar transistors being coupled together, thereby forming one of differential output ends of said multiplier;

said input end of said first bipolar transistor being applied with a first input signal of $(aV_x+bV_y)$, where a and b are constants;

said input end of said second bipolar transistor being applied with a second input signal of $((a-1)V_x+(b-1)V_y)$;

(b) a second transistor pair of a third bipolar transistor having an input end and an output end and a fourth bipolar transistor having an input end and an output end;

said output ends of said third and fourth bipolar transistors being coupled together, thereby forming the other of said differential output ends of said multiplier;

said input end of said third bipolar transistor being applied with a third input signal of $((a-1)V_x+bV_y)$;

said input end of said fourth bipolar transistor being applied with a fourth input signal of $(aV_x+(b-1)V_y)$; and (c) said first to fourth bipolar transistors having the same emitter area;

(d) a fifth bipolar transistor having an input end and an output end;

said input end of said fifth bipolar transistor being applied with a fifth input signal of $(\{a-(½)\}V_x+\{b-(½)\}V_y)$;

said fifth bipolar transistor having an emitter area sixteen times as much as those of said first to fourth bipolar transistors;

(e) a sixth bipolar transistor having an input end and an output end;

said input end of said sixth transistor being applied with a sixth input signal of $(aV_x+\{b-(½)\}V_y)$;

said sixth bipolar transistor having an emitter area four times as much as those of said first to fourth bipolar transistors;

(f) a seventh bipolar transistor having an input end and an output end;

said input end of said seventh transistor being applied with a seventh input signal of $((a-1)V_x+\{b-(½)\}V_y)$;

said seventh bipolar transistor having an emitter area four times as much as those of said first to fourth bipolar transistors;

(g) an eighth bipolar transistor having an input end and an output end;

said input end of said eighth transistor being applied with an eighth input signal of $(\{a-(½)\}V_x+bV_y)$; and said eighth bipolar transistor having an emitter area four times as much as those of said first to fourth bipolar transistors;

(h) a ninth bipolar transistor having an input end and an output end;

said input end of said ninth transistor being applied with a ninth input signal of $(\{a-(½)\}V_x+(b-1)V_y)$;

said ninth bipolar transistor having an emitter area four times as much as those of said first to fourth bipolar transistors;

(i) said output ends of said fifth to ninth bipolar transistors being coupled together; and (j) said first transistor pair of said first and second bipolar transistors, said second transistor pair of said third and fourth bipolar transistors, and said fifth to ninth bipolar transistors being driven by a common tail current, thereby forming a multitail cell;

(k) wherein the multiplication result $V_x \cdot V_y$ of said first initial input signal $V_x$ and said second initial input signal $V_y$ is differentially outputted from said differential output ends of said multiplier.

12. A bipolar multiplier as claimed in claim 11, wherein said constants a and b satisfy the relationships of $(a-1)>0$ and $(b-1)>0$.

13. A bipolar multiplier as claimed in claim 11, wherein said constants a and b satisfy the relationships of a=1 and b=1.

14. A bipolar multiplier as claimed in claim 11, wherein each of said first to ninth input signals is produced by using at least one resistive divider.

15. A bipolar multiplier for multiplying a first initial input signal $V_x$ and a second initial input signal $V_y$, said multiplier comprising:

(a) a first transistor pair of a first bipolar transistor having an input end and an output end and a second bipolar transistor having an input end and an output end;

said output ends of said first and second bipolar transistors being coupled together, thereby forming one of differential output ends of said multiplier;

said input end of said first bipolar transistor being applied with a first input signal of $(aV_x+bV_y)$, where a and b are constants;

said input end of said second bipolar transistor being applied with a second input signal of $((a-1)V_x+(b-1)V_y)$;

(b) a second transistor pair of a third bipolar transistor having an input end and an output end and a fourth bipolar transistor having an input end and an output end;

said output ends of said third and fourth bipolar transistors being coupled together, thereby forming the other of said differential output ends of said multiplier;

said input end of said third bipolar transistor being applied with a third input signal of $((a-1)V_x+bV_y)$;

said input end of said fourth bipolar transistor being applied with a fourth input signal of $(aV_x+(b-1)V_y)$;

(c) said first to fourth bipolar transistors having the same emitter area;

(d) a fifth bipolar transistor having an input end and an output end;

said input end of said fifth bipolar transistor being applied with a fifth input signal of $(aV_x+\{b-(½)(1-5^{-½})\}V_y+V_c)$, where $V_c$ is a positive dc voltage;

(e) a sixth bipolar transistor having an input end and an output end;

said input end of said sixth bipolar transistor being applied with a sixth input signal of $((a-1)V_x+\{b-(½)(1-5^{-½})\}V_y+V_c)$;

(f) a seventh bipolar transistor having an input end and an output end;

said input end of said seventh transistor being applied with a seventh input signal of $(\{a-(½)(1-5^{-½})\}V_x+bV_y+V_c)$;

(g) an eighth bipolar transistor having an input end and an output end;

said input end of said eighth transistor being applied with an eighth input signal of $(\{a-(½)(1-5^{-½})\}V_x+(b-1)V_y+V_c)$;

(h) a ninth bipolar transistor having an input end and an output end;

said input end of said ninth transistor being applied with a ninth input signal of $(\{a-(½)(1-5^{1/2})\}V_x+\{b-(½)(1-5^{-½})\}V_y+2V_c)$;

(i) a tenth bipolar transistor having an input end and an output end;

said input end of said tenth transistor being applied with a tenth input signal of $(\{a-(½)(1+5^{-½})\}V_x+\{b-(½)(1+5^{-½}))V_y+2V_c)$;

(j) an eleventh bipolar transistor having an input end and an output end;

said input end of said eleventh transistor being applied with an eleventh input signal of $(\{a-(½)(1-5^{-½})\}V_x+\{b-(½)(1+5^{-½})\}V_y+2V_c)$;

(k) a twelfth bipolar transistor having an input end and an output end;

said input end of said twelfth transistor being applied with a twelfth input signal of $(\{a-(½)(1+5^{-½})\}V_x+\{b-(½)(1-5^{-½})\}V_y+2V_c)$;

(l) a thirteenth bipolar transistor having an input end and an output end;

said input end of said thirteenth transistor being applied with a thirteenth input signal of $(aV_x+\{b-(½)(1+5^{-½})\}V_y+V_c)$;

(m) a fourteenth bipolar transistor having an input end and an output end;

said input end of said fourteenth transistor being applied with a fourteenth input signal of $((a-1)V_x+\{b-(½)(1-5^{-½}))V_y+V_c)$;

(n) a fifteenth bipolar transistor having an input end and an output end;

said input end of said fifteenth transistor being applied with a fifteenth input signal of $(\{a-(½)(1+5^{-½})\}V_x+(b-1)V_y+V_c)$; and (o) a sixteenth bipolar transistor having an input end and an output end;

said input end of said sixteenth transistor being applied with a sixteenth input signal of $(\{a-(½)(1+5^{-½})\}V_x+bV_y+V_c)$;

(p) said output ends of said fifth to sixteenth bipolar transistors being coupled together:

(q) said first transistor pair of said first and second bipolar transistors, said second transistor pair of said third and fourth bipolar transistors, and said fifth to sixteenth bipolar transistors being driven by a common tail current, thereby forming a multitail cell:

(r) wherein the multiplication result $V_x \cdot V_y$ of said first initial input signal $V_x$ and said second initial input signal $V_y$ is differentially outputted from said differential output ends of said multiplier.

16. A bipolar multiplier as claimed in claim 15, wherein said fifth to sixteenth bipolar transistors have the same emitter area as those of said first to fourth bipolar transistors, respectively;

and wherein said positive dc voltage $V_C$ satisfies a relationship of $V_C=V_T\cdot\ln5$, where $V_T$ is the thermal voltage.

17. A bipolar multiplier as claimed in claim 15, wherein said fifth to twelfth bipolar transistors have emitter areas five times as much as those of said first to fourth bipolar transistors, respectively;

and wherein said thirteenth to sixteenth bipolar transistors have emitter areas ten times as much as those of said first to fourth bipolar transistors, respectively;

and wherein said positive dc voltage $V_C$ satisfies a relationship of $V_C=0$.

18. A bipolar multiplier as claimed in claim 15, wherein said constants a and b satisfy the relationships of $(a-1)\geqq 0$, $(b-1)\geqq 0$, $\{a-(½)(1+5^{-½})\}\geqq 0$, and $\{b-(½)(1+5^{-½})\}\geqq 0$.

19. A bipolar multiplier as claimed in claim 15, wherein said constants a and b satisfy the relationships of a=1 and b=1.

20. A bipolar multiplier as claimed in claim 15, wherein each of said first to sixteenth input signals is produced by using at least one resistive divider.

21. A bipolar multiplier for multiplying a first initial input signal $V_x$ and a second initial input signal $V_y$, said multiplier comprising:

(a) a first transistor pair of a first bipolar transistor having an input end and an output end and a second bipolar transistor having an input end and an output end;

said output ends of said first and second bipolar transistors being coupled together, thereby forming one of differential output ends of said multiplier;

said input end of said first bipolar transistor being applied with a first input signal of $(aV_x+bV_y)$, where a and b are constants;

said input end of said second bipolar transistor being applied with a second input signal of $((a-1)V_x+(b-1)V_y)$;

(b) a second transistor pair of a third bipolar transistor having an input end and an output end and a fourth bipolar transistor having an input end and an output end;

said output ends of said third and fourth bipolar transistors being coupled together, thereby forming the other of said differential output ends of said multiplier;

said input end of said third bipolar transistor being applied with a third input signal of $((a-1)V_x+bV_y)$;

said input end of said fourth bipolar transistor being applied with a fourth input signal of $(aV_x+(b-1)V_y)$; and (c) a third transistor pair of a fifth bipolar transistor having an input end and an output end and a sixth bipolar transistor having an input end and an output end;

said output ends of said fifth and sixth bipolar transistors being coupled together;

said input end of said fifth bipolar transistor being applied with a fifth input signal of $(\{a-(½)\}V_x+bV_y+V_C)$, where $V_C$ is a positive dc voltage;

said input end of said sixth bipolar transistor being applied with a sixth input signal of $(\{a-(½)\}V_x+(b-1)V_y+V_C)$;

(d) said first to fouth bipolar transistors having the same emitter area; and (e) said first, second, and third transistor pairs being driven by a common tail current, thereby forming a multitail cell;

(f) wherein the multiplication result $V_x\cdot V_y$ of said first initial input signal $V_x$ and said second initial input signal $V_y$ is differentially outputted from said differential output ends of said multiplier.

22. A bipolar multiplier as claimed in claim 21, wherein said fifth and sixth bipolar transistors has the same emitter area as those of the first to fourth bipolar transistors, respectively;

and wherein said positive dc voltage $V_C$ satisfies a relationship of $V_C=V_T\cdot\ln2$, where $V_T$ is the thermal voltage.

23. A bipolar multiplier as claimed in claim 21, wherein said fifth and sixth bipolar transistors have an emitter area twice as much as those of the first to fourth bipolar transistors, respectively;

and wherein said positive dc voltage $V_C$ satisfies a relationship of $V_C=0$.

24. A bipolar multiplier as claimed in claim 21, wherein said constant a and said constant b satisfy the relationships of $(a-1)\geqq 0$ and $(b-1)\geqq 0$, respectively.

25. A bipolar multiplier as claimed in claim 21, wherein said constant a and said constant b satisfy the relationships of a=1 and b=1.

26. A bipolar multiplier as claimed in claim 21, wherein each of said first to sixth input signals is produced by using at least one resistive divider.

27. A bipolar multiplier for multiplying a first initial input signal $V_x$ and a second initial input signal $V_y$, said multiplier comprising:

(a) a first transistor pair of a first bipolar transistor having an input end and an output end and a second bipolar transistor having an input end and an output end;

said output ends of said first and second bipolar transistors being coupled together, thereby forming one of differential output ends of said multiplier;

said input end of said first bipolar transistor being applied with a first input signal of $(aV_x+bV_y)$, where a and b are constants;

said input end of said second bipolar transistor being applied with a second input signal of $((a-1)V_x+(b-1)V_y)$;

(b) a second transistor pair of a third bipolar transistor having an input end and an output end and a fourth bipolar transistor having an input end and an output end;

said output ends of said third and fourth bipolar transistors being coupled together, thereby forming the other of said differential output ends of said multiplier;

said input end of said third bipolar transistor being applied with a third input signal of $((a-1)V_x+bV_y)$;

said input end of said fourth bipolar transistor being applied with a fourth input signal of $(aV_x+(b-1)V_y)$; and (c) a third transistor pair of a fifth bipolar transistor having an input end and an output end and a sixth bipolar transistor having an input end and an output end;

said input end of said fifth bipolar transistor being applied with a fifth input signal of $(aV_x+\{b-(½)(1-5^{-½})V_y\}+V_c)$ where $V_c$ is a positive dc voltage;

said input end of said sixth bipolar transistor being applied with a sixth input signal of $((a-1)V_x+\{b-(½)(1-5^{-½})V_y\}+V_c)$;

(d) a fourth transistor pair of a seventh bipolar transistor having an input end and an output end and an eighth bipolar transistor having an input end and an output end;

said input end of said seventh bipolar transistor being applied with a seventh input signal of $(\{a-(½)(1-5^{-½})\}V_x+(b-1)V_y+V_c)$;

said input end of said eighth bipolar transistor being applied with an eighth input signal of $(\{a-(½)(1-5^{-½})\}V_x+bV_y+V_c)$;

(e) said first to fourth bipolar transistors having the same emitter area;

(f) said output ends of said fifth to eighth bipolar transistors being coupled together; and (g) said first transistor pair of said first and second bipolar transistors, said second transistor pair of said third and fourth bipolar transistors, said third transistor pair of said fifth and sixth bipolar transistors, and said fourth transistor pair of said seventh and eighth bipolar transistors being driven by a common tail current, thereby forming a multitail cell;

(h) wherein the multiplication result $V_x \cdot V_y$ of said first initial input signal $V_x$ and said second initial input signal $V_y$ is differentially outputted from said differential output ends of said multiplier.

28. A bipolar multiplier as claimed in claim 27, wherein said positive dc voltage $V_C$ is satisfies a relationship of $V_C=V_T \cdot \ln 5$, where $V_T$ is the thermal voltage.

29. A bipolar multiplier as claimed in claim 27, wherein said constant a and said constant b satisfy relationships of $(a-1)\geqq 0$, $(b-1)\geqq 0$, $\{a-(½)(1-5^{-½})\}\geqq 0$, and $\{b-(½)(1-5^{-½})\}\geqq 0$, respectively.

30. A bipolar multiplier as claimed in claim 27, wherein said constants a and b satisfy the relationships of a=1 and b=1.

31. A bipolar multiplier as claimed in claim 27, wherein each of said first to eighth input signals is produced by using at least one resistive divider.

32. A bipolar multiplier for multiplying a first initial input signal $V_x$ and a second initial input signal $V_y$, said multiplier comprising:

(a) a first transistor pair of a first bipolar transistor having an input end and an output end and a second bipolar transistor having an input end and an output end;

said output ends of said first and second bipolar transistors being coupled together, thereby forming one of differential output ends of said multiplier;

said input end of said first bipolar transistor being applied with a first input signal of $(aV_x+bV_y)$, where a and b are constants;

said input end of said second bipolar transistor being applied with a second input signal of $((a-1)V_x+(b-1)V_y)$;

(b) a second transistor pair of a third bipolar transistor having an input end and an output end and a fourth bipolar transistor having an input end and an output end;

said output ends of said third and fourth bipolar transistors being coupled together, thereby forming the other of said differential output ends of said multiplier;

said input end of said third bipolar transistor being applied with a third input signal of $((a-1)V_x+bV_y)$;

said input end of said fourth bipolar transistor being applied with a fourth input signal of $(aV_x+(b-1)V_y)$; and (c) a third transistor pair of a fifth bipolar transistor having an input end and an output end and a sixth bipolar transistor having an input end and an output end;

said input end of said fifth bipolar transistor being applied with a fifth input signal of $(\{a-(½)(1-5^{-½})\}V_x+bV_y+V_{c2})$, where $V_{c2}$ is a positive dc voltage;

said input end of said sixth bipoalr transistor being applied with a sixth input signal of $(\{a-(½)(1-5^{-½})\}V_x+\{b-1\}V_y+V_{c2})$;

(d) a fourth transistor pair of a seventh bipolar transistor having an input end and an output end and an eighth bipolar transistor having an input end and an output end;

said input end of said seventh bipolar transistor being applied with a seventh input signal of $(aV_x+\{b-(½)\}V_y+V_{c1})$, where $V_{c1}$ is a positive dc voltage;

said input end of said eighth bipolar transistor being applied with an eighth input signal of $((a-1)V_x+\{b-(½)\}V_y+V_{c1})$;

(d) a fifth transistor pair of a ninth bipolar transistor having an input end and an output end and a tenth bipolar transistor having an input end and an output end;

said input end of said ninth bipolar transistor being applied with a ninth input signal of $(\{a-(½)(1-5^{-½})\}V_x+\{b-(½)\}V_y+V_{c3})$, where $V_{c3}$ is a positive dc voltage;

said input end of said tenth bipolar transistor being applied with a tenth input signal of $(\{a-(½)(1+5^{-½})\}V_x+\{b-(½)\}V_y+V_{c3})$;

(e) a sixth transistor pair of an eleventh bipolar transistor having an input end and an output end and a twelfth bipolar transistor having an input end and an output end;

said input end of said eleventh bipolar transistor being applied with an eleventh input signal of $(\{a-(½)(1+5^{-½})\}V_x+\{b-(½)\}V_y+V_{c3})$;

said input end of said twelfth bipolar transistor being applied with a twelfth input signal of $(\{a-(½)(1+5^{-½})\}V_x+bV_y+V_{c2})$;

(f) said first to fourth bipolar transistors having the same emitter area;

(g) said output ends of said fifth to twelfth bipolar transistors being coupled together; and (h) said first transistor pair of said first and second bipolar transistors, said second transistor pair of said third and fourth bipolar transistors, said third transistor pair of said fifth and sixth bipolar transistors, said fourth transistor pair of said seventh and eighth bipolar transistors, said fifth transistor pair of said ninth and tenth bipolar transistors, and said sixth transistor pair of said seventh and eighth bipolar transistors being driven by a common tail current, thereby forming a multitail cell;

(i) wherein the multiplication result $V_x \cdot V_y$ of said first initial input signal $V_x$ and said second initial input signal $V_y$ is differentially outputted from said differential output ends of said multipliers.

33. A bipolar multiplier as claimed in claim 32, wherein said fifth to twelfth bipolar transistors have the same emitter area as those of said first to fourth bipolar transistors, respectively;

and wherein said positive dc voltages $V_{C1}$, $V_{C2}$ and $V_{C3}$ satisfy the relationships of $V_{C1}=V_T \cdot \ln 2$, $V_{C2}=V_T \cdot \ln 5$, and $V_{C3}=V_T \cdot \ln 20$, where $V_T$ is the thermal voltage, respectively.

34. A bipolar multiplier as claimed in claim 32, wherein said constant a and said constant b satisfy relationships of $(a-1)\geqq 0$, $(b-1)\geqq 0$, and $\{a-(1/2)(1+5^{-1/2})\}\geqq 0$, respectively.

35. A bipolar multiplier as claimed in claim 32, wherein said constants a and b satisfy relationships of a=1 and b=1.

36. A bipolar multiplier as claimed in claim 32, wherein each of said first to twelfth input signals is produced by using at least one resistive divider, respectively.

37. A bipolar multiplier for multiplying a first initial input signal $V_x$ and a second initial input signal $V_y$, said multiplier comprising:

(a) a first transistor pair of a first bipolar transistor having an input end and an output end and a second bipolar transistor having an input end and an output end;

said output ends of said first and second bipolar transistors being coupled together, thereby forming one of differential output ends of said multiplier;

said input end of said first bipolar transistor being applied with a first input signal of $(aV_x+bV_y)$, where a and b are constants;

said input end of said second bipolar transistor being applied with a second input signal of $((a-1)V_x+(b-1)V_y)$;

(b) a second transistor pair of a third bipolar transistor having an input end and an output end and a fourth bipolar transistor having an input end and an output end;

said output ends of said third and fourth bipolar transistors being coupled together, thereby forming the other of said differential output ends of said multiplier;

said input end of said third bipolar transistor being applied with a third input signal of $((a-1)V_x+bV_y)$;

said input end of said fourth bipolar transistor being applied with a fourth input signal of $(aV_x+(b-1)V_y)$;

(c) a third transistor pair of a fifth bipolar transistor having an input end and an output end and a sixth bipolar transistor having an input end and an output;

said output end of said fifth bipolar transistor being connected to said coupled output ends of said first and second bipolar transistors; said output end of said sixth bipolar transistor being connected to said coupled output ends of said third and fourth bipolar transistors;

said input ends of said fifth and sixth bipolar transistors being coupled together to be applied with a fifth input signal of $(\{a-(1/2)\}V_x+\{b-(1/2)\}V_y+V_C)$, where $V_C$ is a positive dc voltage;

(d) said first to fourth bipolar transistors having the same emitter area;

(e) said first transistor pair of said first and second bipolar transistors, said second transistor pair of said third and fourth bipolar transistors, and said third transistor pair of said fifth and sixth bipolar transistors being driven by a common tail current, thereby forming a multitail cell;

(f) wherein the multiplication result $V_x \cdot V_y$ of said first initial input signal $V_x$ and said second initial input signal $V_y$ is differentially outputted from said differential output ends of said multiplier.

38. A bipolar multiplier as claimed in claim 37, wherein said fifth and sixth bipolar transistors have the same emitter area as those of said first to fourth bipolar transistors, respectively;

and wherein said positive dc voltage $V_C$ satisfies a relationship of $V_C=0$.

39. A bipolar multiplier as claimed in claim 37, wherein said constants a and b satisfy the relationships of $(a-1)\geqq 0$ and $(b-1)\geqq 0$, respectively.

40. A bipolar multiplier as claimed in claim 37, wherein said constants a and b satisfy the relationships of a=1 and b=1, respectively.

41. A bipolar multiplier as claimed in claim 37, wherein each of said first to fifth input signals is produced by using at least one resistive voltage divider.

42. A bipolar multiplier for multiplying a first initial input signal $V_x$ and a second initial input signal $V_y$, said multiplier comprising:

(a) a first transistor pair of a first bipolar transistor having an input end and an output end and a second bipolar transistor having an input end and an output end;

said output ends of said first and second bipolar transistors being coupled together, thereby forming one of differential output ends of said multiplier;

said input end of said first bipolar transistor being applied with a first input signal of $(aV_x+bV_y)$, where a and b are constants;

said input end of said second bipolar transistor being applied with a second input signal of $((a-1)V_x+(b-1)V_y)$;

(b) a second transistor pair of a third bipolar transistor having an input end and an output end and a fourth bipolar transistor having an input end and an output end;

said output ends of said third and fourth bipolar transistors being coupled together, thereby forming the other of said differential output ends of said multiplier;

said input end of said third bipolar transistor being applied with a third input signal of $((a-1)V_x+bV_y)$;

said input end of said fourth bipolar transistor being applied with a fourth input signal of $(aV_x+(b-1)V_y)$; and (c) said first to fourth bipolar transistors having the same emitter area:

(d) a third transistor pair of a fifth bipolar transistor having an input end and an output end and a sixth bipolar transistor having an input end and an output end;

said input ends of said fifth and sixth bipolar transistors being coupled together to be applied with a fifth input signal of $(\{a-(1/2)\}V_x+\{b-(1/2)\}V_y+2V_T \cdot \ln 2)$;

said output end of said fifth bipolar transistor being connected to said coupled output ends of said first and second bipolar transistors;

said output end of said sixth bipolar transistor being connected to said coupled output ends of said third and fourth bipolar transistors;

(e) a fourth transistor pair of a seventh bipolar transistor having an input end and an output end and an eighth bipolar transistor having an input end and an output end;

said input ends of said seventh and eighth bipolar transistors being coupled together to be applied with a sixth input signal of $(aV_x+\{b-(1/2)\}V_y+2V_T \cdot \ln 2)$;

said output end of said seventh bipolar transistor being connected to said coupled output ends of said first and second bipolar transistors;

said output end of said eighth bipolar transistor being connected to said coupled output ends of said third and fourth bipolar transistors;

(f) a fifth transistor pair of a ninth bipolar transistor having an input end and an output end and a tenth bipolar transistor having an input end and an output end;

said input ends of said ninth and tenth bipolar transistors being coupled together to be applied with a seventh input signal of $((a-1)V_x+\{b-(½)\}V_y+2V_T\cdot\ln 2)$;

said output end of said ninth bipolar transistor being connected to said coupled output ends of said first and second bipolar transistors;

said output end of said tenth bipolar transistor being connected to said coupled output ends of said third and fourth bipolar transistors;

(g) a sixth transistor pair of an eleventh bipolar transistor having an input end and an output end and a twelfth bipolar transistor having an input end and an output end;

said input end of said eleventh and twelfth bipolar transistors being coupled together to be applied with an eighth input signal of $(\{a-(½)\}V_x+bV_y+2V_T\cdot\ln 2)$;

said output end of said eleventh bipolar transistor being connected to said coupled output ends of said first and second bipolar transistors;

said output end of said twelfth bipolar transistor being connected to said coupled output ends of said third and fourth bipolar transistors;

(h) a seventh transistor pair of a thirteenth bipolar transistor having an input end and an output end and a fourteenth bipolar transistor having an input end and an output end;

said input end of said thirteenth and fourteenth bipolar transistors being coupled together to be applied with an eighth input signal of $(\{a-(½)\}V_x+(b-1)V_y+2V_T\cdot\ln 2)$;

said output end of said thirteenth bipolar transistor being connected to said coupled output ends of said first and second bipolar transistors;

said output end of said fourteenth bipolar transistor being connected to said coupled output ends of said third and fourth bipolar transistors;

(i) said fifth to fourteenth bipolar transistors having the same emitter area as those of said first to fourth bipolar transistors, respectively; and (j) said first transistor pair of said first and second bipolar transistors, said second transistor pair of said third and fourth bipolar transistors, said third transistor pair of said fifth and sixth bipolar transistors, said fourth transistor pair of said seventh and eighth bipolar transistors, said fifth transistor pair of said ninth and tenth bipolar transistors, said sixth transistor pair of said eleventh and twelfth bipolar transistors, and said seventh transistor pair of said thirteenth and fourteenth bipolar transistors being driven by a common tail current, thereby forming a multitail cell;

(k) wherein the multiplication result $V_x\cdot V_y$ of said first initial input signal $V_x$ and said second initial input signal $V_y$ is differentially outputted from said differential output ends of said multiplier.

43. A bipolar multiplier as claimed in claim 42, wherein said constants a and b satisfy the relationships of $(a-1)\geqq 0$ and $(b-1)\geqq 0$.

44. A bipolar multiplier as claimed in claim 42, wherein said constants a and b satisfy the relationships of a=1 and b=1.

45. A bipolar multiplier as claimed in claim 42, wherein each of said first to ninth input signals is produced by using at least one resistive divider.

46. A bipolar multiplier for multiplying a first initial input signal $V_x$ and a second initial input signal $V_y$ said multiplier comprising:

(a) a first transistor pair of a first bipolar transistor having an input end and an output end and a second bipolar transistor having an input end and an output end;

said output ends of said first bipolar transistor and said second bipolar transistor being coupled together, thereby forming one of differential output ends of said multiplier;

said input end of said first bipolar transistor being applied with a first input signal of $(aV_x+bV_y)$, where a and b are constants;

said input end of said second bipolar transistor being applied with a second input signal of $((a-1)V_x+(b-1)V_y)$;

(b) a second transistor pair of a third bipolar transistor having an input end and an output end and a fourth bipolar transistor having an input end and an output end;

said output ends of said third bipolar transistor and said fourth bipolar transistor being coupled together, thereby forming the other of said differential output ends of said multiplier;

said input end of said third bipolar transistor being applied with a third input signal of $((a-1)V_x+bV_y)$;

said input end of said fourth bipolar transistor being applied with a fourth input signal of $(aV_x+(b-1)V_y)$; and (c) said first to fourth bipolar transistors having the same emitter area;

(d) a third transistor pair of a fifth bipolar transistor having an input end and an output end and a sixth bipolar transistor having an input end and an output end;

said input ends of said fifth and sixth bipolar transistors being coupled together to be applied with a fifth input signal of $(\{a-(½)\}V_x+\{b-(½)\}V_y)$;

said output end of said fifth bipolar transistor being connected to said coupled output ends of said first and second bipolar transistors;

said output end of said sixth bipolar transistor being connected to said coupled output ends of said third and fourth bipolar transistors;

said fifth and sixth bipolar transistors having emitter areas eight times as much as those of said first to fourth bipolar transistors, respectively;

(e) a fourth transistor pair of a seventh bipolar transistor having an input end and an output end and an eighth bipolar transistor having an input end and an output end;

said input ends of said seventh and eighth bipolar transistors being applied with a sixth input signal of $(aV_x+\{b-(½)\}V_y)$;

said output end of said seventh bipolar transistor being connected to said coupled output ends of said first and second bipolar transistors;

said output end of said eighth bipolar transistor being connected to said coupled output ends of said third and fourth bipolar transistors;

said seventh and eighth bipolar transistors having emitter areas twice as much as those of said first to fourth bipolar transistors, respectively;

(f) a fifth transistor pair of a ninth bipolar transistor having an input end and an output end and a tenth bipolar transistor having an input end and an output end;

said input ends of said ninth and tenth bipolar transistors being coupled together to be applied with a seventh input signal of $((a-1)V_x+\{b-(½)\}V_y)$;

said output end of said ninth bipolar transistor being connected to said coupled output ends of said first and second bipolar transistors;

said output end of said tenth bipolar transistor being connected to said coupled output ends of said third and fourth bipolar transistors;

said ninth and tenth bipolar transistors having emitter areas twice as much as those of said first to fourth bipolar transistors, respectively;

(g) a sixth transistor pair of an eleventh bipolar transistor having an input end and an output end and a twelfth bipolar transistor having an input end and an output end;

said input ends of said eleventh and twelfth bipolar transistors being coupled together to be applied with an eighth input signal of $(\{a-(½)\}V_x+bV_y)$; and said output end of said eleventh bipolar transistor being connected to said coupled output ends of said first and second bipolar transistors;

said output end of said twelfth bipolar transistor being connected to said coupled output ends of said third and fourth bipolar transistors;

said eleventh and twelfth bipolar transistors having emitter areas twice as much as those of said first to fourth bipolar transistors, respectively;

(h) a seventh transistor pair of a thirteenth bipolar transistor having an input end and an output end and a fourteenth bipolar transistor having an input end and an output end;

said input ends of said thirteenth and fourteenth bipolar transistors being coupled together to be applied with a ninth input signal of $(\{a-(½)\}V_x+(b-1)V_y)$;

said output end of said thirteenth bipolar transistor being connected to said coupled output ends of said first and second bipolar transistors;

said output end of said fourteenth bipolar transistor being connected to said coupled output ends of said third and fourth bipolar transistors;

said thirteenth and fourteenth bipolar transistors having emitter areas twice as much as those of said first to fourth bipolar transistors, respectively; and (i) said first transistor pair of said first and second bipolar transistors, said second transistor pair of said third and fourth bipolar transistors, said third transistor pair of said fifth and sixth bipolar transistors, said fourth transistor pair of said seventh and eighth bipolar transistors, said fifth transistor pair of said ninth and tenth bipolar transistors, said sixth transistor pair of said eleventh and twelfth bipolar transistors, and said seventh transistor pair of said thirteenth and fourteenth bipolar transistors being driven by a common tail current, thereby forming a multitail cell;

(j) wherein the multiplication result $V_x \cdot V_y$ of said first initial input signal $V_x$ and said second initial input signal $V_y$ is differentially outputted from said differential output ends of said multiplier.

47. A bipolar multiplier as claimed in claim 46, wherein said constants a and b satisfy the relationships of $(a-1) \geqq 0$ and $(b-1) \geqq 0$.

48. A bipolar multiplier as claimed in claim 46, wherein said constants a and b satisfy the relationships of a=1 and b=1.

49. A bipolar multiplier as claimed in claim 46, wherein each of said first to ninth input signals is produced by using at least one resistive divider.

50. A bipolar multiplier for multiplying a first initial input signal $V_x$ and a second initial input signal $V_y$, said multiplier comprising:

(a) a first transistor pair of a first bipolar transistor having an input end and an output end and a second bipolar transistor having an input end and an output end;

said output ends of said first bipolar transistor and said second bipolar transistor being coupled together, thereby forming one of differential output ends of said multiplier;

said input end of said first bipolar transistor being applied with a first input signal of $(aV_x+bV_y)$, where a and b are constants;

said input end of said second bipolar transistor being applied with a second input signal of $((a-1)V_x+(b-1)V_y)$;

(b) a second transistor pair of a third bipolar transistor having an input end and an output end and a fourth bipolar transistor having an input end and an output end;

said output ends of said third bipolar transistor and said fourth bipolar transistor being coupled together, thereby forming the other of said differential output ends of said multiplier;

said input end of said third bipolar transistor being applied with a third input signal of $((a-1)V_x+bV_y)$;

said input end of said fourth bipolar transistor being applied with a fourth input signal of $(aV_x+(b-1)V_y)$;

(c) said first to fourth bipolar transistors having the same emitter area;

(d) a fifth bipolar transistor having an input end and an output end;

said input end of said fifth bipolar transistor being applied with a fifth input signal of $(aV_x+\{b-(½)(1-5^{-½})\}V_y+V_c)$, where $V_c$ is a positive do voltage;

(e) a sixth bipolar transistor having an input end and an output end;

said input end of said sixth bipolar transistor being applied with a sixth input signal of $((a-1)V_x+\{b-(½)(1-5^{-½})\}V_y+V_c)$;

(f) a seventh bipolar transistor having an input end and an output end;

said input end of said seventh transistor being applied with a seventh input signal of $(\{a-(½)(1-5^{-½})\}V_x+bV_y+V_c)$;

(g) an eighth bipolar transistor having an input end and an output end;

said input end of said eighth transistor being applied with an eighth input signal of $(\{a-(½)(1-5^{-½})\}V_x+(b-1)V_y+V_c)$;

(h) a ninth bipolar transistor having an input end and an output end;

said input end of said ninth transistor being applied with a ninth input signal of $(\{a-(½)(1-5^{-½})\}V_x+\{b-(½)(1-5^{-½})\}V_y+2V_c)$;

(i) a tenth bipolar transistor having an input end and an output end;

said input end of said tenth transistor being applied with a tenth input signal of $(\{a-(½)(1+5^{-½})\}V_x+\{b-(½)(1+5^{-½}))V_y+2V_c)$;

(j) an eleventh bipolar transistor having an input end and an output end;

said input end of said eleventh transistor being applied with an eleventh input signal of $(\{a-(½)(1-5^{-½})\}V_x+\{b-(½)(1+5^{-½})\}V_y+2V_c)$;

(k) a twelfth bipolar transistor having an input end and an output end;

said input end of said twelfth transistor being applied with a twelfth input signal of $(\{a-(½)(1+5^{-½})\}V_x+\{b-(½)(1-5^{-½})\}V_y+2V_c)$;

(l) a thirteenth bipolar transistor having an input end and an output end;

said input end of said thirteenth transistor being applied with a thirteenth input signal of $(aV_x+\{b-(½)(1+5^{-½})\}V_y+V_c)$;

(m) a fourteenth bipolar transistor having an input end and an output end;

said input end of said fourteenth transistor being applied with a fourteenth input signal of $((a-1)V_x+\{b-(½)(1-5^{-½}))V_y+V_c)$;

(n) a fifteenth bipolar transistor having an input end and an output end;

said input end of said fifteenth transistor being applied with a fifteenth input signal of $(\{a-(½)(1+5^{-½})\}V_x+(b-1)V_y+V_c)$; and (o) a sixteenth bipolar transistor having an input end and an output end;

said input end of said sixteenth transistor being applied with a sixteenth input signal of $(\{a-(½)(1+5^{-½})\}V_x+bV_y+V_c)$;

(p) said output ends of said fifth to sixteenth bipolar transistors being coupled together; and (q) said first transistor pair of said first and second bipolar transistors, said second transistor pair of said third and fourth bipolar transistors, and said fifth to sixteenth bipolar transistors being driven by a common tail current, thereby forming a multitail cell;

(r) wherein a bypass current flowing through said coupled output ends of said fifth to sixteenth bipolar transistors is divided into first and second divided currents;

(s) and wherein said first divided current is supplied to said coupled output ends of said first and second bipolar transistors, and said second divided current is supplied to said coupled output ends of said third and fourth bipolar transistors;

(t) and wherein the multiplication result $V_x \cdot V_y$ of said first initial input signal $V_x$ and said second initial input signal $V_y$ is outputted from one of said differential output ends of said multiplier.

51. A bipolar multiplier as claimed in claim 50, wherein said fifth to sixteenth bipolar transistors have the same emitter area as those of said first to fourth bipolar transistors, respectively;

and wherein said positive dc voltage $V_C$ satisfies a relationship of $V_C=V_T \cdot \ln 5$, where $V_T$ is the thermal voltage.

52. A bipolar multiplier as claimed in claim 50, wherein said fifth to twelfth bipolar transistors have emitter areas five times as much as those of said first to fourth bipolar transistors, respectively;

and wherein said thirteenth to sixteenth bipolar transistors have the same emitter area as those of said first to fourth bipolar transistors, respectively;

and wherein said positive dc voltage $V_C$ satisfies a relationship of $V_C=0$.

53. A bipolar multiplier as claimed in claim 50, wherein said constants a and b satisfy the relationships of $(a-1) \geqq 0$, $(b-1) \geqq 0$, $\{a-(½)(1+5^{-½})\} \geqq 0$, and $\{b-(½)(1+5^{-½})\} \geqq 0$.

54. A bipolar multiplier as claimed in claim 50, wherein said constants a and b satisfy the relationships of a=1 and b=1.

55. A bipolar multiplier as claimed in claim 50, wherein each of said first to sixteenth input signals is produced by using at least one resistive divider.

56. A bipolar multiplier for multiplying a first initial input signal $V_x$ and a second initial input signal $V_y$, said multiplier comprising:

(a) a first transistor pair of a first bipolar transistor having an input end and an output end and a second bipolar transistor having an input end and an output end;

said output ends of said first bipolar transistor and said second bipolar transistor being coupled together, thereby forming one of differential output ends of said multiplier;

said input end of said first bipolar transistor being applied with a first input signal of $(aV_x+bV_y)$, where a and b are constants;

said input end of said second bipolar transistor being applied with a second input signal of $((a-1)V_x+(b-1)V_y)$;

(b) a second transistor pair of a third bipolar transistor having an input end and an output end and a fourth bipolar transistor having an input end and an output end;

said output ends of said third bipolar transistor and said fourth bipolar transistor being coupled together, thereby forming the other of said differential output ends of said multiplier;

said input end of said third bipolar transistor being applied with a third input signal of $((a-1)V_x+bV_y)$;

said input end of said fourth bipolar transistor being applied with a fourth input signal of $(aV_x+(b-1)V_y)$; and (c) a third transistor pair of a fifth bipolar transistor having an input end and an output end and a sixth bipolar transistor having an input end and an output end;

said output end of said fifth bipolar transistor being connected to said coupled output ends of said first and second bipolar transistors;

said output end of said sixth bipolar transistor being connected to said coupled output ends of said third and fourth bipolar transistors;

said input ends of said fifth and sixth bipolar transistors being coupled together to be applied with a fifth input signal of $(\{a-(½)\}V_x+bV_y)$;

(d) a fourth transistor pair of a seventh bipolar transistor having an input end and an output end and an eighth bipolar transistor having an input end and an output end;

said output end of said seventh bipolar transistor being connected to said coupled output ends of said first and second bipolar transistors;

said output end of said eighth bipolar transistor being connected to said coupled output ends of said third and fourth bipolar transistors;

said input ends of said seventh and eighth bipolar transistors being coupled together to be applied with a fifth input signal of $(\{a-(½)\}V_x+(b-1)V_y)$;

(e) said first to fourth bipolar transistors having the same emitter area; and (f) said first, second, and third transistor pairs being driven by a common tail current, thereby forming a multitail cell; and (g) said first transistor pair of said first and second bipolar transistors, said second transistor pair of said third and fourth bipolar transistors, said third transistor pair of said fifth and sixth bipolar transistors, and said fourth transistor pair of said seventh and eighth bipolar transistors being driven by a common tail current, thereby forming a multitail cell;

(h) wherein the multiplication result $V_x \cdot V_y$ of said first initial input signal $V_x$ and said second initial input signal $V_y$ is outputted from one of said differential output ends of said multiplier.

57. A bipolar multiplier as claimed in claim 56, wherein said constants a and b satisfy relationships of $(a-1) \geqq 0$ and $(b-1) \geqq 0$, respectively.

58. A bipolar multiplier as claimed in claim 56, wherein said constant a and said constant b satisfy the relationships of a=1 and b=1.

59. A bipolar multiplier as claimed in claim 56, wherein each of said first to sixth input signals is produced by using at least one resistive divider.

60. A bipolar multiplier for multiplying a first initial input signal $V_x$ and a second initial input signal $V_y$, said multiplier comprising:

(a) a first transistor pair of a first bipolar transistor having an input end and an output end and a second bipolar transistor having an input end and an output end;

said output ends of said first bipolar transistor and said second bipolar transistor being coupled together, thereby forming one of differential output ends of said multiplier;

said input end of said first bipolar transistor being applied with a first input signal of $(aV_x+bV_y)$, where a and b are constants;

said input end of said second bipolar transistor being applied with a second input signal of $((a-1)V_x+(b-1)V_y)$;

(b) a second transistor pair of a third bipolar transistor having an input end and an output end and a fourth bipolar transistor having an input end and an output end;

said output ends of said third bipolar transistor and said fourth bipolar transistor being coupled together, thereby forming the other of said differential output ends of said multiplier;

said input end of said third bipolar transistor being applied with a third input signal of $((a-1)V_x+bV_y)$;

said input end of said fourth bipolar transistor being applied with a fourth input signal of $(aV_x+(b-1)V_y)$; and (c) a third transistor pair of a fifth bipolar transistor having an input end and an output end and a sixth bipolar transistor having an input end and an output end;

said input end of said fifth bipolar transistor being applied with a fifth input signal of $(aV_x+\{b-(1/2)(1-5^{-1/2})V_y\}+V_c)$ where $V_c$ is a positive dc voltage;

said input end of said sixth bipolar transistor being applied with a sixth input signal of $((a-1)V_x+\{b-(1/2)(1-5^{-1/2})V_y\}+V_c)$;

(d) a fourth transistor pair of a seventh bipolar transistor having an input end and an output end and an eighth bipolar transistor having an input end and an output end;

said input end of said seventh bipolar transistor being applied with a seventh input signal of $(\{a-(1/2)(1-5^{-1/2})\}V_x+(b-1)V_y+V_c)$;

said input end of said eighth bipolar transistor being applied with an eighth input signal of $(\{a-(1/2)(1-5^{-1/2})\}V_x+bV_y+V_c)$;

(e) said first to fourth bipolar transistors having the same emitter area;

(f) said output ends of said fifth to eighth bipolar transistors being coupled together; and (g) said first transistor pair of said first and second bipolar transistors, said second transistor pair of said third and fourth bipolar transistors, said third transistor pair of said fifth and sixth bipolar transistors, and said fourth transistor pair of said seventh and eighth bipolar transistors being driven by a common tail current, thereby forming a multitail cell;

(h) wherein a bypass current flowing through said coupled output ends of said fifth to eighth bipolar transistors is divided into first and second divided currents;

(i) and wherein said first divided current is supplied to said coupled output ends of said first and second bipolar transistors, and said second divided current is supplied to said coupled output ends of said third and fourth bipolar transistors;

(j) and wherein the multiplication result $V_x \cdot V_y$ of said first initial input signal $V_x$ and said second initial input signal $V_y$ is outputted from one of said differential output ends of said multiplier.

61. A bipolar multiplier as claimed in claim 60, wherein said positive dc voltage $V_C$ is satisfies a relationship of $V_C=V_T \cdot \ln 5$, where $V_T$ is the thermal voltage.

62. A bipolar multiplier as claimed in claim 60, wherein said constants a and b satisfy relationships of $(a-1) \geqq 0$, $(b-1) \geqq 0$, $\{a-(1/2)(1-5^{-1/2})\} \geqq 0$, and $\{b-(1/2)(1-5^{-1/2})\} \geqq 0$, respectively.

63. A bipolar multiplier as claimed in claim 60, wherein said constants a and b satisfy the relationships of a=1 and b=1.

64. A bipolar multiplier as claimed in claim 60, wherein each of said first to eighth input signals is produced by using at least one resistive divider.

65. A bipolar multiplier for multiplying a first initial input signal $V_x$ and a second initial input signal $V_y$, said multiplier comprising:

(a) a first transistor pair of a first bipolar transistor having an input end and an output end and a second bipolar transistor having an input end and an output end;

said output ends of said first bipolar transistor and said second bipolar transistor being coupled together, thereby forming one of differential output ends of said multiplier;

said input end of said first bipolar transistor being applied with a first input signal of $(aV_x+bV_y)$, where a and b are constants;

said input end of said second bipolar transistor being applied with a second input signal of $((a-1)V_x+(b-1)V_y)$;

(b) a second transistor pair of a third bipolar transistor having an input end and an output end and a fourth bipolar transistor having an input end and an output end;

said output ends of said third bipolar transistor and said fourth bipolar transistor being coupled together, thereby forming the other of said differential output ends of said multiplier;

said input end of said third bipolar transistor being applied with a third input signal of $((a-1)V_x+bV_y)$;

said input end of said fourth bipolar transistor being applied with a fourth input signal of $(aV_x+(b-1)V_y)$; and (c) a third transistor pair of a fifth bipolar transistor having an input end and an output end and a sixth bipolar transistor having an input end and an output end;

said input end of said fifth bipolar transistor being applied with a fifth input signal of $(\{a-(1/2)(1-5^{-1/2})\}V_x+bV_y+V_{c2})$, where $V_{c2}$ is a positive dc voltage;

said input end of said sixth bipolar transistor being applied with a sixth input signal of $(\{a-(1/2)(1-5^{-1/2})\}V_x+\{b-1\}V_y+V_{c2})$;

(d) a fourth transistor pair of a seventh bipolar transistor having an input end and an output end and an eighth bipolar transistor having an input end and an output end;

said input end of said seventh bipolar transistor being applied with a seventh input signal of $(aV_x+\{b-(1/2)\}V_y+V_{c1})$, where $V_{c1}$ is a positive dc voltage;

said input end of said eighth bipolar transistor being applied with an eighth input signal of $((a-1)V_x+\{b-(1/2)\}V_y+V_{c1})$;

(d) a fifth transistor pair of a ninth bipolar transistor having an input end and an output end and a tenth bipolar transistor having an input end and an output end;

said input end of said ninth bipolar transistor being applied with a ninth input signal of $(\{a-(1/2)(1-5^{-1/2})\}V_x+\{b-(1/2)\}V_y+V_{c3})$, where $V_{c3}$ is a positive dc voltage;

said input end of said tenth bipolar transistor being applied with a tenth input signal of $(\{a-(1/2)(1+5^{-1/2})\}V_x+\{b-(1/2)\}V_y+V_{c3})$;

(e) a sixth transistor pair of an eleventh bipolar transistor having an input end and an output end and a twelfth bipolar transistor having an input end and an output end;

said input end of said eleventh bipolar transistor being applied with an eleventh input signal of $(\{a-(1/2)(1+5^{-1/2})\}V_x+\{b-(1/2)\}V_y+V_{c3})$;

said input end of said twelfth bipolar transistor being applied with a twelfth input signal of $(\{a-(1/2)(1+5^{-2/1})\}V_x+bV_y+V_{c2})$;

(f) said first to fourth bipolar transistors having the same emitter area;

(g) said output ends of said fifth to twelfth bipolar transistors being coupled together; and (h) said first transistor pair of said first and second bipolar transistors, said second transistor pair of said third and fourth bipolar transistors, said third transistor pair of said fifth and sixth bipolar transistors, said fourth transistor pair of said seventh and eighth bipolar transistors, said fifth transistor pair of said ninth and tenth bipolar transistors, and said sixth transistor pair of said eleventh and twelfth bipolar transistors being driven by a common tail current, thereby forming a multitail cell;

(i) wherein a bypass current flowing through said coupled output ends of said fifth to twelfth bipolar transistors is divided into first and second divided currents;

(j) and wherein said first divided current is supplied to said coupled output ends of said first and second bipolar transistors, and said second divided current is supplied to said coupled output ends of said third and fourth bipolar transistors;

(k) and wherein the multiplication result $V_x \cdot V_y$ of said first initial input signal $V_x$ and said second initial input signal $V_y$ is outputted from one of said differential output ends of said multiplier.

66. A bipolar multiplier as claimed in claim 65, wherein said fifth to twelfth bipolar transistors have the same emitter area as those of said first to fourth bipolar transistors, respectively;

and wherein said positive dc voltages $V_{C1}$, $V_{C2}$ and $V_{C3}$ satisfy the relationships of $V_{C1}=V_T \cdot \ln 2$, $V_{C2}=V_T \cdot \ln 5$, and $V_{C3}=V_T \cdot \ln 20$, where $V_T$ is the thermal voltage, respectively.

67. A bipolar multiplier as claimed in claim 65, wherein said constant a and said constant b satisfy the relationships of $(a-1)\geqq 0$, $(b-1)\geqq 0$, and $\{a-(1/2)(1+5^{-1/2})\}\geqq 0$, respectively.

68. A bipolar multiplier as claimed in claim 65, wherein said constants a and b satisfy the relationships of a=1 and b=1.

69. A bipolar multiplier as claimed in claim 65, wherein each of said first to twelfth input signals is produced by using at least one resistive divider, respectively.

* * * * *

UNITED STATES PATENT AND TRADEMARK OFFICE

CERTIFICATE OF CORRECTION

PATENT NO. : 5926,408
DATED : July 20, 1999
INVENTOR(S) : Katsuji KIMURA

It is certified that error appears in the above-identified patent and that said Letters Patent is hereby corrected as shown below:

Column 4, line 56, delete "$\{(a-1)V_x + (b-V_y\}$" and insert --$\{(a-1)V_x + (b-1)V_y\}$--;

Column 11, line 57, delete "$V_2 = \{(a-1)V_x + (b-V_y\}$" and insert --$V_2 = \{(a-1)V_x + (b-1)V_y\}$--.

Signed and Sealed this

Twenty-ninth Day of February, 2000

Attest:

Q. TODD DICKINSON

*Attesting Officer*

*Commissioner of Patents and Trademarks*